US010112675B2

(12) United States Patent
Takenaka et al.

(10) Patent No.: US 10,112,675 B2
(45) Date of Patent: Oct. 30, 2018

(54) MOBILE BODY

(71) Applicant: HONDA MOTOR CO., LTD., Tokyo (JP)

(72) Inventors: Toru Takenaka, Saitama (JP); Kazushi Akimoto, Saitama (JP); Yuichi Uebayashi, Saitama (JP); Shinya Shirokura, Saitama (JP); Tomohiro Kawakami, Saitama (JP); Makoto Araki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 118 days.

(21) Appl. No.: 15/060,024

(22) Filed: Mar. 3, 2016

(65) Prior Publication Data

US 2016/0280307 A1    Sep. 29, 2016

(30) Foreign Application Priority Data

Mar. 23, 2015  (JP) .................................. 2015-059726

(51) Int. Cl.
  *B62K 21/00*    (2006.01)
  *B62K 5/08*    (2006.01)
  (Continued)

(52) U.S. Cl.
  CPC .............. *B62K 21/00* (2013.01); *B60L 15/20* (2013.01); *B62K 5/01* (2013.01); *B62K 5/05* (2013.01); *B62K 5/08* (2013.01); *B62K 5/10* (2013.01); *B62K 21/18* (2013.01); *B60L 2240/18* (2013.01); *B60L 2260/34* (2013.01); *B60L 2260/42* (2013.01); *B62K 2204/00* (2013.01);
  (Continued)

(58) Field of Classification Search
  USPC ........................................................ 701/124
  See application file for complete search history.

(56) References Cited

U.S. PATENT DOCUMENTS 4,903,790 A    2/1990  Horiike et al.
5,927,424 A    7/1999  Van Den Brink et al.
(Continued)

FOREIGN PATENT DOCUMENTS

CN    20 110 009 A1    1/2013
EP    1 783 023 A1    5/2007
(Continued)

OTHER PUBLICATIONS

JP,2011-046297,A machine translation to Shimakawa.*
(Continued)

*Primary Examiner* — Jean Paul Cass
(74) *Attorney, Agent, or Firm* — Rankin, Hill & Clark LLP

(57) ABSTRACT

A control device (60) of a mobile body (1) calculates a center-of-gravity displacement degree index value representing an estimate of the degree of displacement of the center of gravity of the operator in the lateral direction from a prescribed reference position with respect to a vehicle body (2), and determines a control input for an actuator (15) which can cause a moment in the roll direction to act on the vehicle body (2) so as to reduce the degree of displacement of the center of gravity of the operator indicated by the center-of-gravity displacement degree index value. The control device (60) controls the actuator (15) in accordance with the control input.

7 Claims, 45 Drawing Sheets

(51) Int. Cl.
    *B62K 5/10*     (2013.01)
    *B60L 15/20*     (2006.01)
    *B62K 5/01*     (2013.01)
    *B62K 5/05*     (2013.01)
    *B62K 21/18*     (2006.01)

(52) U.S. Cl.
    CPC ......... *B62K 2207/02* (2013.01); *Y02T 10/645* (2013.01); *Y02T 10/72* (2013.01); *Y02T 10/7275* (2013.01)

(56) References Cited

U.S. PATENT DOCUMENTS

| | | | |
|---|---|---|---|
| 9,266,511 B2 * | 2/2016 | Pihl | B60T 13/586 |
| 9,371,061 B2 * | 6/2016 | Kim | B60L 7/18 |
| 2002/0095244 A1 | 7/2002 | Rhode | |
| 2003/0168266 A1 * | 9/2003 | Sasaki | B60K 6/48 |
| | | | 180/65.25 |
| 2005/0080543 A1 | 4/2005 | Lu | |
| 2007/0193803 A1 | 8/2007 | Geiser | |
| 2008/0238005 A1 | 10/2008 | James | |
| 2011/0118941 A1 | 5/2011 | Linker | |
| 2014/0200780 A1 | 7/2014 | Watanabe | |
| 2014/0210253 A1 * | 7/2014 | Okano | B60T 13/146 |
| | | | 303/6.01 |
| 2015/0061312 A1 | 3/2015 | Ishige | |
| 2015/0127240 A1 | 5/2015 | Nozawa | |
| 2015/0291038 A1 * | 10/2015 | Akiyama | B60L 3/102 |
| | | | 701/22 |
| 2015/0367857 A1 * | 12/2015 | Kozuka | B60W 40/13 |
| | | | 701/70 |
| 2016/0039292 A1 * | 2/2016 | Takahashi | B60W 10/08 |
| | | | 701/70 |
| 2016/0280307 A1 * | 9/2016 | Takenaka | B62K 21/00 |
| 2016/0375948 A1 * | 12/2016 | Takenaka | B62K 5/10 |
| | | | 280/5.506 |

FOREIGN PATENT DOCUMENTS

| | | |
|---|---|---|
| EP | 1 997 543 A1 | 12/2008 |
| EP | 2664524 | 11/2013 |
| EP | 2547576 | 6/2014 |
| JP | 59-149878 | 8/1984 |
| JP | 11020725 A * | 1/1999 |
| JP | 2005-088742 | 4/2005 |
| JP | 2006197757 A * | 7/2006 |
| JP | 2011-046297 | 3/2011 |
| JP | 2011-046342 | 3/2011 |
| JP | 2013-060187 | 4/2013 |
| WO | 2009/059099 | 5/2009 |
| WO | 2014/054697 A1 | 4/2014 |
| WO | 2014/106547 | 7/2014 |

OTHER PUBLICATIONS

European Search Report dated Jul. 13, 2016, 6 pages.
European Search Report dated May 17, 2017, 10 pages.
U.S. Office Action dated Oct. 16, 2017 in U.S. Appl. No. 15/184,397, 37 pages.
U.S. Office Action dated Jun. 13, 2018 in U.S. Appl. No. 15/184,397, 15 pages.

* cited by examiner

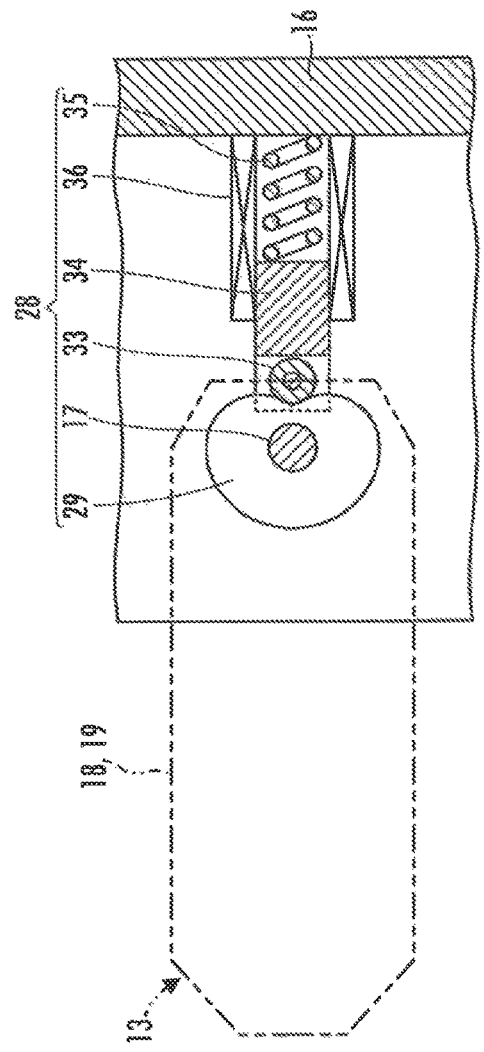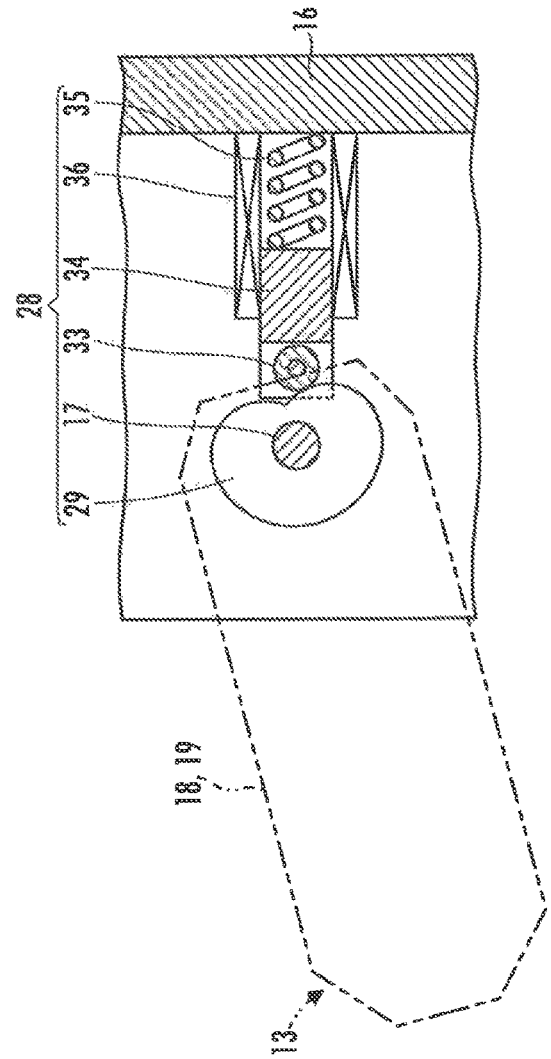

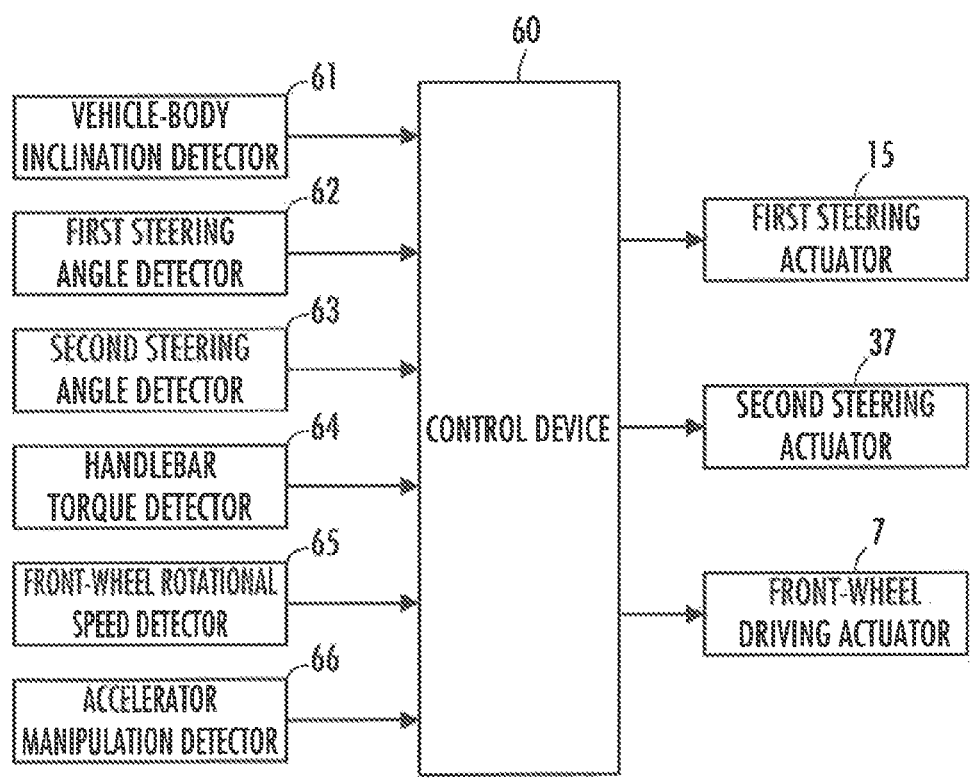

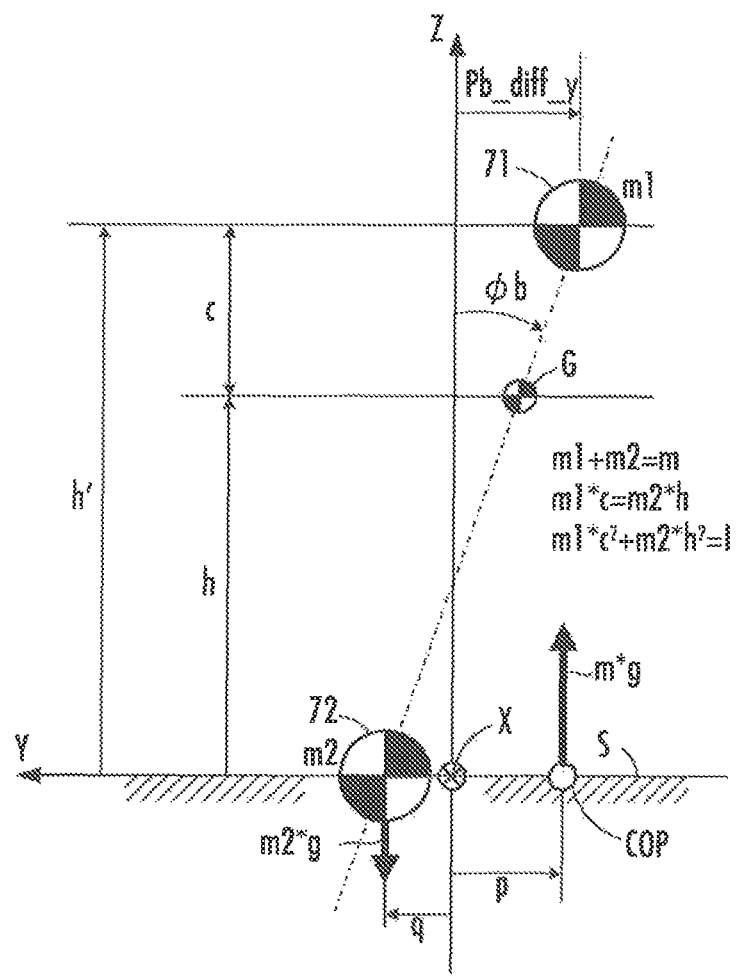

LEAN-WITH

PLANE OF SYMMETRY OF
THE VEHICLE BODY

LEAN-IN

PLANE OF SYMMETRY OF
THE VEHICLE BODY

LEAN-OUT

PLANE OF SYMMETRY OF
THE VEHICLE BODY

SECOND STEERING ANGLE COMMAND DETERMINING SECTION 86

FIRST STEERING ANGLE COMMAND DETERMINING SECTION 103

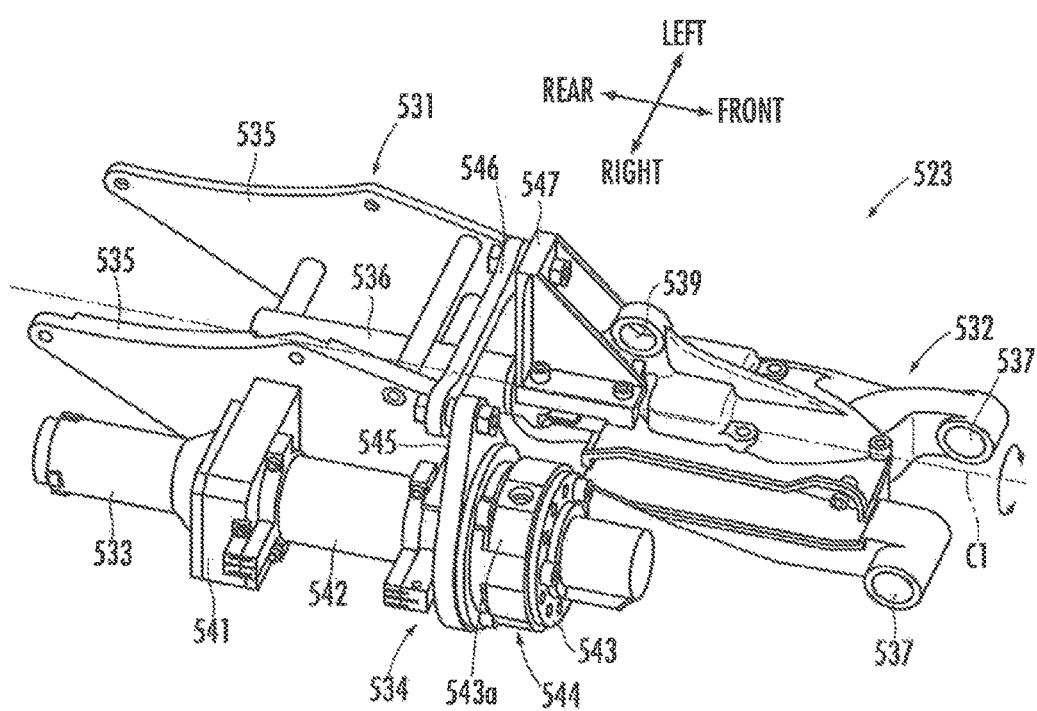

MOBILE BODY

BACKGROUND OF THE INVENTION

Field of the Invention

The present invention relates to mobile body (mobile objects) such as two-wheeled vehicles.

Description of the Related Art

Conventionally, for example, two-wheeled vehicles equipped with an actuator which generates a driving force for steering a front wheel serving as a steered wheel are known, as seen in Japanese Patent Application Laid-Open No. 2013-060187 (Patent Literature 1), Japanese Patent Application Laid-Open No. 2011-046342 (Patent Literature 2), etc.

Further, for example, three-wheeled vehicles having a pair of right and left rear wheels and configured to allow the vehicle body to be rotated in the roll direction by an actuator are known, as seen in Japanese Patent Application Laid-Open No. S59-149878 (Patent Literature 3) and Japanese Patent Application Laid-Open No. 2005-088742 (Patent Literature 4).

SUMMARY OF THE INVENTION

In a mobile body as seen in any of Patent Literatures 1 to 4 above, during straight traveling of the mobile body, an operator normally sits on a seat section of the vehicle body in the state where the center of gravity of the operator is located approximately on the plane of symmetry of the vehicle body (when the vehicle body is considered to be bilaterally symmetrical) orthogonal to the vehicle width direction.

Upon turning of the mobile body, the operator normally shifts his/her weight in the lateral direction of the vehicle body, against the centrifugal force, to thereby lean the vehicle body.

This often causes a transition from the state (so-called "lean-with" state) where the center of gravity of the operator is on the plane of symmetry of the vehicle body to the state (so-called "lean-in" or "lean-out" state) where it is displaced to the right side or left side of the vehicle body.

On the other hand, it is considered to be desirable in a variety of situations that the leaning in the roll direction of the vehicle body according to the shift of the operator's weight is effected quickly in conjunction with the shift of the weight.

The present invention has been accomplished in view of the foregoing, with an object to provide a mobile body which can appropriately assist, with an actuator, the leaning in the roll direction of the vehicle body according to the shift of the operator's weight.

The mobile body of the present invention is a mobile body which includes a vehicle body having a seat section for an operator and freely leaning in a roll direction with respect to a road surface, front and rear wheels disposed spaced apart from each other in a longitudinal direction of the vehicle body, an actuator capable of causing a moment in the roll direction to act on the vehicle body, and a control device configured to control the actuator, wherein the control device includes:

a center-of-gravity displacement degree index value determining section which determines a center-of-gravity displacement degree index value using an observed value of a motional state of the mobile body, the center-of-gravity displacement degree index value representing an estimate of the degree of displacement of the center of gravity of the operator seated on the seat section in a lateral direction of the vehicle body from a prescribed reference position with respect to the vehicle body; and a control input determining section which determines a control input for controlling the actuator in accordance with the determined center-of-gravity displacement degree index value in such a way as to reduce the degree of displacement of the center of gravity of the operator indicated by the determined center-of-gravity displacement degree index value; wherein the control device is configured to control the actuator in accordance with the determined control input (first aspect of the invention).

It should be noted that the mobile body of the present invention is, more specifically, a mobile body which has a characteristic that, in the traveling state of the mobile body, a turning behavior changes in accordance with a shift in the lateral direction of the weight of the operator seated on the seat section, and also has a characteristic that, while the mobile body is being stopped in the state where no driving force is generated from the actuator, when the vehicle body is inclined in the roll direction, the inclination of the vehicle body further increases due to the gravitational force.

In the present specification, the "observed value" of a given state quantity related to the mobile body (such as the inclination angle in the roll direction of the vehicle body) means a detected value of the actual value or an estimate of the state quantity. In this case, the "detected value" means an actual value of the state quantity which is detected by an appropriate sensor. The "estimate" means a value which is estimated using a detected value of at least one state quantity having correlation with the state quantity, on the basis of the correlation, or it means a pseudo estimate which can be considered to coincide with, or almost coincide with, the actual value of the state quantity.

For the "pseudo estimate", for example in the case where it is expected that the actual value of the state quantity can adequately track a desired value of the state quantity, the desired value may be adopted as the pseudo estimate of the actual value of the state quantity.

Further, the "roll direction" means the direction about the axis in the longitudinal direction of the vehicle body.

According to the first aspect of the invention, the control input determining section determines the control input for controlling the actuator in accordance with the center-of-gravity displacement degree index value, in such a way as to reduce the degree of displacement of the center of gravity of the operator indicated by the center-of-gravity displacement degree index value.

Therefore, in the first aspect of the invention, the actuator is controlled such that, in the case where the center of gravity of the operator is displaced from the prescribed reference position by the operator's shift of his/her weight, a moment in the roll direction which reduces the degree of such displacement is acted on the vehicle body by the actuation of the actuator.

Accordingly, the leaning in the roll direction of the vehicle body according to the shift of the operator's weight can be assisted appropriately by the actuator.

In the first aspect of the invention, as the actuator, for example an actuator which steers a steered wheel, among the front and rear wheels, so as to cause a ground contact point of the steered wheel to move laterally may be adopted (second invention).

Alternatively, as the actuator, an actuator which moves a center of gravity of the vehicle body so as to cause a moment in the roll direction to act on the vehicle body by a gravitational force acting on the vehicle body may be adopted (third aspect of the invention).

Alternatively, as the actuator, an actuator which causes the vehicle body to swing in the roll direction with respect to the road surface may be adopted (fourth aspect of the invention).

According to the second through fourth aspects of the invention, the actuator becomes the one which can cause a moment in the roll direction to appropriately act on the vehicle body.

It should be noted that the actuator in the first aspect of the invention may have at least two functions among the function as the actuator in the second aspect of the invention, the function as the actuator in the third aspect of the invention, and the function as the actuator in the fourth aspect of the invention.

In the first through fourth aspects of the invention, the observed value of the motional state used in the center-of-gravity displacement degree index value determining section includes, for example, an observed value of an inclination state quantity representing a state of inclination of the vehicle body. In this case, it is preferable that the center-of-gravity displacement degree index value determining section is configured to determine the center-of-gravity displacement degree index value successively, that it includes a function of calculating an estimate of the inclination state quantity through a dynamics computation using the determined center-of-gravity displacement degree index value, and that it is further configured to update the center-of-gravity displacement degree index value based on a deviation between the calculated value of the inclination state quantity and the observed value of the inclination state quantity (fifth aspect of the invention).

According to the fifth aspect of the invention, the center-of-gravity displacement degree index value determining section is configured as an observer. Therefore, the center-of-gravity displacement degree index value determining section can determine the center-of-gravity displacement degree index value to conform to the actual degree of displacement of the center of gravity of the operator. Consequently, it is possible to improve the tracking of the tilting of the vehicle body according to the shift of the operator's weight.

In the fifth aspect of the invention, it may be possible to adopt, as the dynamics computation carried out by the center-of-gravity displacement degree index value determining section, a dynamics computation based on a dynamic model which expresses dynamics of the mobile body by, for example, dynamics of a mass system formed of an inverted pendulum mass point and a contact ground surface mass point, the inverted pendulum mass point moving in a horizontal direction above a contact ground surface with which the mobile body comes into contact, in accordance with a change of an inclination angle in the roll direction of the vehicle body and a change of a steering angle of the steered wheel, the contact ground surface mass point moving horizontally on the contact ground surface with which the mobile body comes into contact, in accordance with the change of the steering angle of the steered wheel and independently of the change of the inclination angle in the roll direction of the vehicle body (sixth aspect of the invention).

It should be noted that the ground surface means the horizontal surface with which the front and rear wheels of the mobile body come into contact.

According to the sixth aspect of the invention, it is possible to improve the reliability of the estimate of the inclination state quantity by the dynamics computation described above.

In the sixth aspect of the invention, a moving velocity of the inverted pendulum mass point, for example, may be adopted as the inclination state quantity.

Alternatively, in the fifth aspect of the invention, it may also be possible to adopt, as the dynamics computation carried out by the center-of-gravity displacement degree index value determining section, a dynamics computation based on a dynamic model which expresses dynamics of the mobile body by, for example, dynamics of a system formed of a mass point located at an overall center of gravity of the mobile body and inertia in a direction about an axis in the longitudinal direction of the mobile body (seventh aspect of the invention).

According to the seventh aspect of the invention, it is possible to make the dynamics computation relatively simple.

It should be noted that in the seventh aspect of the invention, an inclination angular velocity in the roll direction of the vehicle body, for example, may be adopted as the inclination state quantity.

In the first through seventh aspects of the invention, a position on the plane of symmetry of the vehicle body may be adopted as the prescribed reference position related to the position of the center of gravity of the operator (eighth aspect of the invention).

According to the eighth aspect of the invention, divergence of the center of gravity of the operator from a position on the plane of symmetry of the vehicle body (position of the center of gravity of the operator in the so-called "lean-with" state) can be prevented. That is, the state of the mobile body and the operator can be readily kept in the lean-with state or a state close thereto.

In the first through eighth invention, the control input determining section is preferably configured to determine the control input such that sensitivity of a change in the control input with respect to a change in the center-of-gravity displacement degree index value becomes lower as a traveling speed of the mobile body is higher (ninth aspect of the invention).

This can improve the tracking of the tilting of the vehicle body to the shift of the operator's weight in a low-speed range where the mobile body is traveling at a low speed. On the other hand, in a high-speed range where the mobile body is traveling at a high speed, the operator can readily keep the state where his/her center of gravity is displaced intentionally from the aforesaid prescribed reference position.

Accordingly, the tracking of the tilting of the vehicle body to the shift of the operator's weight can be made to conform to the traveling speed of the mobile body.

Further, in the fourth aspect of the invention in which the actuator is the one which causes the vehicle body to swing in the roll direction with respect to the road surface, it is preferable that the control device further includes a steering force estimating section which estimates a steering force applied to a steered wheel, among the front and rear wheels, as the operator seated on the seat section manipulates a handle for steering the steered wheel, and that the control input determining section is configured to determine the control input in accordance with the center-of-gravity displacement degree index value and the estimated steering force (tenth aspect of the invention).

According to this configuration, the tilting in the roll direction of the vehicle body according to the shift of the operator's weight can be assisted appropriately by the driving force of the actuator. In addition, the vehicle body can be made to tilt to conform to the steering force of the steered wheel that is intended by the operator through manipulation of the handlebar.

BRIEF DESCRIPTION OF THE DRAWINGS

FIGS. 4A and 4B illustrate the operation of a second lock mechanism in the steering mechanism shown in FIG. 2;

FIG. 5 is a block diagram showing the configuration related to the control of the mobile body in FIG. 1;

FIG. 6 illustrates a two-mass-point model for use in control of a mobile body.

FIG. 45 is a perspective view showing the configuration of a roll driving mechanism included in the mobile body in FIG. 44.

DESCRIPTION OF THE PREFERRED EMBODIMENTS

First Embodiment

A first embodiment of the present invention will be described below with reference to FIGS. 1 to 19.

Figure 1:
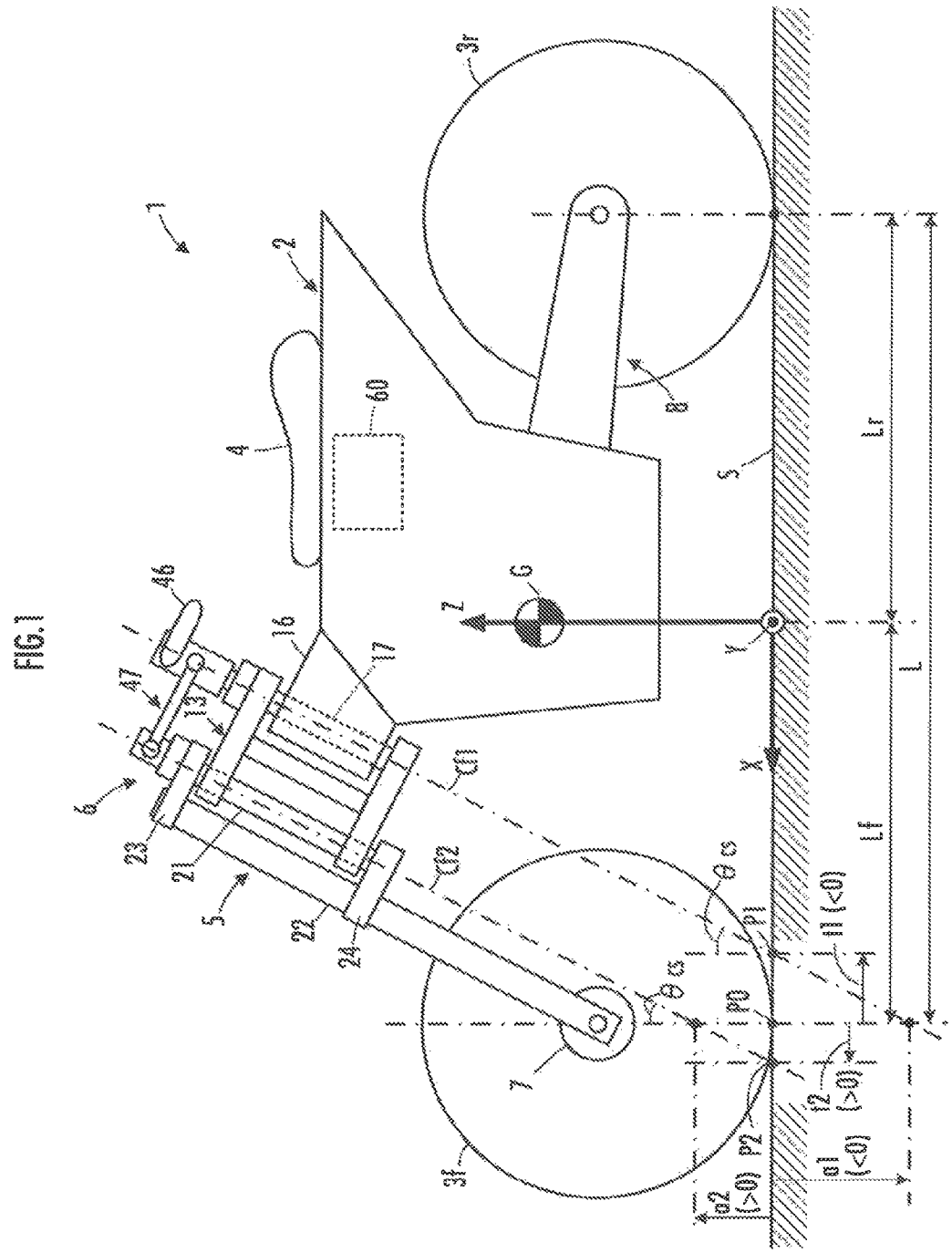
FIG. 1 is a side view showing a schematic configuration of a mobile body (two-wheeled vehicle) in the first, second, third, or fourth embodiment of the present invention.

Referring to FIG. 1, a mobile body (mobile vehicle) 1 of the present embodiment is a straddle-ridden two-wheeled vehicle which includes a vehicle body 2, and a front wheel 3f and a rear wheel 3r arranged spaced apart from each other in the longitudinal direction of the vehicle body 2. Hereinafter, the mobile body 1 will be referred to as "two-wheeled vehicle 1".

The vehicle body 2 is provided with a seat section 4 for an operator (rider). In the present embodiment, the seat section 4 is a seat for the operator (rider) to sit astride.

At the front portion of the vehicle body 2, a front-wheel support mechanism 5 for pivotally supporting the front wheel 3f is mounted through the intermediary of a steering mechanism 6. The front wheel 3f is pivotally supported by the front-wheel support mechanism 5, via bearings or the like, such that the front wheel 3f can rotate about its axle centerline (rotational axis of the front wheel 3f).

As the front-wheel support mechanism 5, one having the structure similar to that of the front-wheel support mechanism of a typical motorcycle, for example, may be adopted. The front-wheel support mechanism 5 illustrated in the figure has a front fork 22 which includes a damper (not shown), for example. The front wheel 3f is pivotally supported at the lower end of the front fork 22.

In the present embodiment, a front-wheel driving actuator 7 for rotatively driving the front wheel 3f about its axle centerline is attached to the axle of the front wheel 3f. The front-wheel driving actuator 7 has the function as a power engine which generates a thrust force for the two-wheeled vehicle 1. In the present embodiment, the front-wheel driving actuator 7 is made up, for example, of an electric motor (with a speed reducer).

Supplementally, the front-wheel driving actuator 7 may be a hydraulic actuator, for example, instead of the electric motor, or it may be made up of an internal combustion engine. Further, the front-wheel driving actuator 7 may be mounted to the vehicle body 2 at a position apart from the axle of the front wheel 3f, and the front-wheel driving actuator 7 and the axle of the front wheel 3f may be connected by an appropriate power transmission device.

At the rear portion of the vehicle body 2, a rear-wheel support mechanism 8 for pivotally supporting the rear wheel 3r is mounted. The rear wheel 3r is pivotally supported by the rear-wheel support mechanism 8, via bearings or the like, such that the rear wheel 3r can rotate about its axle centerline (rotational axis of the rear wheel 3r).

As the rear-wheel support mechanism 8, one having the structure similar to that of the rear-wheel support mechanism of a typical motorcycle (such as a suspension mechanism including a swing arm, coil spring, damper, and so on), for example, may be adopted. In FIG. 1, the rear-wheel support mechanism 8 is simplified and shown schematically.

Supplementally, the front-wheel support mechanism 5 and the rear-wheel support mechanism 8 are not limited to those of a typical motorcycle. Various kinds of structures may be adopted for the front-wheel support mechanism 5 and the rear-wheel support mechanism 8.

The steering mechanism 6 interposed between the vehicle body 2 and the front-wheel support mechanism 5 is a mechanism for steering the front wheel 3f which is a steered wheel of the two-wheeled vehicle 1. It should be noted that FIG. 1 shows only the main configuration of the steering mechanism 6.

In the present embodiment, the steering mechanism 6 (the specific structure of which will be described later) is configured to have two steering axes of a first steering axis Cf1 and a second steering axis Cf2 as the steering axes of the front wheel 3f (rotational axes for steering the front wheel 3f). The front-wheel support mechanism 5 is rotatable, together with the front wheel 3f, about the respective axes of the first steering axis Cf1 and the second steering axis Cf2. The front wheel 3f is steered through such rotation.

The first steering axis Cf1 and the second steering axis Cf2 are arranged such that they are tilted backward in a basic posture state (posture state shown in FIG. 1) of the two-wheeled vehicle 1, and such that a trail t1 based on the first steering axis Cf1 is smaller than a trail t2 based on the second steering axis Cf2 and at least the trail t1 based on the first steering axis Cf1 among the trails t1 and t2 takes a value equal to or less than a prescribed positive value.

Further, in the present embodiment, the first steering axis Cf1 and the second steering axis Cf2 are parallel to each other in the basic posture state of the two-wheeled vehicle 1. Accordingly, the inclination angles (on the acute side) of the first steering axis Cf1 and the second steering axis Cf2 with respect to the vertical direction, or, the caster angles θcs are set to be the same as each other.

The basic posture state of the two-wheeled vehicle 1 is, as shown in FIG. 1, the state in which the two-wheeled vehicle 1 is stationary in a straight-ahead posture (posture when traveling straight ahead) on a flat ground surface S. More specifically, the basic posture state is the state in which the front wheel 3f and the rear wheel 3r are standing still in the upright posture on the flat ground surface S and in which the axle centerlines of the front wheel 3f and the rear wheel 3r extend in parallel with each other in the horizontal direction orthogonal to the longitudinal direction of the vehicle body 2.

The steering axis (first steering axis Cf1 or second steering axis Cf2) being tilted backward means that the steering axis extends obliquely with respect to the vertical direction and the horizontal direction such that the steering axis has its upper portion located rearward relative to its lower portion. In the description of the present embodiment, the caster angle based on such a steering axis tilted backward is defined as a positive angle. Therefore, the caster angles θcs based on the first steering axis Cf1 and the second steering axis Cf2 are positive angles.

Further, the trail t1 based on the first steering axis Cf1 is a distance from a ground contact point P0 of the front wheel 3f of the two-wheeled vehicle 1 in the basic posture state (specifically, the point of intersection of a vertical line passing through the center of the axle of the front wheel 3f and the ground surface S) to the point of intersection P1 of the first steering axis Cf1 and the ground surface S. The trail t2 based on the second steering axis Cf2 is a distance from the ground contact point P0 of the front wheel 3f to the point of intersection P2 of the second steering axis Cf2 and the ground surface S.

In this case, in the description of the present embodiment, in terms of polarity of the trail (t1 or t2) based on a steering axis (first steering axis Cf1 or second steering axis Cf2), the trail in the case where the point of intersection (P1 or P2) of the steering axis and the ground surface S lies in front of the ground contact point P0 of the front wheel 3f is defined as a positive value, and the trail in the case where the point of intersection (P1 or P2) of the steering axis and the ground surface S lies behind the ground contact point P0 of the front wheel 3f is defined as a negative value.

In the present embodiment, as shown in FIG. 1 for example, the first steering axis Cf1 and the second steering axis Cf2 are arranged such that the trail t1 based on the first steering axis Cf1 takes a negative value and the trail t2 based on the second steering axis Cf2 takes a positive value (such that t1<0<t2).

It has been found through the studies conducted by the present inventors and others that, in the case of controlling the posture (inclination angle) in the roll direction of the vehicle body 2 to a desired posture by steering the front wheel 3f, it is preferable that the trail based on a steering axis of the front wheel 3f take a value equal to or smaller than a prescribed positive value in order to effectively produce a force (moment) for restoring the posture in the roll direction of the vehicle body 2 according to the steering of the front wheel 3f.

For this reason, in the present embodiment, the trail t1 based on the first steering axis Cf1 is set to a negative value, as described above.

The prescribed positive value for the trail is a value which is determined in accordance with, for example, the height of the center of gravity of the two-wheeled vehicle 1, the mass of the two-wheeled vehicle 1, the moment of inertia about an axis in the longitudinal direction passing through the center of gravity of the two-wheeled vehicle 1, the horizontal distances from the center of gravity to the front wheel 3f and to the rear wheel 3r, and the radii of curvature of the cross sections of the front wheel 3f and the rear wheel 3r. The prescribed value is described in detail in, for example, Japanese Patent Applications Laid-Open Nos. 2014-091386 and 2014-091385. Therefore, the detailed description of the prescribed value will be omitted herein.

It should be noted that the trail t1 based on the first steering axis Cf1 may be set to a positive value of not larger than the prescribed value, or to zero.

Figure 2:
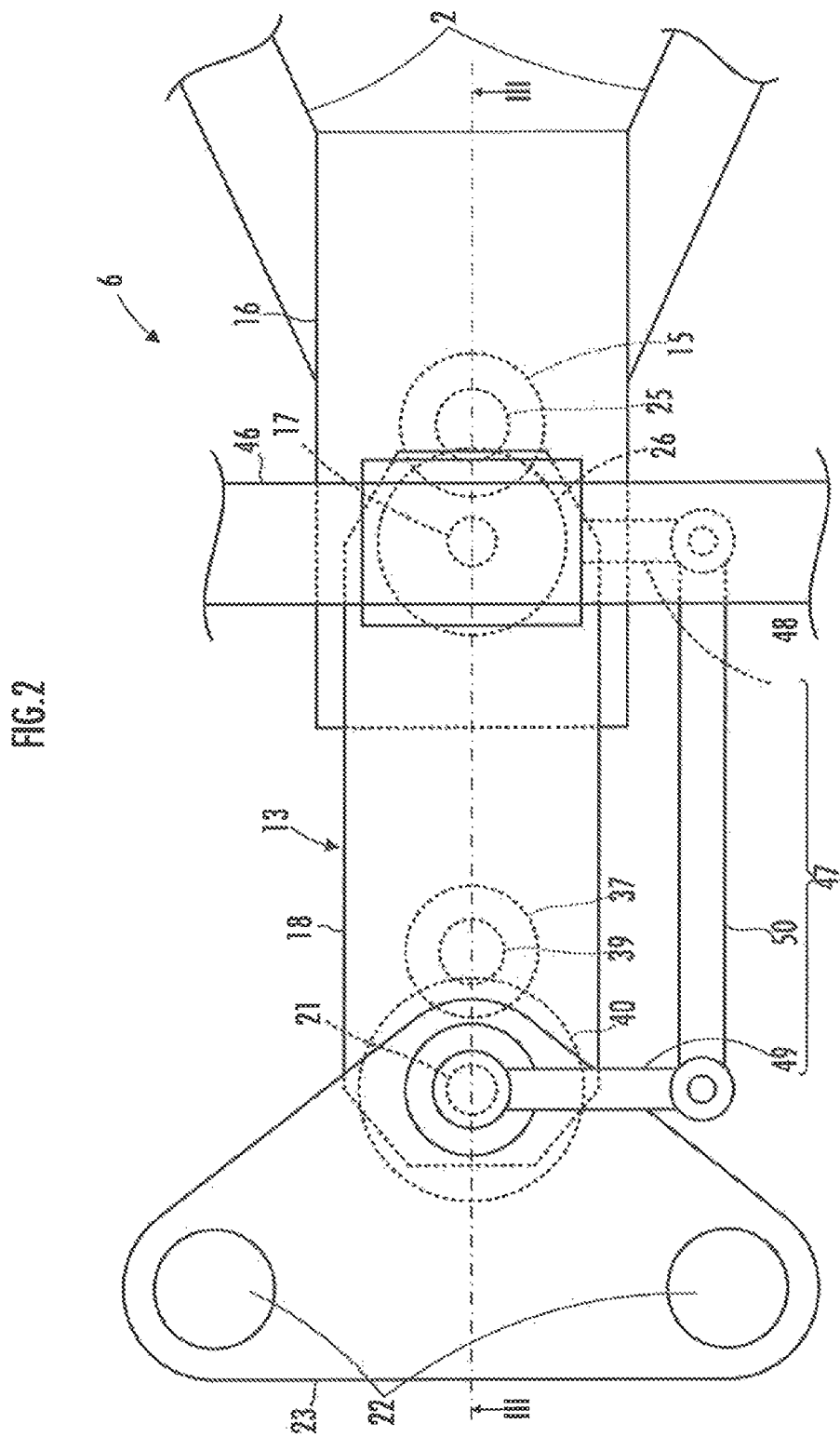
FIG. 2 is a plan view of a steering mechanism of the mobile body in FIG. 1.
Figure 3:
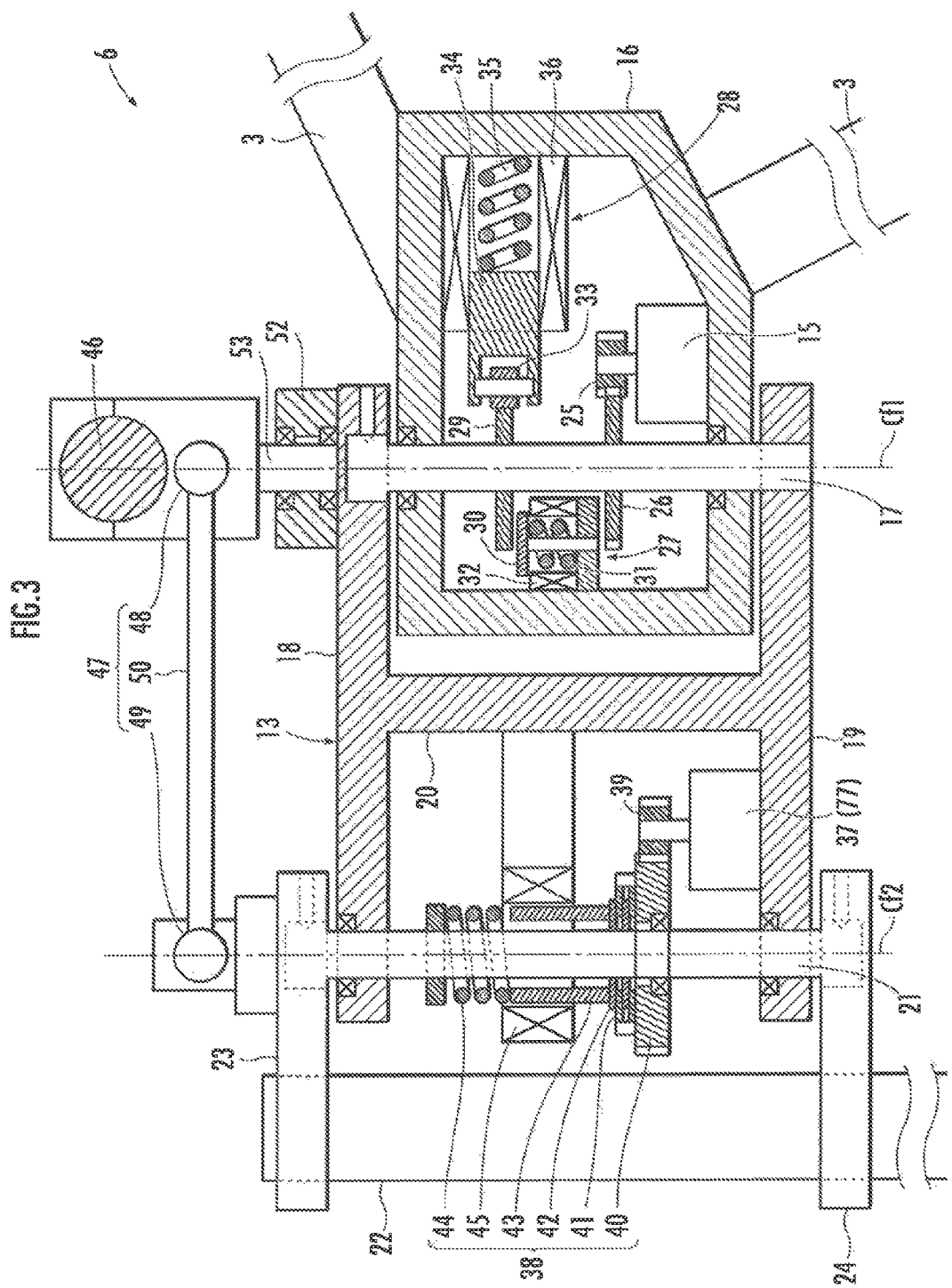
FIG. 3 is a cross-sectional view taken along the line III-III in FIG. 2.

An example of the specific configuration of the steering mechanism 6 will now be described with reference to FIGS. 2 and 3. As shown in FIGS. 2 and 3, the steering mechanism 6 has a steering shaft plate 13 which is pivotally supported, via a first steering shaft 17, so as to be rotatable with respect to the vehicle body 2. The front-wheel support mechanism 5 is pivotally supported, via a second steering shaft 21, so as to be rotatable with respect to this steering shaft plate 13.

The first steering shaft 17 is supported in a freely rotatable manner by a housing 16 secured to the vehicle body 2. Specifically, the first steering shaft 17 penetrates from an upper side to a lower side of the housing 16, through its inner space. The first steering shaft 17 is freely rotatably supported by the housing 16, via bearings or the like, at its portions penetrating the upper side and the lower side of the housing 16. The center axis (rotational axis) of this first steering shaft 17 corresponds to the aforesaid first steering axis Cf1.

The steering shaft plate 13 is made up of an upper plate 18 and a lower plate 19 which extend in the direction perpendicular to the first steering shaft 17, and a coupling plate 20 which couples the upper plate 18 with the lower plate 19. The upper plate 18, the lower plate 19, and the coupling plate 20 have their plate surfaces parallel to the lateral direction of the vehicle body 2. The cross sections of the plates perpendicular to the lateral direction form an H shape, as shown in FIG. 3.

The end portions of the first steering shaft 17 projecting upward and downward from the housing 16 are secured to the rear end portions of the upper plate 18 and the lower plate 19, respectively. In this manner, the steering shaft plate 13 is supported via the housing 16 and the first steering shaft 17, so as to be rotatable about the center axis (first steering axis Cf1) of the first steering shaft 17, with respect to the vehicle body 2.

The second steering shaft 21 is freely rotatably supported by the front end portions of the upper plate 18 and the lower plate 19 via bearings or the like. The second steering shaft 21 extends from the upper side of the upper plate 18 to the lower side of the lower plate 19. The center axis (rotational axis) of this second steering shaft 21 corresponds to the aforesaid second steering axis Cf2.

At the upper portion of the front fork 22 of the front-wheel support mechanism 5, a top bridge 23 and a bottom bridge 24 are provided, with their front side portions secured to the front fork 22. The both end portions of the second steering shaft 21 projecting upward from the upper plate 18 and downward from the lower plate 19 are secured to the rear side portions of the top bridge 23 and the bottom bridge 24, respectively.

With this configuration, the front-wheel support mechanism 5 and the front wheel 3f are supported via the second steering shaft 21, so as to be rotatable about the center axis (second steering axis Cf2) of the second steering shaft 21, with respect to the steering shaft plate 13.

Further, the front-wheel support mechanism 5 and the front wheel 3f are rotatable about the first steering axis Cf1 through the rotation of the steering shaft plate 13 (about the first steering axis Cf1) with respect to the vehicle body 2.

The steering mechanism 6 further includes, inside the housing 16; a first steering actuator 15 which rotatively drives the steering shaft plate 13 about the first steering axis Cf1; a first lock mechanism 27 which is switchable between a locked state, in which the steering shaft plate 13 is fixed to the vehicle body 2, and an unlocked state, in which the fixing is released; and a second lock mechanism 28 which is switchable between a locked state, in which the steering shaft plate 13 is fixed to the vehicle body 2 in a neutral position of the steering shaft plate 13, and an unlocked state, in which the fixing is released.

It should be noted that the neutral position of the steering shaft plate 13 corresponds to the rotational position of the steering shaft plate 13 in the aforesaid basic posture state of the two-wheeled vehicle 1 (or a non-steered state of the front wheel 3f).

In the present embodiment, the first steering actuator 15 is made up, for example, of an electric motor. The first steering actuator 15 transmits a rotative driving force to the first steering shaft 17 via a first pinion 25, which is secured to an output shaft of the first steering actuator 15, and a first gear 26, which is engaged with the first pinion 25 and secured to the first steering shaft 17.

It should be noted that the first steering actuator 15 may be made up of a hydraulic actuator.

The first lock mechanism 27 includes: a brake disc 29 which is secured perpendicularly to the first steering shaft 17, a brake pad 30 which is supported so as to be movable between an engaged position where it is engaged with the brake disc 29 and a disengaged position where the engagement is released, a coil spring 31 which urges the brake pad 30 toward the engaged position, and an electromagnet 32 which causes the brake pad 30 to move to the disengaged position against the biasing force of the coil spring 31.

In this first lock mechanism 27, when the electromagnet 32 is not energized, the brake pad 30 is placed in the engaged position by the coil spring 31. At this time, the brake pad 30 is engaged with the brake disc 29, so the first lock mechanism 27 attains the locked state.

When the electromagnet 32 is energized, the brake pad 30 moves to the disengaged position against the biasing force of the coil spring 31. At this time, the brake pad 30 is disengaged from the brake disc 29, so the first lock mechanism 27 attains the unlocked state.

In the present embodiment, the brake disc 29 also has the function as a cam. The second lock mechanism 28 includes: the brake disc 29 serving as a cam, a roller 33 which rolls along a cam face on the outer periphery of the brake disc 29, an iron core 34 which pivotally supports the roller 33 in a freely rotatable manner and which is guided movably in the direction orthogonal to the first steering shaft 17, a coil spring 35 which urges the iron core 34 in the direction in which the roller 33 pushes the cam face, and an electromagnet 36 for attracting the iron core 34 in the direction opposite to the biasing force applied by the coil spring 35.

The operations of the second lock mechanism 28 will be described with reference to FIGS. 4A and 4B. In FIG. 4A, the two-dot chain line shows the upper plate 18 and the lower plate 19 in the state where the steering shaft plate 13 is in the neutral position. In FIG. 4B, the two-dot chain line shows the upper plate 18 and the lower plate 19 when the steering shaft plate 13 has been rotated from the neutral position.

As shown in FIGS. 4A and 4B, the brake disc 29 comprises a heart-shaped plate cam. The second lock mechanism 28 is configured such that, when the steering shaft plate 13 is in the neutral position, the roller 33 is positioned in the dent of the heart-shaped cam face of the brake disc 29, as shown in FIG. 4A.

When the electromagnet 36 is not energized, the roller 33 at the tip end of the iron core 34 is pressed against the cam face of the brake disc 29 by the biasing force of the coil spring 35. As a result, the steering shaft plate 13 is urged toward the neutral position and is maintained in the neutral position. This state corresponds to the locked state of the second lock mechanism 28.

From this locked state, when the steering shaft plate 13 is rotated as shown in FIG. 4B, the iron core 34 is moved in the direction away from the first steering shaft 17 by the cam face of the brake disc 29 via the roller 33. At this time, the electromagnet 36 is energized for permitting such a movement. With this energization, the iron core 34 is attracted against the biasing force of the coil spring 35. As a result, the biasing force for making the steering shaft plate 13 return to the neutral position is reduced or cancelled. This state corresponds to the unlocked state of the second lock mechanism 28.

For causing the steering shaft plate 13 to return to the neutral position, the energization of the electromagnet 36 is stopped. The biasing force of the coil spring 35 is transmitted again to the cam face of the brake disc 29. As a result, the steering shaft plate 13 is urged toward the neutral position and is held in the neutral position.

Returning to FIGS. 2 and 3, the steering mechanism 6 further includes: a second steering actuator 37 which rotatively drives the front-wheel support mechanism 5 about the second steering axis Cf2, and a clutch mechanism 38 which is switchable between a transmission-enabled state in which the driving force of the second steering actuator 37 is transmitted to the second steering shaft 21, and a transmission-interrupted state in which the transmission is interrupted. The second steering actuator 37 and the clutch mechanism 38 are arranged at the front side of the steering shaft plate 13, between the upper plate 18 and the lower plate 19.

In the present embodiment, the second steering actuator 37 is made up, for example, of an electric motor. The second steering actuator 37 transmits the rotative driving force to the second steering shaft 21, via a pinion 39 secured to an output shaft of the second steering actuator 37, a gear 40 supported freely rotatably on the second steering shaft 21, and the clutch mechanism 38 in this order.

It should be noted that the second steering actuator 37 may be made up of a hydraulic actuator.

The clutch mechanism 38 includes: a clutch plate 41 which is secured to the gear 40, a clutch plate 42 which is secured to the second steering shaft 21, an iron core 43 of a cylindrical shape which is fitted onto the second steering shaft 21 so as to be movable along the second steering shaft 21, a coil spring 44 which urges the iron core 43 in the direction (transmission-interrupting direction) of separating the clutch plate 42 from the clutch plate 41, and an electromagnet 45 which moves the iron core 43 against the biasing force of the coil spring 44 so as to bring the clutch plate 42 into pressure contact with the clutch plate 41.

In this clutch mechanism 38, when the electromagnet 45 is not energized, the clutch plate 42 is separated from the clutch plate 41 by the biasing force of the coil spring 44. In this state, the rotative driving force is not transmitted from the second steering actuator 37 to the second steering shaft 21. This state corresponds to the transmission-interrupted state of the clutch mechanism 38.

When the electromagnet 45 is energized, the clutch plates 42 and 41 are in pressure contact with each other against the biasing force of the coil spring 44. In this state, the rotative driving force is transmitted from the second steering actuator 37 to the second steering shaft 21 via the clutch plates 42 and 41. This state corresponds to the transmission-enabled state of the clutch mechanism 38.

The steering mechanism 6 further includes a handlebar 46 used by an operator of the two-wheeled vehicle 1 for steering the front wheel 3f, and a handlebar link mechanism 47 which couples the handlebar 46 with the front-wheel support mechanism 5.

The handlebar 46 extends generally in the vehicle width direction of the two-wheeled vehicle 1. The handlebar 46 has its central portion secured to a handlebar shaft 53 which is pivotally supported in a freely rotatable manner via a bearing 52 on the upper plate 18 of the steering shaft plate 13. In the present embodiment, the handlebar shaft 53 is arranged such that the handlebar axis as its center axis is collinear with the first steering axis Cf1.

Although not shown in detail in the figure, this handlebar 46 is equipped with an accelerator grip, brake lever, turn signal switch, and so on, as with the handlebar of a typical motorcycle.

The handlebar link mechanism 47 is operable, in response to a manipulation of rotating the handlebar 46 about the handlebar axis, to transmit the rotative manipulation of the handlebar 46 to the front-wheel support mechanism 5 so as to cause the front-wheel support mechanism 5 to rotate about the second steering axis Cf2.

Specifically, the handlebar link mechanism 47 includes: a first lever 48 which is coupled to the handlebar shaft 53 so as to rotate about the handlebar axis in an integrated manner with the handlebar 46, a second lever 49 which is attached to the top bridge 23 so as to rotate about the second steering axis Cf2 in an integrated manner with the top bridge 23, and a link 50 which couples the first lever 48 with the second lever 49.

The link 50 extends in the direction orthogonal to the second steering axis Cf2. The link 50 is pivotally supported so as to be freely swingable about axes parallel to the first steering axis Cf1 with respect to the first lever 48 and the second lever 49. It is configured such that the joint between the link 50 and the first lever 48 and the joint between the link 50 and the second lever 49 have a certain distance from the handlebar axis (first steering axis Cf1) and the second steering axis Cf2, respectively.

With the handlebar link mechanism 47 configured as described above, when the handlebar 46 is rotatively manipulated about the handlebar axis, a rotative force about the second steering axis Cf2 is applied to the front-wheel support mechanism 5 via the handlebar link mechanism 47. This enables the steering of the front wheel $3f$ according to the rotative manipulation of the handlebar 46.

In the two-wheeled vehicle 1 configured as described above, steering the front wheel $3f$ about the first steering axis Cf1 or the second steering axis Cf2 can cause a moment in the roll direction to act on the vehicle body 2.

The two-wheeled vehicle 1 of the present embodiment further includes the configuration shown in FIG. 5 as the configuration for operation control.

Specifically, as shown in FIG. 5, the two-wheeled vehicle 1 includes a control device 60 which carries out control processing for controlling the operations of the aforesaid first steering actuator 15, second steering actuator 37, and front-wheel driving actuator 7.

The two-wheeled vehicle 1 further includes, as sensors for detecting various kinds of state quantities necessary for the control processing in the control device 60, a vehicle-body inclination detector 61 for detecting an inclination angle in the roll direction of the vehicle body 2, a first steering angle detector 62 for detecting a first steering angle which is the steering angle (rotational angle) of the front wheel $3f$ about the first steering axis Cf1, a second steering angle detector 63 for detecting a second steering angle which is the steering angle (rotational angle) of the front wheel $3f$ about the second steering axis Cf2, a handlebar torque detector 64 for detecting a handlebar torque which is the steering force of the front wheel $3f$ (rotative driving force about the second steering axis Cf2) applied via the handlebar 46 by an operator, a front-wheel rotational speed detector 65 for detecting a rotational speed (angular velocity) of the front wheel $3f$, and an accelerator manipulation detector 66 for detecting an accelerator manipulated variable which is the manipulated variable (rotational amount) of the accelerator grip of the handlebar 46. It should be noted that illustration of these detectors 61 to 66 is omitted in FIGS. 1 to 4.

The control device 60 is an electronic circuit unit made up of a CPU, RAM, ROM, interface circuit, and so on. The control device 60 is mounted on an appropriate portion of the vehicle body 2. The control device 60 receives outputs (detection signals) from the respective detectors 61 to 66 described above.

The control device 60 may be made up of a plurality of mutually communicable electronic circuit units. In this case, the electronic circuit units constituting the control device 60 may be disposed in places distant from one another.

The vehicle-body inclination detector 61 is made up of an acceleration sensor and a gyro sensor (angular velocity sensor), for example. The vehicle-body inclination detector 61 is mounted on an appropriate portion of the vehicle body 2. In this case, the control device 60 carries out prescribed measurement and computation processing, such as computation by a strapdown system, on the basis of the outputs from the acceleration sensor and the gyro sensor, to thereby measure the inclination angle in the roll direction (more specifically, inclination angle in the roll direction with respect to the vertical direction (direction of gravitational force)) of the vehicle body 2.

In the description of the present embodiment, the inclination angle in the roll direction of the vehicle body 2 in the basic posture state of the two-wheeled vehicle 1 is zero. The positive direction of the inclination angle in the roll direction corresponds to the direction that makes the vehicle body 2 lean to the right (in the clockwise direction) as the two-wheeled vehicle 1 is seen from behind.

The first steering angle detector 62 and the second steering angle detector 63 are each made up, for example, of a rotary encoder or a potentiometer. In this case, the first steering angle detector 62 is attached to the first steering shaft 17 or the first steering actuator 15, for example, so as to output a signal corresponding to the rotation of the first steering shaft 17. Similarly, the second steering angle detector 63 is attached to the second steering shaft 21 or the second steering actuator 37, for example, so as to output a signal corresponding to the rotation of the second steering shaft 21.

In the description of the present embodiment, the first and second steering angles of the front wheel $3f$ are both zero in the basic posture state of the two-wheeled vehicle 1 when the front wheel $3f$ is in a non-steered state. The positive direction of the first steering angle corresponds to the direction that makes the front wheel $3f$ rotate counterclockwise about the first steering axis Cf1 as the two-wheeled vehicle 1 is seen from above. The positive direction of the second steering angle corresponds to the direction that makes the front wheel $3f$ rotate counterclockwise about the second steering axis Cf2 as the two-wheeled vehicle 1 is seen from above.

The handlebar torque detector 64 is made up, for example, of a force sensor or a torque sensor disposed in a power transmission system between the handlebar 46 and the second steering shaft 21 so as to output a signal corresponding to the handlebar torque that is applied from the handlebar 46 side to the second steering shaft 21.

In the description of the present embodiment, the positive direction of the handlebar torque corresponds to the direction that makes the front wheel $3f$ rotate counterclockwise about the second steering axis Cf2 as the two-wheeled vehicle 1 is seen from above.

The front-wheel rotational speed detector 65 is made up, for example, of a rotary encoder attached to the axle of the front wheel $3f$ so as to output a signal corresponding to the rotational speed of the front wheel $3f$.

The accelerator manipulation detector 66 is made up, for example, of a rotary encoder or a potentiometer built in the handlebar 46 so as to output a signal corresponding to the manipulated variable (rotational amount) of the accelerator grip.

The functions of the above-described control device 60 will be described further below. In the following description, an XYZ coordinate system, shown in FIG. 1, is used. This XYZ coordinate system is a coordinate system in which, in the basic posture state of the two-wheeled vehicle 1, the vertical direction (up-and-down direction) is defined as the Z-axis direction, the longitudinal direction (front-back direction) of the vehicle body 2 as the X-axis direction, the lateral direction (right-left direction) of the vehicle body 2 as the Y-axis direction, and a point on the ground surface S immediately beneath the overall center of gravity G of the two-wheeled vehicle 1 as the origin. The positive directions of the X, Y, and Z axes are frontward, leftward, and upward, respectively.

In the present embodiment, for controlling the posture (inclination angle) in the roll direction of the two-wheeled vehicle 1, a two-mass-point model is used which describes the dynamic behavior of the two-wheeled vehicle 1 (behavior related to the inclination in the roll direction of the vehicle body 2) using two mass points. The two-mass-point model is described in detail by the present applicant in, for example, Japanese Patent Applications Laid-Open Nos. 2014-091386 and 2014-091385. Therefore, in the present embodiment, the two-mass-point model will be described only in brief.

As shown in FIG. 6, the two-mass-point model is made up of a mass point 71, which moves horizontally in the Y-axis direction above a ground surface S with which the two-wheeled vehicle 1 comes into contact, in accordance with the change in inclination angle $\phi b$ in the roll direction of the vehicle body 2 and the steering of the front wheel 3$f$, and a ground surface mass point 72, which moves horizontally in the Y-axis direction on the ground surface S in accordance with the steering of the front wheel 3$f$ and independently of the inclination angle $\phi b$ in the roll direction of the vehicle body 2. The mass point 71 exhibits a behavior similar to that of the mass point of an inverted pendulum, and it is hereinafter called the inverted pendulum mass point 71.

In this case, the mass m1 and the height h' of the inverted pendulum mass point 71 and the mass m2 of the ground surface mass point 72 are set to satisfy (or almost satisfy) the relationships expressed by the following expressions (1a) to (1c). In the description of the present embodiment, "*" is a sign representing multiplication.

$$m1+m2=m \quad (1a)$$

$$m1*c=m2*h \quad (1b)$$

$$m1*c*c+m2*h*h=I \quad (1c)$$

$$\text{where } c=h'-h \quad (1d)$$

Here, m represents the overall mass of the two-wheeled vehicle 1, h represents the height of the overall center of gravity G of the two-wheeled vehicle 1, and I represents the moment of inertia in the roll direction of the two-wheeled vehicle 1.

The overall mass m of the two-wheeled vehicle 1 is, more specifically, a total of the mass of the two-wheeled vehicle 1 alone and the mass of the operator riding on the two-wheeled vehicle 1. The overall center of gravity G of the two-wheeled vehicle 1 is the center of gravity of the total of the two-wheeled vehicle 1 and the operator riding thereon. The moment of inertia I in the roll direction of the two-wheeled vehicle 1 is the moment of inertia about an axis in the longitudinal direction (parallel to the X axis) that passes through the overall center of gravity G of the two-wheeled vehicle 1.

In the two-mass-point model described above, in the basic posture state of the two-wheeled vehicle 1, the inverted pendulum mass point 71 and the ground surface mass point 72 are on a vertical line passing through the overall center of gravity G (i.e. on the Z axis), in a position at the height h' from the ground surface S and in a position on the ground surface S (at the height of zero from the ground surface S), respectively. The inverted pendulum mass point 71 and the ground surface mass point 72 are on the plane of symmetry of the vehicle body 2 (plane of symmetry when the vehicle body 2 is considered to be bilaterally symmetrical).

In the basic posture state of the two-wheeled vehicle 1, the plane of symmetry of the vehicle body 2 agrees or almost agrees with the rotational plane of the front wheel 3$f$ (plane passing through the center of the axle of the front wheel 3$f$ and orthogonal to the axle centerline of the front wheel 3$f$) or with the rotational plane of the rear wheel 3$r$ (plane passing through the center of the axle of the rear wheel 3$r$ and orthogonal to the axle centerline of the rear wheel 3$r$).

The inverted pendulum mass point 71 moves in the lateral direction (Y-axis direction) at the height h', in accordance with the change in inclination angle $\phi b$ in the roll direction of the vehicle body 2 and the steering of the front wheel 3$f$ (change in first steering angle $\delta f1$ or second steering angle $\delta f2$) from the basic posture state. The ground surface mass point 72 moves in the lateral direction (Y-axis direction) on the ground surface S, in accordance with the steering of the front wheel 3$f$ (change in first steering angle $\delta f1$ or second steering angle $\delta f2$) from the basic posture state, and independently of the change in inclination angle $\phi b$ in the roll direction of the vehicle body 2.

In the case where the position of the center of gravity of the operator of the two-wheeled vehicle 1 is maintained on the plane of symmetry of the vehicle body 2, the positions of the inverted pendulum mass point 71 and the ground surface mass point 72 are held on the plane of symmetry of the vehicle body 2. In this case, the inclination angle in the roll direction of the line segment connecting the inverted pendulum mass point 71 and the ground surface mass point 72 agrees with the inclination angle $\phi b$ in the roll direction of the vehicle body 2.

Further, the dynamic behavior of the inverted pendulum mass point 71 in the two-mass-point model is similar to that of the mass point of the inverted pendulum.

Specifically, the equation of motion (dynamic model) of the inverted pendulum mass point 71 is expressed by the following expression (2).

$$m1*h'*Pb\_diff\_dot2\_y = m1*g*Pb\_diff\_y - Mp - M2 - Mi \quad (2)$$

Here, Pb_diff_y represents the movement amount in the Y-axis direction (hereinafter, referred to as "inverted pendulum mass point lateral movement amount") of the inverted pendulum mass point 71 from the position in the basic posture state of the two-wheeled vehicle 1, Pb_diff_dot2_y represents a second order differential of the inverted pendulum mass point lateral movement amount Pb_diff_y (i.e. the acceleration in the Y-axis direction of the inverted pendulum mass point 71), and g represents a gravitational acceleration constant.

Further, with the point of application on the ground surface S of a resultant force of reaction forces in the vertical direction which act on the front wheel 3$f$ and the rear wheel 3$r$ from the ground surface S (i.e. reaction force against the gravitational force acting on the two-wheeled vehicle 1) being defined as the center of contact pressure or COP, Mp represents a moment (hereinafter, referred to as "roll moment floor reaction force component") which is produced in the roll direction about the origin of the XYZ coordinate system according to that resultant force (=m*g) acting on the COP. M2 represents a moment (hereinafter, referred to as "roll moment ground surface mass point component") which is produced in the roll direction about the origin of the XYZ coordinate system according to the gravitational force (=−m2*g) acting on the ground surface mass point 72. Mi represents a moment (hereinafter, referred to as "roll moment inertial force component") which is produced in the roll direction about the origin of the XYZ coordinate system according to the inertial force accompanying the motion of the two-wheeled vehicle 1.

In the description of the present embodiment, the positive directions of Mp, M2, and Mi are the clockwise direction (direction making the vehicle body 2 lean to the right) when the two-wheeled vehicle 1 is seen from behind (toward the front of the vehicle body 2).

When the amount of movement of the ground surface mass point 72 in the Y-axis direction from the position (at the origin of the XYZ coordinate system) in the basis posture state of the two-wheeled vehicle 1 is denoted as q, the roll moment ground surface mass point component M2 is calculated by the following expression (3).

$$M2 = -m2*g*q \quad (3)$$

It should be noted that the movement amount q in the Y-axis direction of the ground surface mass point 72 is a function value of the first steering angle δf1 and the second steering angle δf2. When the first steering angle δf1 and the second steering angle δf2 are relatively small in magnitude (close to zero), the movement amount q can be obtained approximately by, for example, the following expression (4).

$$q = (a1*\sin(\theta cs)*(\delta f1) + a2*\sin(\theta cs)*(\delta f1+\delta f2))*(Lr/L) \quad (4)$$

Here, a1 represents the height (from the ground surface S) of the point of intersection between the first steering axis Cf1 and a vertical line passing through the center of the axle of the front wheel 3f of the two-wheeled vehicle 1 in the basic posture state, a2 represents the height (from the ground surface S) of the point of intersection between the second steering axis Cf2 and the vertical line passing through the center of the axle of the front wheel 3f of the two-wheeled vehicle 1 in the basic posture state, Lr represents the distance in the longitudinal direction (X-axis direction) between the ground contact point of the rear wheel 3r and the overall center of gravity G of the two-wheeled vehicle 1 in the basic posture state, and L represents the distance in the longitudinal direction (X-axis direction) between the ground contact point of the front wheel 3f and the ground contact point of the rear wheel 3r of the two-wheeled vehicle 1 in the basic posture state.

Further, when the amount of movement of the COP in the Y-axis direction from the position (at the origin of the XYZ coordinate system) of the COP in the basic posture state of the two-wheeled vehicle 1 is denoted as p, the roll moment floor reaction force component Mp is calculated by the following expression (5).

$$Mp = m*g*p \quad (5)$$

It should be noted that the movement amount p in the Y-axis direction of the COP is a function value of the first steering angle δf1 and the second steering angle δf2. When the first steering angle δf1 and the second steering angle δf2 are relatively small in magnitude (close to zero), the movement amount p can be obtained approximately by the following expression (6), for example, using q obtained by the above expression (4).

$$p = (Lr/L)*(Rf*\sin(\theta cs)*(\delta f1+\delta f2)) - q*Rg/h' \quad (6)$$

where $$Rg = (Lr/L)*Rr + (Lr/L)*Rf \quad (7)$$

Here, Rf represents the radius of curvature of the transverse cross-sectional shape of the ground contact part of the front wheel 3f as seen in a cross section (orthogonal to the X-axis direction) including the center of axle and the ground contact point of the front wheel 3f of the two-wheeled vehicle 1 in the basic posture state. Rr represents the radius of curvature of the transverse cross-sectional shape of the ground contact part of the rear wheel 3r as seen in a cross section (orthogonal to the X-axis direction) including the center of axle and the ground contact point of the rear wheel 3r of the two-% heeled vehicle 1 in the basic posture state. Lf represents the distance in the longitudinal direction (X-axis direction) between the ground contact point of the front wheel 3f and the overall center of gravity G of the two-wheeled vehicle 1 in the basic posture state.

The roll moment inertial force component Mi is a moment of the sum of an inertial force component according to a temporal change rate (translational acceleration) of the translational moving velocity (lateral velocity) in the lateral direction (Y-axis direction) of the two-wheeled vehicle 1 which is produced during the traveling of the two-wheeled vehicle 1 in the steered state of the front wheel 3f, and an inertial force component according to the centrifugal force at the time of turning of the two-wheeled vehicle 1.

Therefore, when the lateral velocity, or, the translational moving velocity in the lateral direction (Y-axis direction) of the two-wheeled vehicle 1 (specifically, translational moving velocity in the Y-axis direction of the two-wheeled vehicle 1 at the position of the origin of the aforesaid XYZ coordinate system) is denoted as Voy, its temporal change rate (first order differential) is denoted as Voy_dot, the moving velocity in the longitudinal direction (X-axis direction) of the vehicle body 2 (i.e. the traveling speed of the two-wheeled vehicle 1) is denoted as Vox, and the angular velocity in the yaw direction (about the Z axis) of the vehicle body 2 is denoted as ωz, then the roll moment inertial force component Mi in the two-mass-point model can be obtained by, for example, the following expression (8).

$$Mi = \text{Voy\_dot}*m1*h' + \omega z * Vox*m1*h' \quad (8)$$
$$= (\text{Voy\_dot} + \omega z * Vox)*m1*h'$$

Here, Voy_dot*m1*h' represents the inertial force component according to the temporal change rate Voy_dot of the lateral velocity Voy of the two-wheeled vehicle 1, and ωz*Vox*m1*h' represents the inertial force component according to the centrifugal force. Further, ωz*Vox represents the centrifugal acceleration.

In the present embodiment, the control device 60 is configured to carry out the control processing established on the basis of the two-mass-point model described above. In this case, the control device 60 controls the posture (inclination angle) in the roll direction of the vehicle body 2 by controlling the inverted pendulum mass point lateral movement amount Pb_diff_y through the steering of the front wheel 3f.

Further, this control is carried out taking account of the fact that, when the operator seated on the seat section 4 of the vehicle body 2 of the two-wheeled vehicle 1 shifts the body weight in the lateral direction of the vehicle body 2 at the time of turning of the two-wheeled vehicle 1 or the like, the center of gravity of the operator will be displaced laterally to the right or left from a position on the plane of symmetry of the vehicle body 2 (and hence, the overall center of gravity G of the vehicle body 2 and the inverted pendulum mass point 71 will be displaced laterally to the right or left from positions on the plane of symmetry of the vehicle body 2). Specifically, the posture (inclination angle) in the roll direction of the vehicle body 2 is controlled to reduce the lateral displacement upon occurrence of such lateral displacement.

Figure 7A:
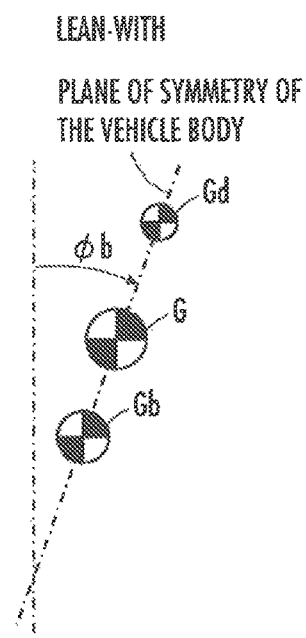
FIGS. 7A, 7B, and 7C show the positional relationships of the centers of gravity in the lean-with, lean-in, and lean-out states, respectively.

FIG. 7A shows the positional relationship of the center of gravity Gd of the operator, the center of gravity Gb of the two-wheeled vehicle 1 alone, excluding the operator, and the overall center of gravity G in the state where the center of gravity Gd of the operator is located on the plane of symmetry of the vehicle body 2 (in the absence of lateral displacement of the center of gravity Gd). This state corresponds to the so-called "lean-with" state. In this state, the centers of gravity Gd and Gb are on the plane of symmetry, and thus, the overall center of gravity G is also on the plane of symmetry.

Figure 7B:
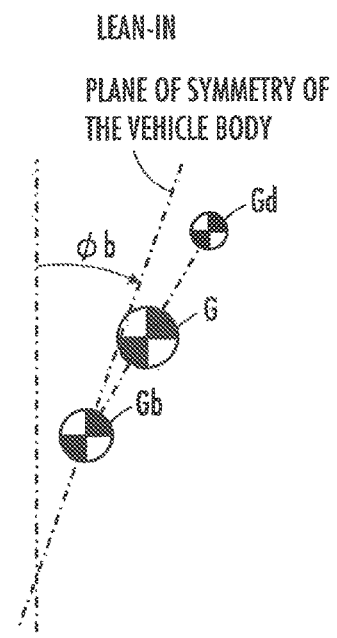
Figure 7C:
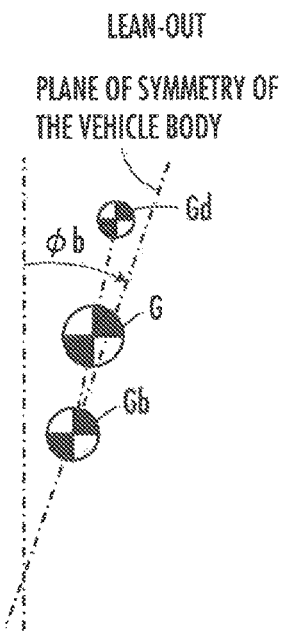

FIG. 7B shows the positional relationship of the above-described centers of gravity Gd, Gb, and G in the state where the center of gravity Gd of the operator is displaced in the lateral direction of the vehicle body 2 from the plane of symmetry of the vehicle body 2 in the same direction as the turning direction of the two-wheeled vehicle 1 (or the inclination direction of the vehicle body 2). FIG. 7C shows the positional relationship of the above-described centers of gravity Gd, Gb, and G in the state where the center of gravity Gd of the operator is displaced in the lateral direction of the vehicle body 2 from the plane of symmetry of the vehicle body 2 in the direction opposite to the turning direction of the two-wheeled vehicle 1 (or the inclination direction of the vehicle body 2).

The state in FIG. 7B corresponds to the so-called "lean-in" state, and the state in FIG. 7C corresponds to the so-called "lean-out" state. In these states, the center of gravity Gd of the operator is displaced laterally from a position on the plane of symmetry, and thus, the overall center of gravity G is also displaced laterally from a position on the plane of symmetry.

Therefore, controlling the posture (inclination angle) in the roll direction of the vehicle body 2 so as to reduce the above-described lateral displacement of the center of gravity Gd of the operator means, in other words, controlling the posture (inclination angle) in the roll direction of the vehicle body 2 so as to make the lean-in or lean-out state approach the lean-with state (to bring the plane of symmetry of the vehicle body 2 closer to the center of gravity Gd of the operator).

The functions of the control device 60 for carrying out such control processing will now be described specifically. In the following description, the suffix "act" is added to the reference characters of a given state quantity, such as a steering angle of the front wheel 3f or the like, as a sign indicating an actual value or its observed value (detected value or estimate). For a desired value, the suffix "_cmd" is added.

Figure 8:
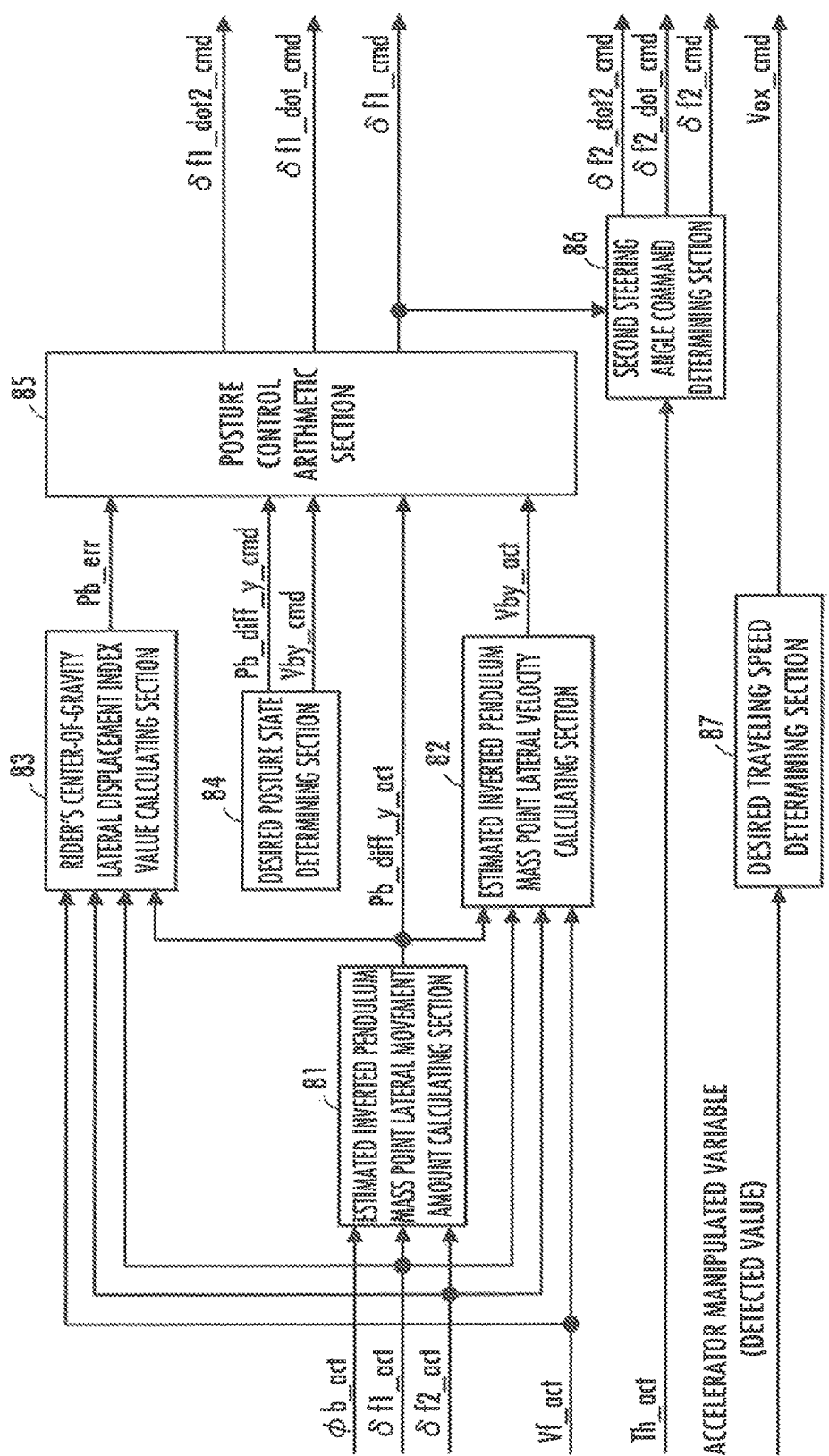
FIG. 8 is a block diagram showing the major functions of the control device in the first embodiment.

The control device 60 includes, as functions implemented when the CPU executes installed programs (functions implemented by software) or as functions implemented by hardware configurations, the functions shown by the block diagram in FIG. 8.

That is, the control device 60 includes: an estimated inverted pendulum mass point lateral movement amount calculating section 81 which calculates an estimate of an actual value Pb_diff_y_act (hereinafter, referred to as "estimated inverted pendulum mass point lateral movement amount Pb_diff_y_act") of an inverted pendulum mass point lateral movement amount Pb_diff_y representing a movement amount in the Y-axis direction (lateral direction of the vehicle body 2) of the inverted pendulum mass point 71 of the two-wheeled vehicle 1, an estimated inverted pendulum mass point lateral velocity calculating section 82 which calculates an estimate of an actual value Vby_act (hereinafter, referred to as "estimated inverted pendulum mass point lateral velocity Vby_act") of an inverted pendulum mass point lateral velocity Vby representing a translational velocity in the Y-axis direction of the inverted pendulum mass point 71, a rider's center-of-gravity lateral displacement index value calculating section 83 which calculates an index value (hereinafter, referred to as "rider's center-of-gravity lateral displacement index value") representing the degree of displacement of the center of gravity of the operator (degree of displacement in the Y-axis direction from the plane of symmetry of the vehicle body 2) caused by the shift of the operator's weight in the lateral direction (Y-axis direction), and a desired posture state determining section 84 which determines a desired value Pb_diff_y_cmd (hereinafter, referred to as "desired inverted pendulum mass point lateral movement amount Pb_diff_y_cmd") of the inverted pendulum mass point lateral movement amount Pb_diff_y and a desired value Vby_cmd (hereinafter, referred to as "desired inverted pendulum mass point lateral velocity Vby_cmd") of the inverted pendulum mass point lateral velocity Vby.

Here, in the present embodiment, the rider's center-of-gravity lateral displacement index value calculating section 83 calculates, as the rider's center-of-gravity lateral displacement index value, an estimate of a lateral displacement amount Pb_err (in the Y-axis direction from the plane of symmetry of the vehicle body 2) (hereinafter, referred to as "estimated inverted pendulum mass point lateral displacement Pb_err") of the inverted pendulum mass point 71 which is caused in response to the lateral displacement of the center of gravity of the operator from the plane of symmetry of the vehicle body 2.

The control device 60 further includes: a posture control arithmetic section 85 which determines, as primary control inputs (manipulated variables) for controlling the posture in the roll direction of the vehicle body 2, a desired value δf1_cmd (hereinafter, referred to as "desired first steering angle δf1_cmd") of the first steering angle δf1 of the front wheel 3f, a desired value δf1_dot_cmd (hereinafter, referred to as "desired first steering angular velocity δf1_dot_cmd") of a first steering angular velocity δf1_dot which is a temporal change rate of the first steering angle δf1, and a desired value δf1_dot2_cmd (hereinafter, referred to as "desired first steering angular acceleration δf1_dot2_cmd") of a first steering angular acceleration δf1_dot2 which is a temporal change rate of the first steering angular velocity δf1_dot, a second steering angle command determining section 86 which determines a desired value δf2_cmd (hereinafter, referred to as "desired second steering angle δf2_cmd") of the second steering angle δf2 of the front wheel 3f, a desired value δf2_dot_cmd (hereinafter, referred to as "desired second steering angular velocity δf2_dot_cmd") of a second steering angular velocity δf2_dot which is a temporal change rate of the second steering angle δf2, and a desired value δf2_dot2_cmd (hereinafter, referred to as "desired second steering angular acceleration δf2_dot2_cmd") of a second steering angular acceleration δf2_dot2 which is a temporal change rate of the second steering angular velocity δf2_dot, and a desired traveling speed determining section 87 which determines a desired value Vox_cmd (hereinafter, referred to as "desired traveling speed Vox_cmd") of the traveling speed Vox of the two-wheeled vehicle 1.

The control device 60 carries out the processing in the above-described functional sections successively at prescribed control processing cycles. The control device 60 controls the first steering actuator 15 in accordance with the desired first steering angle δf1_cmd, the desired first steering angular velocity δf1_dot_cmd, and the desired first steering angular acceleration δf1_dot2_cmd determined by the posture control arithmetic section 85.

Further, the control device 60 controls the second steering actuator 37 in accordance with the desired second steering angle δf2_cmd, the desired second steering angular velocity δf2_dot_cmd, and the desired second steering angular acceleration δf2_dot2_cmd determined by the second steering angle command determining section 86.

Furthermore, the control device 60 controls the front-wheel driving actuator 7 in accordance with the desired traveling speed Vox_cmd determined by the desired traveling speed determining section 87.

Details of the control processing in the control device 60 will be described below. In the arithmetic processing described below in relation to the control processing in the control device 60, values of the parameters m, m1, m2, and h' regarding the two-mass-point model described above and values of the parameters θcs, Lf, Lr, and Rg regarding the specification of the two-wheeled vehicle 1 are used. The values of these parameters m, m1, m2, h', θcs, Lf, Lr, and Rg are set values determined in advance. Further, "g" in the arithmetic processing represents the gravitational acceleration constant.

The control device 60 carries out the processing in the estimated inverted pendulum mass point lateral movement amount calculating section 81 at each control processing cycle.

Figure 9:
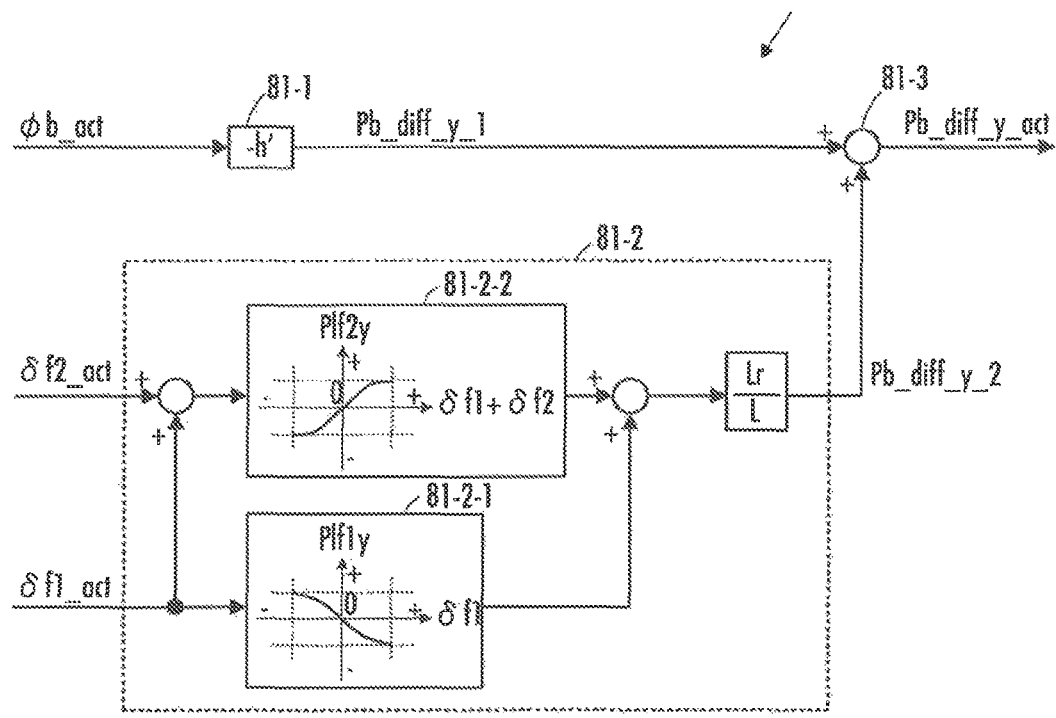
FIG. 9 is a block and line diagram showing the processing performed by the estimated inverted pendulum mass point lateral movement amount calculating section shown in FIG. 8.

As shown in FIG. 9, the estimated inverted pendulum mass point lateral movement amount calculating section 81 receives: a detected roll angle φb_act which is a detected value of the inclination angle φb in the roll direction (hereinafter, referred to as "roll angle φb") of the vehicle body 2, and a detected first steering angle δf1_act as a detected value of the first steering angle δf1 and a detected second steering angle δf2_act as a detected value of the second steering angle δf2 of the front wheel 3f.

The detected roll angle φb_act is a detected value (observed value) indicated by an output from the vehicle-body inclination detector 61, the detected first steering angle δf1_act is a detected value (observed value) indicated by an output from the first steering angle detector 62, and the detected second steering angle δf2_act is a detected value (observed value) indicated by an output from the second steering angle detector 63.

The estimated inverted pendulum mass point lateral movement amount calculating section 81 calculates an estimated inverted pendulum mass point lateral movement amount Pb_diff_y_act by the arithmetic processing shown by the block and line diagram in FIG. 9. That is, the estimated inverted pendulum mass point lateral movement amount calculating section 81 calculates Pb_diff_y_act by the arithmetic processing of the following expressions (10a) to (10c).

$$Pb\_diff\_y\_1 = -h'^{*}\phi b\_act \quad (10a)$$

$$Pb\_diff\_y\_2 = (Plf1y(\delta f1\_act) + Plf2y(\delta f1\_act + \delta f2\_act))^{*}(Lr/L) \quad (10b)$$

$$Pb\_diff\_y\_act = Pb\_diff\_y\_1 + Pb\_diff\_y\_2 \quad (10c)$$

In FIG. 9, processing sections 81-1, 81-2, and 81-3 represent processing sections which perform the arithmetic processing of the expressions (10a), (10b), and (10c), respectively.

Here, Pb_diff_y_1 calculated by the expression (10a) in the processing section 81-1 is a component, as part of Pb_diff_y_act, which is defined according to the detected roll angle φb_act. It should be noted that in the arithmetic processing of the expression (10a), sin(φb_act) is approximated by φb_act.

Pb_diff_y_2 calculated by the expression (10b) in the processing section 81-2 is a component, as part of Pb_diff_y_act, which is defined according to the steering angles (detected first steering angle δf1_act and detected second steering angle δf2_act) of the front wheel 3f. This Pb_diff_y_2 corresponds to an estimate of the movement amount q in the Y-axis direction of the ground surface mass point 72 according to the steering of the front wheel 3f.

Plf1y(δf1_act) in the expression (10b) is a function value which is determined in a processing section 81-2-1 in FIG. 9, from the value of δf1_act, by a preset conversion function Plf1y(δf1). This conversion function Plf1y(δf1) is configured, for example, by a mapping or an arithmetic expression. In the present embodiment, the conversion function Plf1y(δf1) has been set, as illustrated by the graph in the processing section 81-2-1, such that the value of Plf1y decreases from a value on the positive side to a value on the negative side as the value of δf1 increases (from a value on the negative side to a value on the positive side).

Further, Plf2y(δf1_act+δf2_act) in the expression (10b) is a function value which is determined by a preset conversion function Plf2y(δf1+δf2) from the value of δf1_act+δf2_act in a processing section 81-2-2 in FIG. 9. This conversion function Plf2y(δf1+f2) is configured, for example, by a mapping or an arithmetic expression. In the present embodiment, the conversion function Plf2y(δf1+f2) has been set, as illustrated by the graph in the processing section 81-2-2, such that the value of Plf2y increases from a value on the negative side to a value on the positive side as the value of δf1+δf2 increases (from a value on the negative side to a value on the positive side).

Then, from Pb_diff_y_1 and Pb_diff_y_2 calculated by the expressions (10a) and (10b), respectively, the estimated inverted pendulum mass point lateral movement amount Pb_diff_y_act is calculated by the arithmetic processing (expression (10c)) in the processing section 81-3.

In the above-described manner, the estimated inverted pendulum mass point lateral movement amount calculating section 81 performs the arithmetic processing of the above expressions (10a) to (10c), at each control processing cycle, to thereby calculate the estimated inverted pendulum mass point lateral movement amount Pb_diff_y_act.

Supplementally, the conversion functions in the processing sections 81-2-1 and 81-2-2 may be set in such a way as to obtain a value of Plf1y(δf1_act)*(Lr/L) in the processing section 81-2-1 and a value of Plf2y(δf1_act+δf2_act)*(Lr/L) in the processing section 81-2-2.

In this case, the sum of the output values from the processing sections 81-2-1 and 81-2-2, as it is, is obtained as Pb_diff_y_2.

Further, the processing section 81-2, which obtains Pb_diff_y_2, may be configured to obtain Pb_diff_y_2 directly from a set of the values of δf1_act and δf2_act, for example, by a two-dimensional mapping or the like.

Furthermore, in the processing section 81-2, when the magnitudes (absolute values) of δf1_act and δf2_act are sufficiently small, Pb_diff_y_2 may be obtained through the computation of the right side of the above expression (4).

Next, the control device 60 carries out the processing in the estimated inverted pendulum mass point lateral velocity calculating section 82.

Figure 10:
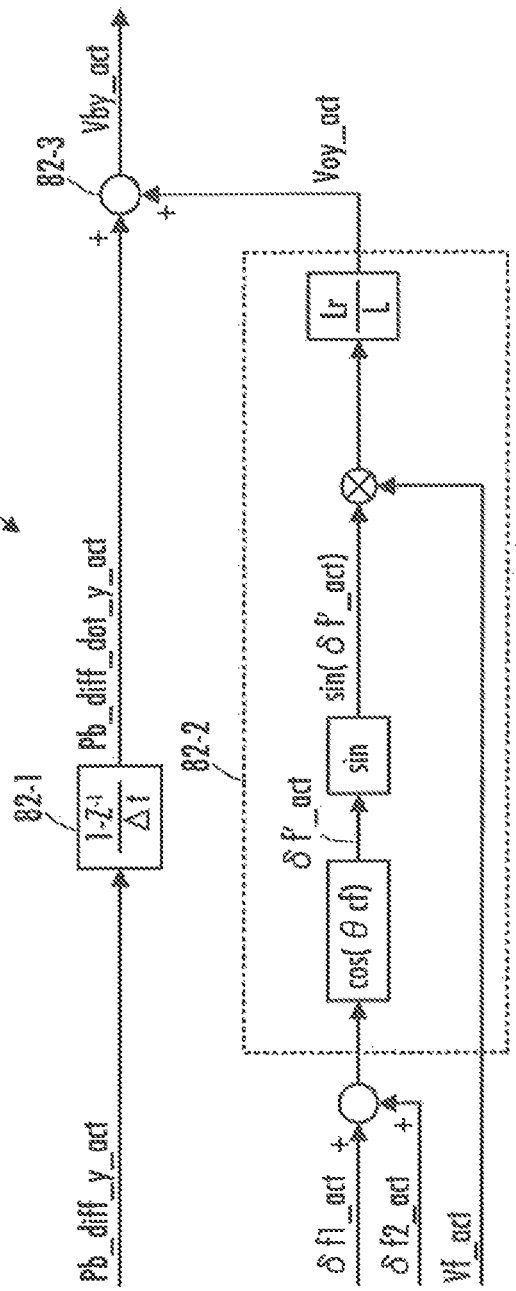
FIG. 10 is a block and line diagram showing the processing performed by the estimated inverted pendulum mass point lateral velocity calculating section shown in FIG. 8.

As shown in FIG. 10, the estimated inverted pendulum mass point lateral velocity calculating section 82 receives: an estimated inverted pendulum mass point lateral movement amount Pb_diff_y_act calculated in the estimated inverted pendulum mass point lateral movement amount calculating section 81, a detected first steering angle δf1_act and a detected second steering angle δf2_act of the front wheel 3f, and an estimated front-wheel rotational transfer velocity Vf_act which is an estimate (observed value) of the rotational transfer velocity Vf of the front wheel 3f.

The estimated front-wheel rotational transfer velocity Vf_act is a velocity which is calculated by multiplying the detected value (observed value) of the rotational angular velocity of the front wheel 3f, indicated by an output from the aforesaid front-wheel rotational speed detector 65, by the predetermined effective rolling radius of the front wheel 3f.

The estimated inverted pendulum mass point lateral velocity calculating section 82 carries out the arithmetic processing shown by the block and line diagram in FIG. 10 to calculate an estimated inverted pendulum mass point lateral velocity Vby_act. That is, the estimated inverted pendulum mass point lateral velocity calculating section 82 calculates the estimated inverted pendulum mass point lateral velocity Vby_act by the arithmetic processing of the following expressions (11a) to (11d).

$$Pb\_diff\_dot\_y\_act = \text{differential (temporal change rate) of } Pb\_diff\_y\_act \quad (11a)$$

$$\delta'f\_act = (\delta f1\_act + \delta f2\_act) * \cos(\theta cs) \quad (11b)$$

$$Voy\_act = \sin(\delta'f\_act) * Vf\_act * (Lr/L) \quad (11c)$$

$$Vby\_act = Pb\_diff\_dot\_y\_act + Voy\_act \quad (11d)$$

In FIG. 10, a processing section 82-1 represents a processing section which performs the arithmetic processing (differential operation) of the expression (11a), a processing section 82-2 represents a processing section which performs the arithmetic processing of the expressions (11b) and (11c), and a processing section 82-3 represents a processing section which performs the arithmetic processing of the expression (11d).

Here, Pb_diff_dot_y_act calculated in the processing section 82-1 by the expression (11a) is an estimate of the moving velocity, as seen in the aforesaid XYZ coordinate system, (relative velocity with respect to the origin of the XYZ coordinate system) of the inverted pendulum mass point 71 in the Y-axis direction.

Further, δ'f_act calculated in the processing section 82-2 by the expression (11b) is an estimate (hereinafter, referred to as "estimated front-wheel effective steering angle δ'f_act") of a front-wheel effective steering angle δ'f which is a rotational angle of the front wheel 3f in the yaw direction (about the Z axis) by the steering of the front wheel 3f.

The front-wheel effective steering angle δ'f is, more specifically, an angle made by the line of intersection of the ground surface S and the rotational plane of the front wheel 3f (plane passing through the center of the axle of the front wheel 3f and orthogonal to the axle centerline of the front wheel 3f) with respect to the longitudinal direction (X-axis direction) of the vehicle body 2.

In the case where the roll angle φb of the vehicle body 2 is relatively small, the estimate of this δ'f, or, the estimated front-wheel effective steering angle δ'f_act can be calculated approximately by the above expression (11b).

It should be noted that in order to further improve the accuracy of δ'f_act, δ'f_act may be obtained by a preset mapping from δf1_act+δf2_act, or from δf1_act, δf2_act, for example. Alternatively, in order to still further improve the accuracy of δ'f_act, δ'f_act may be obtained by a preset mapping from δf1_act+δf2_act or δf1_act, δf2_act, and a detected roll angle φb_act of the vehicle body 2, for example.

Further, Voy_act calculated in the processing section 82-2 by the expression (11c) using the estimated front-wheel effective steering angle δ'f_act corresponds to an estimate of the lateral velocity of the two-wheeled vehicle 1 (more specifically, translational moving velocity in the Y-axis direction of the two-wheeled vehicle 1 at the position of the origin of the aforesaid XYZ coordinate system set for the two-wheeled vehicle 1) which is produced during the traveling of the two-wheeled vehicle 1 while the front wheel 3f is being steered.

Then, from Pb_diff_dot_y_act and Voy_act calculated by the expressions (11a) and (11c), respectively, the estimated inverted pendulum mass point lateral velocity Vby_act is calculated by the arithmetic processing (expression (11d)) in the processing section 82-3.

In the above-described manner, the estimated inverted pendulum mass point lateral velocity calculating section 82 performs the arithmetic processing of the above expressions (11a), (11b), (11c), and (11d), at each control processing cycle, to thereby calculate the estimated inverted pendulum mass point lateral velocity Vby_act.

Figure 11:
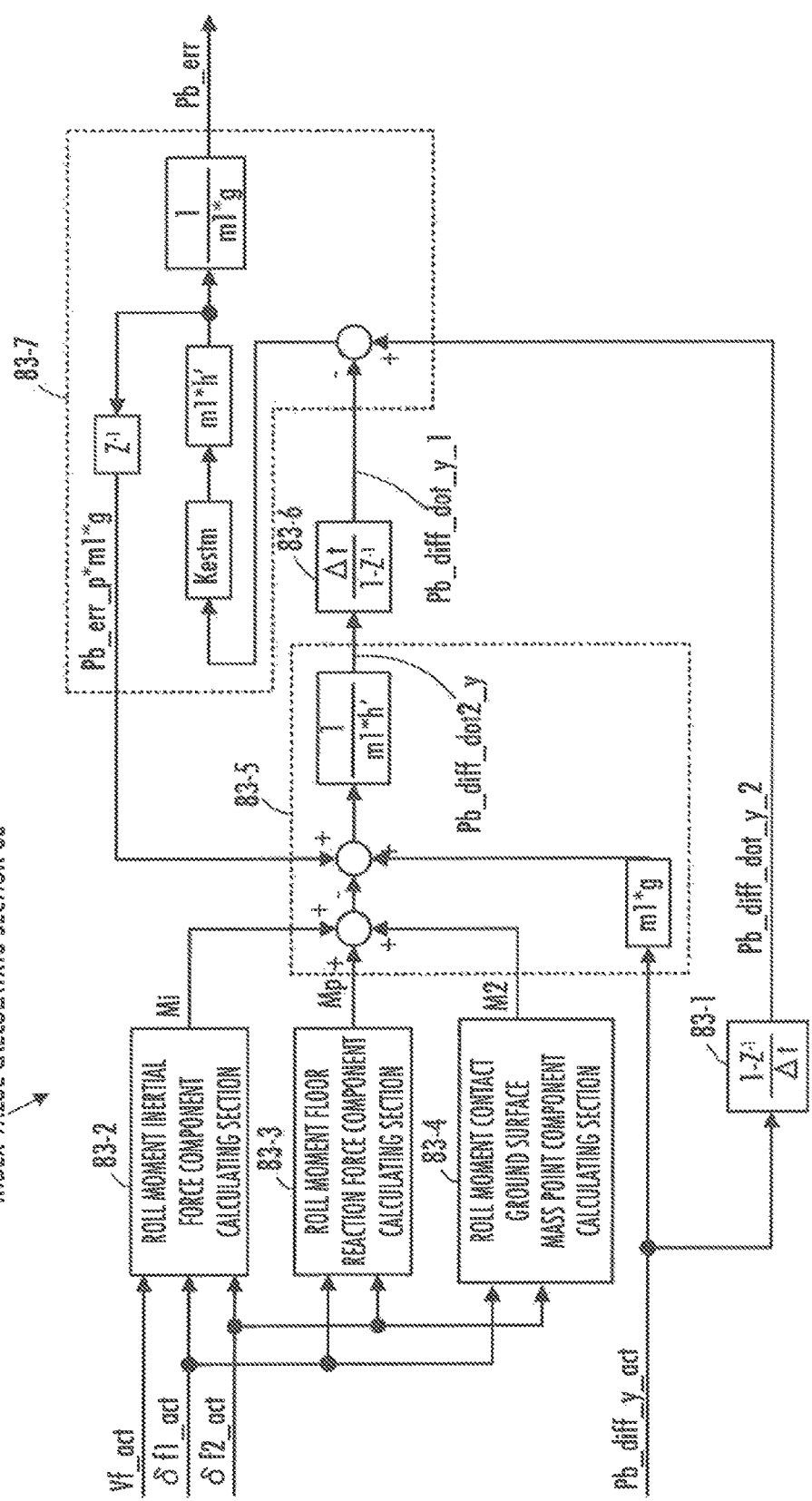
FIG. 11 is a block and line diagram showing the processing performed by the rider's center-of-gravity lateral displacement index value calculating section shown in FIG. 8.

The control device 60 further carries out the processing in the rider's center-of-gravity lateral displacement index value calculating section 83. As shown in FIG. 11, the rider's center-of-gravity lateral displacement index value calculating section 83 receives: an estimated inverted pendulum mass point lateral movement amount Pb_diff_y_act calculated in the estimated inverted pendulum mass point lateral movement amount calculating section 81, a detected first steering angle δf1_act and a detected second steering angle δf2_act of the front wheel 3f, and an estimated front-wheel rotational transfer velocity Vf_act described above.

The rider's center-of-gravity lateral displacement index value calculating section 83 calculates an estimated inverted pendulum mass point lateral displacement Pb_err as a rider's center-of-gravity lateral displacement index value, through the arithmetic processing shown by the block and line diagram in FIG. 11. In this case, the rider's center-of-gravity lateral displacement index value calculating section 83 is configured as an observer.

Specifically, the rider's center-of-gravity lateral displacement index value calculating section 83 calculates an estimate of the roll moment inertial force component Mi, an estimate of the roll moment floor reaction force component Mp, and an estimate of the roll moment ground surface mass point component M2 by a roll moment inertial force component calculating section 83-2, a roll moment floor reaction force component calculating section 83-3, and a roll moment ground surface mass point component calculating section 83-4, respectively, on the basis of the input values of δf1_act, δf2_act, and Vf_act. The specific processing in the calculating sections 83-2, 83-3, and 83-4 will be described later.

Then, the rider's center-of-gravity lateral displacement index value calculating section 83 carries out, in a processing section 83-5, arithmetic processing based on a dynamic model taking account of lateral displacement of the inverted pendulum mass point 71 due to lateral displacement of the center of gravity of the operator, on the basis of the estimates of Mi, Mp, and M2, the input value of Pb_diff_y_act, and a value (last time's value) Pb_err_p of the estimated inverted pendulum mass point lateral displacement Pb_err calculated in the last time's control processing cycle, to thereby calculate an estimate of the translational acceleration Pb_diff_dot2_y in the Y-axis direction of the inverted pendulum mass point 71.

Stated differently, the last time's value Pb_err_p corresponds to the latest one of the estimated inverted pendulum mass point lateral displacements Pb_err calculated up to then.

Here, the dynamic model (equation of motion of the inverted pendulum mass point 71) taking account of the lateral displacement of the inverted pendulum mass point 71 due to the lateral displacement of the center of gravity of the operator is expressed by the equation of motion obtained by replacing Pb_diff_y on the right side of the above expression (2) with Pb_diff_y_act+Pb_err.

Therefore, the arithmetic processing in the processing section 83-5 is carried out in accordance with the following expression (12a).

$$Pb\_diff\_dot2\_y = (m1*g*(Pb\_diff\_y\_act + Pb\_err\_p)$$
$$Mp-Mp-M2-Mi)/(m1*h') \quad (12a)$$

Then, the rider's center-of-gravity lateral displacement index value calculating section 83 integrates, in a processing section 83-6, Pb_diff_dot2_y calculated by the above expression (12a), to thereby calculate a first estimated inverted pendulum mass point lateral velocity Pb_diff_dot_y_1 as a first estimate of the moving velocity (as seen in the XYZ coordinate system) in the Y-axis direction of the inverted pendulum mass point 71, as shown by the following expression (12b).

$$Pb\_diff\_dot\_y\_1 = \text{integral of } Pb\_diff\_dot2\_y \quad (12b)$$

Further, the rider's center-of-gravity lateral displacement index value calculating section 83 performs, in a processing section 83-1, a differential operation on the input value of Pb_diff_y_act, to thereby calculate a second estimated inverted pendulum mass point lateral velocity Pb_diff_dot_y_2 as a second estimate of the moving velocity (as seen in the XYZ coordinate system) in the Y-axis direction of the inverted pendulum mass point 71, as shown by the following expression (12c).

$$Pb\_diff\_dot\_y\_2 = \text{differential(temporal change rate)}$$
$$\text{of } Pb\_diff\_y\_act \quad (12c)$$

It should be noted that Pb_diff_dot_y_2 calculated by the expression (12c) is the same as Pb_diff_dot_y_act calculated by the above expression (11a) by the estimated inverted pendulum mass point lateral velocity calculating section 82. Therefore, Pb_diff_dot_y_act calculated in the estimated inverted pendulum mass point lateral velocity calculating section 82 may be used, without modification, as the second estimated inverted pendulum mass point lateral velocity Pb_diff_dot_y_2.

Here, the estimated inverted pendulum mass point lateral movement amount Pb_diff_y_act is calculated by the estimated inverted pendulum mass point lateral movement amount calculating section 81 assuming that no lateral displacement of the center of gravity of the operator (from a position on the plane of symmetry of the vehicle body 2) has occurred. Therefore, the second estimated inverted pendulum mass point lateral velocity Pb_diff_dot_y_2 calculated by the expression (12c) corresponds to an estimate of the moving velocity in the Y-axis direction of the inverted pendulum mass point 71 on the assumption that there is no lateral displacement of the center of gravity of the operator.

Therefore, the deviation between this second estimated inverted pendulum mass point lateral velocity Pb_diff_dot_y_2 and the first estimated inverted pendulum mass point lateral velocity Pb_diff_dot_y_1, calculated dynamically according to the above expressions (12a) and (12b), becomes a value depending on the inverted pendulum mass point lateral displacement amount Pb_err caused by the lateral displacement of the center of gravity of the operator.

Thus, the rider's center-of-gravity lateral displacement index value calculating section 83 calculates the estimated inverted pendulum mass point lateral displacement Pb_err in a processing section 83-7 by the arithmetic processing of the following expression (12d).

$$\begin{aligned} Pb\_err &= (Pb\_diff\_dot\_y\_2 - Pb\_diff\_dot\_y\_1)*Kestm* \\ &\quad (m1*h')/(m1*g) \\ &= (Pb\_diff\_dot\_y\_2 - Pb\_diff\_dot\_y\_1)*Kestm*h'/g \end{aligned} \quad (12d)$$

Kestm used in the arithmetic processing of this expression (12d) is a predetermined gain of a prescribed value. It should be noted that Pb_err calculated by this expression (12d) takes a positive value when the center of gravity of the operator is displaced on the lean-in side from a position on the plane of symmetry of the vehicle body 2, and takes a negative value when it is displaced on the lean-out side therefrom.

Supplementally, Kestm*h'/g in the expression (12d) may be set in advance as a single gain value.

Further, in the block and line diagram in FIG. 11, a last time's value (=Pb_err_p*m1*g) of (Pb_diff_dot_y_2−Pb_diff_dot_y_1)*Kestm*(m1*h') is input to the processing section 83-5 from the processing section 83-7. Alternatively, a last time's value Pb_err_p of the estimated inverted pendulum mass point lateral displacement Pb_err, for example, may be input directly to the processing section 83-5.

In the above-described manner, the rider's center-of-gravity lateral displacement index value calculating section 83 calculates the estimates of Mi, Mp, M2, and uses these estimates and the estimated inverted pendulum mass point lateral movement amount Pb_diff_y_act to perform the arithmetic processing of the expressions (12a) to (12d), to thereby calculate the estimated inverted pendulum mass point lateral displacement Pb_err.

In this case, the estimates of Mi, Mp, and M2 are calculated in the manner described below.

Figure 12:
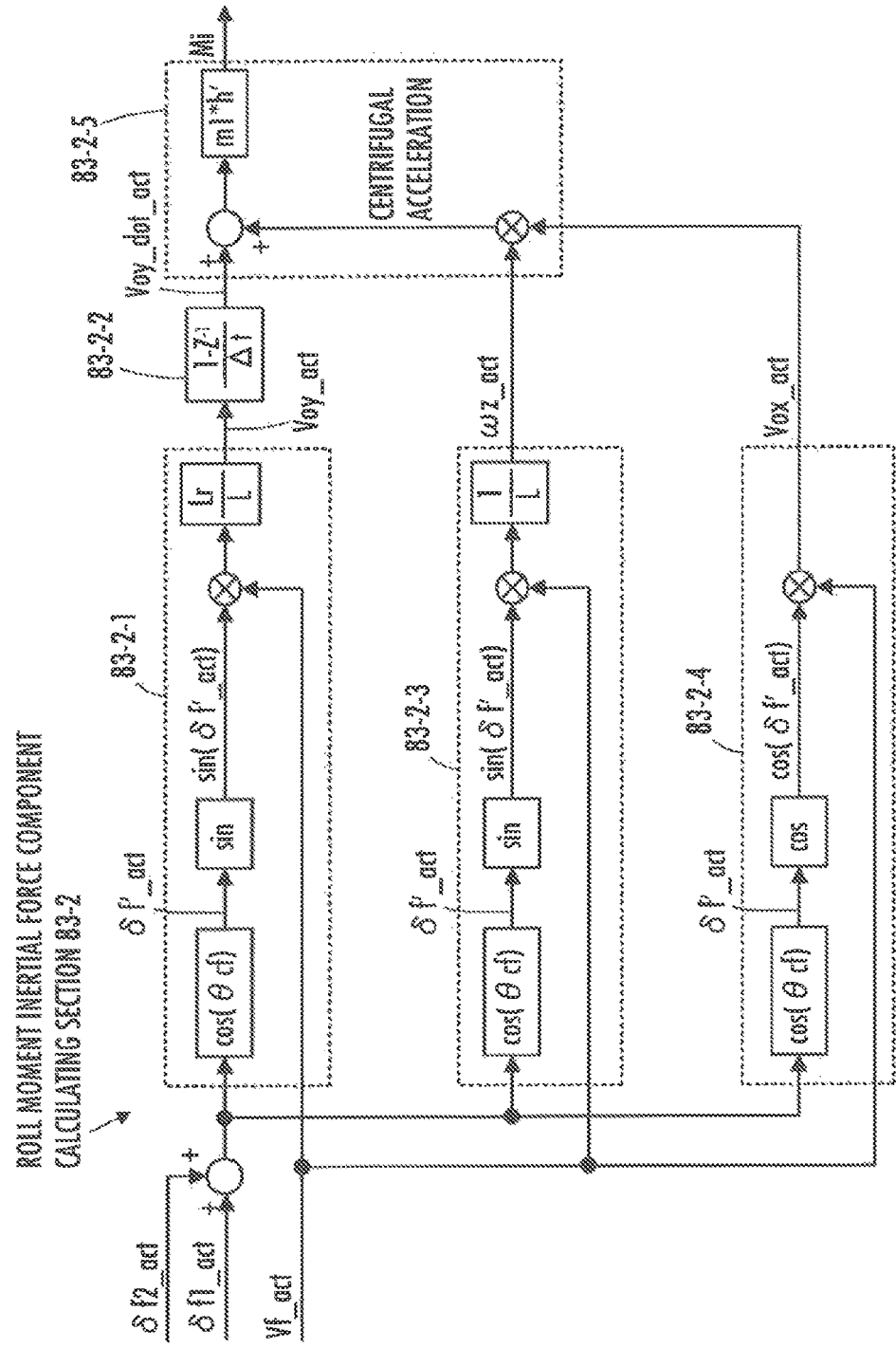
FIG. 12 is a block and line diagram showing the processing performed by the roll moment inertial force component calculating section shown in FIG. 11.

First, the roll moment inertial force component calculating section 83-2 in the rider's center-of-gravity lateral displacement index value calculating section 83 calculates an estimate of the roll moment inertial force component Mi by the arithmetic processing shown by the block and line diagram in FIG. 12. That is, the roll moment inertial force component calculating section 83-2 calculates the estimate of the roll moment inertial force component Mi by the arithmetic processing of the following expressions (13a) to (13f).

$$\delta'f\_act = (\delta f1\_act + \delta f2\_act)*\cos(\theta cs) \quad (13a)$$

$$Voy\_act = \sin(\delta'f\_act)*Vf\_act*(Lr/L) \quad (13b)$$

$$Voy\_dot\_act = \text{differential(temporal change rate) of } Voy\_act \quad (13c)$$

$$\omega z\_act = \sin(\delta'f\_act)*Vf\_act*(1/L) \quad (13d)$$

$$Vox\_act = \cos(\delta'f\_act)*Vf\_act \quad (13e)$$

$$Mi = (Voy\_dot\_act + (z\_act*Vox\_act)*m1*h' \quad (13f)$$

In FIG. 12, a processing section 83-2-1 represents a processing section which performs the arithmetic processing of the expressions (13a) and (13b), a processing section 83-2-2 represents a processing section which performs the arithmetic processing (differential operation) of the expression (13c), a processing section 83-2-3 represents a processing section which performs the arithmetic processing of the expressions (13a) and (13d), a processing section 83-2-4 represents a processing section which performs the arithmetic processing of the expressions (13a) and (13e), and a processing section 83-2-5 represents a processing section which performs the arithmetic processing of the expression (13f).

Here, the arithmetic processing (expressions (13a) and (13b)) in the processing section 83-2-1 is the same as the arithmetic processing in the processing section 82-2 in the aforesaid estimated inverted pendulum mass point lateral velocity calculating section 82. Therefore, this arithmetic processing yields an estimate Voy_act of the lateral velocity of the two-wheeled vehicle 1 (specifically, translational moving velocity in the Y-axis direction of the two-wheeled vehicle 1 at the position of the origin of the aforesaid XYZ coordinate system set for the two-wheeled vehicle 1) which is produced during the traveling of the two-wheeled vehicle 1 while the front wheel 3f is being steered.

Then, a differential Voy_dot_act of this estimate Voy_act, i.e. an estimate Voy_dot_act of time change rate of the lateral velocity (translational moving velocity in the Y-axis direction) of the two-wheeled vehicle 1, is calculated by the arithmetic processing (expression (13c)) in the processing section 83-2-2.

Further, by the arithmetic processing (expressions (13a) and (13d)) in the processing section 83-2-3, an estimate ωz_act (hereinafter, referred to as "estimated yaw rate ωz_act") of the angular velocity ωz in the yaw direction (about the Z axis) of the two-wheeled vehicle 1 is calculated.

Further, by the arithmetic processing (expressions (13a) and (13e)) in the processing section 83-2-4, an estimate Vox_act (hereinafter, referred to as "estimated traveling speed Vox_act") of the moving velocity in the longitudinal direction (X-axis direction) of the vehicle body 2 of the two-wheeled vehicle 1 (i.e. traveling speed Vox of the two-wheeled vehicle 1) is calculated.

The arithmetic processing (expression (13f)) in the processing section 83-2-5 is then performed using Voy_dot_act, ωz_act, and Vox_act calculated in the processing sections 83-2-2, 83-2-3, and 83-2-4, respectively. An estimate of the roll moment inertial force component Mi is thus calculated.

It should be noted that the expression (13f) is obtained from the above expression (8), by using Voy_dot_act, ωz_act, and Vox_act as the values of Voy_dot, ωz, and Vox, respectively, therein.

In the above-described manner, the roll moment inertial force component calculating section 83-2 performs the arithmetic processing of the above expressions (13a) to (13f), to thereby calculate an estimate of the roll moment inertial force component Mi.

Supplementally, the estimated front-wheel effective steering angle δ'f_act calculated by the expression (13a) is the same as the value calculated in the estimated inverted pendulum mass point lateral velocity calculating section 82. Therefore, in the arithmetic processing of the expressions (13b), (13c), and (13d), the estimated front-wheel effective steering angle δ'f_act calculated in the estimated inverted pendulum mass point lateral velocity calculating section 82 may be used without modification. In this case, of the arithmetic processing in the roll moment inertial force component calculating section 83-2, the arithmetic processing (expression (13a)) for calculating δ'f_act is unnecessary.

Further, the processing section 83-2-1 may be omitted, and the estimate Voy_act of the lateral velocity of the two-wheeled vehicle 1, calculated in the estimated inverted pendulum mass point lateral velocity calculating section 82, may be used, without modification, in the arithmetic processing (expression (13c)) in the processing section 83-2-2.

Further, for example in the case where an angular velocity sensor for detecting an angular velocity in the yaw direction is mounted on the vehicle body 2 of the two-wheeled vehicle 1, a detected value of the angular velocity in the yaw direction indicated by an output from that angular velocity sensor may be used as a value of ωz_act in the expression (13f). In this case, the arithmetic processing (expression (13d)) in the processing section 83-2-3 is unnecessary.

Furthermore, for example in the case where a rear-wheel rotational speed detector for detecting a rotational speed (angular velocity) of the rear wheel 3r of the two-wheeled vehicle 1 is mounted on the two-wheeled vehicle 1, an estimate of the translational moving velocity of the rear wheel 3r obtained by multiplying the detected value of the rotational speed of the rear wheel 3r, indicated by an output from that rear-wheel rotational speed detector, by the effective rolling radius of the rear wheel 3r may be used as a value of Vox_act in the expression (13l). In this case, the arithmetic processing (expression (13e)) in the processing section 83-2-4 is unnecessary.

Figure 13:
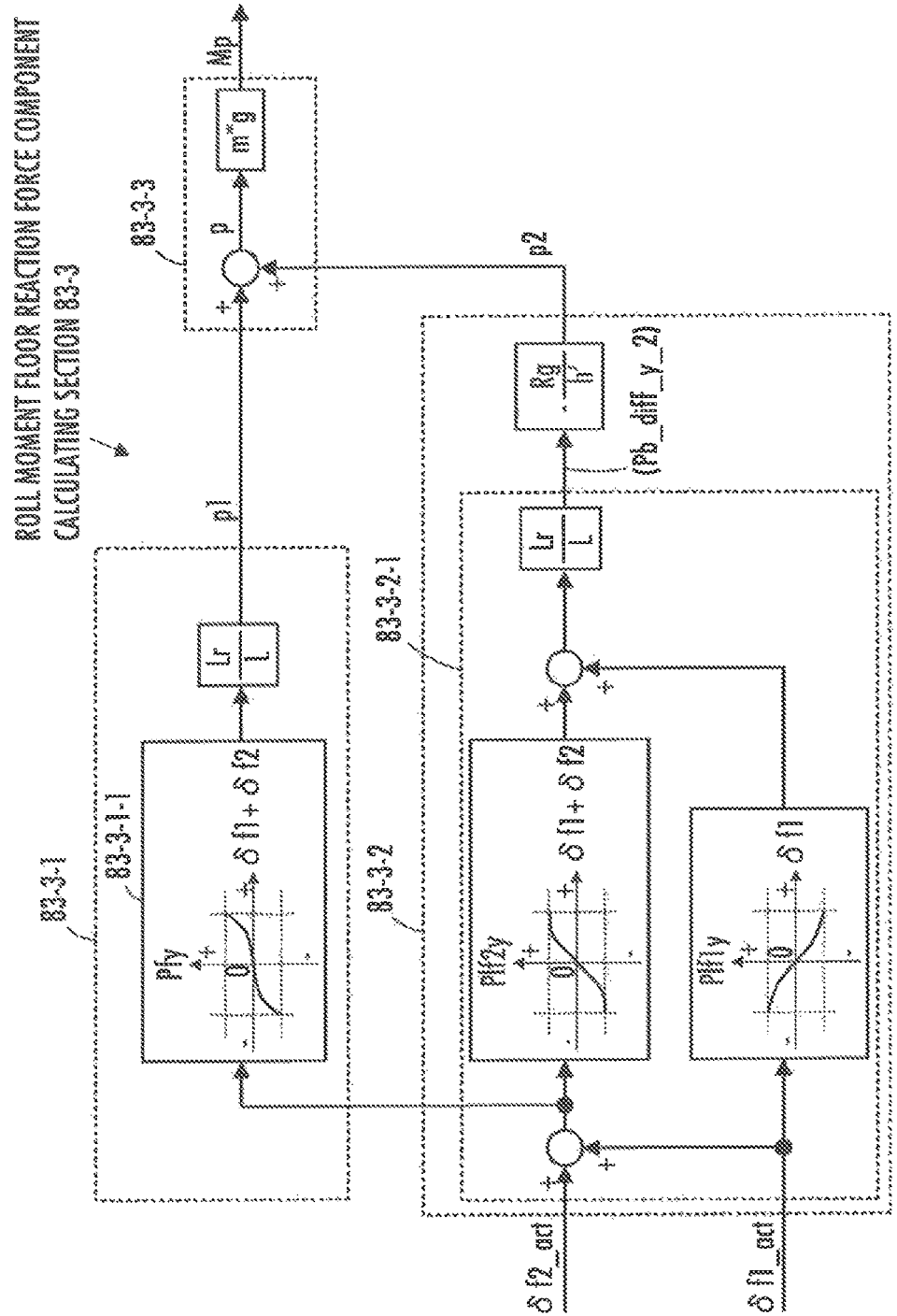
FIG. 13 is a block and line diagram showing the processing performed by the roll moment floor reaction force component calculating section shown in FIG. 11.

Next, the roll moment floor reaction force component calculating section 83-3 in the rider's center-of-gravity lateral displacement index value calculating section 83 calculates an estimate of the roll moment floor reaction force component Mp by the arithmetic processing shown by the block and line diagram in FIG. 13. That is, the roll moment floor reaction force component calculating section 83-3 calculates the estimate of the roll moment floor reaction force component Mp by the arithmetic processing of the following expressions (14a) to (14c).

$$p1 = Pfy(\delta f1\_act + f2\_act) * (Lr/L) \quad (14a)$$

$$p2 = (Plf1y(\delta f1\_act) + Plf2y(\delta f1\_act + \delta f2\_act)) * (Lr/L) * (-Rg/h') \quad (14b)$$

$$Mp = (p1 + p2) * m * g \quad (14c)$$

In FIG. 13, a processing section 83-3-1 represents a processing section which performs the arithmetic processing of the expression (14a), a processing section 83-3-2 represents a processing section which performs the arithmetic processing of the expression (14b), and a processing section 83-3-3 represents a processing section which performs the arithmetic processing of the expression (14c).

Here, p1 calculated by the arithmetic processing (expression (14a)) in the processing section 83-3-1 is a movement amount component which is part of the movement amount p in the Y-axis direction (hereinafter, referred to as "lateral movement amount p") of the COP from the position of the origin of the XYZ coordinate system and which is produced in response to the event that the front wheel 3f rolls in the lateral direction (Y-axis direction) during the steering of the front wheel 3f and, hence, the ground contact point of the front wheel 3f moves in the Y-axis direction. The value of this movement amount component p1 corresponds to the value of the first term on the right side of the above expression (6).

Further, Pfy(δf1_act+δf2_act) in the expression (14a) is a function value which is determined by a preset conversion function Pfy(δf1+δf2) from the value of δf1_act+δf2_act in a processing section 83-3-1-1 in the processing section 83-3-1 in FIG. 13. This conversion function Pfy(δf1+f2) is configured, for example, by a mapping or an arithmetic expression. The conversion function Pfy(δf1+δf2) has been set, as illustrated by the graph in the processing section 83-3-1-1, such that the value of Pfy increases monotonically from a value on the negative side to a value on the positive side as the value of δf1+δf2 increases (from a value on the negative side to a value on the positive side).

Further, p2 calculated by the arithmetic processing (expression (14b)) in the processing section 83-3-2 is a movement amount component which is part of the lateral movement amount p of the COP and which is produced due to the movement in the Y-axis direction of the ground contact point of the front wheel 3f as the front wheel 3f leans during the steering of the front wheel 3f. This movement amount component p2 corresponds to the value of the second term on the right side of the above expression (6).

In this case, the arithmetic processing of the computation of the right side of the expression (14b) excluding the multiplication of (−Rg/h'), i.e. the arithmetic processing in a processing section 83-3-2-1 in the processing section 83-3-2, is the same as the processing (of calculating Pb_diff_y_2) of the processing section 81-2 in the arithmetic processing of the aforesaid estimated inverted pendulum mass point lateral movement amount calculating section 81.

Therefore, the expression (14b) is equivalent to the following expression (14b').

$$p2 = Pb\_diff\_y\_2 * (-Rg/h') \tag{14b'}$$

Further, the arithmetic processing (expression (14c)) in the processing section 83-3-3 is the arithmetic processing of calculating the roll moment floor reaction force component Mp by an expression corresponding to the above expression (5) in which p1+p2 is used as the value of p.

In the above-described manner, the roll moment floor reaction force component calculating section 83-3 calculates an estimate of the roll moment floor reaction force component Mp by the arithmetic processing of the above expressions (14a) to (14c).

Supplementally, in the processing section 83-3-1, instead of the conversion function Pfy(δf1+δf2), a conversion function which obtains a value (=p1) of Pfy(δf1_act+δf2_act)*(Lr/L) as a function value may be used. In this case, p1 is obtained directly from the conversion function.

Further, the modifications explained supplementally about the processing section 81-2 in the estimated inverted pendulum mass point lateral movement amount calculating section 81 may also be adopted for the processing section 83-3-2-1 in the processing section 83-3-2.

Further, in the arithmetic processing in the processing section 83-3-2, a conversion function which obtains a value of Plf1y(δf1_act)*(Lr/L)*(−Rg/h') as a function value may be used instead of the conversion function Plf1y(δf1), and a conversion function which obtains a value of Plf2y(δf1_act+δf2_act)*(Lr/L)*(−Rg/h') as a function value may be used instead of the conversion function Plf2y(δf1+δf2). In this case, the sum of the output values of these conversion functions is obtained as p2.

Both of p1 and p2 are function values of the set of δf1_act and δf2_act. Therefore, an estimate of the lateral movement amount p of the COP or the roll moment floor reaction force component Mp may be obtained directly from the set of δf1_act and δf2_act by a two-dimensional mapping or the like.

In the case where the magnitudes (absolute values) of δf1_act and δf2_act are sufficiently small, the lateral movement amount p of the COP may be calculated by the arithmetic processing of the above expressions (4) and (6).

Figure 14:
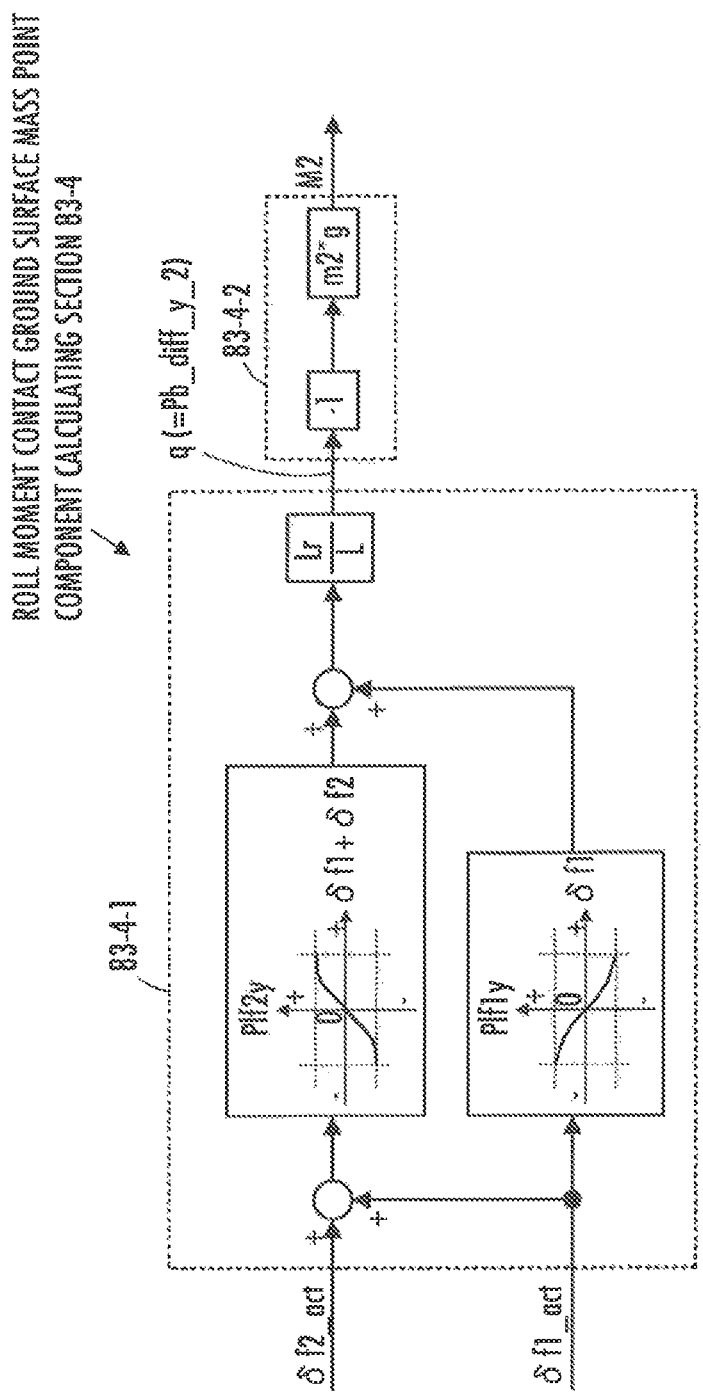
FIG. 14 is a block and line diagram showing the processing performed by the roll moment ground surface mass point component calculating section shown in FIG. 11.

Next, the roll moment ground surface mass point component calculating section 83-4 in the rider's center-of-gravity lateral displacement index value calculating section 83 calculates an estimate of the roll moment ground surface mass point component M2 by the arithmetic processing shown by the block and line diagram in FIG. 14. That is, the roll moment ground surface mass point component calculating section 83-4 calculates the estimate of the roll moment ground surface mass point component M2 by the arithmetic processing of the following expressions (15a) and (15b).

$$q = (Plf1y(\delta f1\_act) + Plf2y(\delta f1\_act+\delta f2\_act))*(Lr/L) \tag{15a}$$

$$M2 = q*(-m2*g) \tag{15b}$$

In FIG. 14, a processing section 83-4-1 represents a processing section which performs the arithmetic processing of the expression (15a), and a processing section 83-4-2 represents a processing section which performs the arithmetic processing of the expression (15b).

Here, q that is calculated by the arithmetic processing (expression (15a)) in the processing section 83-4-1 is a movement amount in the Y-axis direction (hereinafter, referred to as "lateral movement amount q") of the ground surface mass point 72 from the position of the origin of the XYZ coordinate system.

In this case, the arithmetic processing in the processing section 83-4-1 is the same as the arithmetic processing (of calculating Pb_diff_y_2) of the processing section 81-2 in the arithmetic processing of the aforesaid estimated inverted pendulum mass point lateral movement amount calculating section 81. Therefore, in the arithmetic processing of the processing section 83-4-1, Pb_diff_y_2 is calculated as the lateral movement amount q of the ground surface mass point 72.

Further, the arithmetic processing (expression (15b)) in the processing section 83-4-2 is the arithmetic processing of calculating the roll moment ground surface mass point component M2 by the same expression as the aforesaid expression (3).

In the above-described manner, the roll moment ground surface mass point component calculating section 83-4 calculates an estimate of the roll moment ground surface mass point component M2 by the arithmetic processing of the above expressions (15a) and (15b).

Supplementally, the modifications explained supplementally about the processing section 81-2 in the estimated inverted pendulum mass point lateral movement amount calculating section 81 may also be adopted for the processing section 83-4-1.

Further, it may be configured to use a conversion function which obtains a value of Plf1y(δf1_act)*(Lr/L)*(−m2*g) as a function value, instead of the conversion function Plf1y(δf1), and to use a conversion function which obtains a value of Plf2y(δf1_act+δf2_act)*(Lr/L)*(−m2*g) as a function value, instead of the conversion function Plf2y(δf2). In this case, the sum of the output values of these conversion functions, as it is, is obtained as the roll moment ground surface mass point component M2.

Further, an estimate of the lateral movement amount q of the ground surface mass point 72 or the roll moment ground surface mass point component M2 may also be obtained directly from the set of δf1_act and δf2_act by a two-dimensional mapping or the like.

Furthermore, in the case where the magnitudes (absolute values) of δf1_act and δf2_act are sufficiently small, the lateral movement amount q of the ground surface mass point 72 may be calculated by the arithmetic processing of the above expression (4).

Returning to FIG. 8, the control device 60 further carries out the processing in the desired posture state determining section 84.

In the present embodiment, the desired posture state determining section 84 determines a desired inverted pendulum mass point lateral movement amount Pb_diff_y_cmd by the arithmetic processing of the following expressions (16a) and (16b), by using, for example, an estimate ωz_act of the angular velocity ωz in the yaw direction (about the Z axis) of the two-wheeled vehicle 1, calculated by the arithmetic processing of the above expression (13d), and an estimate Vox_act of the traveling speed Vox of the two-wheeled vehicle 1 (moving velocity in the X-axis direction of the vehicle body 2), calculated by the arithmetic processing of the expression (13e). In the present embodiment, the desired posture state determining section 84 sets a desired inverted pendulum mass point lateral velocity Vby_cmd to zero.

$$\phi b\_\text{lean} = -Vox\_act * \omega z\_act / m \qquad (16a)$$

$$Pd\_\text{diff}\_y\_\_\text{cmd} = \phi b\_\text{lean} * h' \qquad (16b)$$

Here, φb_lean calculated by the arithmetic processing of the expression (16a) is a roll angle of the vehicle body 2 at which a moment in the roll direction produced by the gravitational force acting on the two-wheeled vehicle 1 and a moment in the roll direction produced by the centrifugal force are balanced.

The desired posture state determining section 84 determines Pb_diff_y_cmd and Vby_cmd in the above-described manner. Supplementally, the desired inverted pendulum mass point lateral velocity Vby_cmd may be determined variably in accordance with, for example, the detected first steering angle δf1_act and the detected second steering angle δf2_act.

Further, the desired inverted pendulum mass point lateral movement amount Pb_diff_y_cmd may be set to zero, for example. Alternatively, the desired inverted pendulum mass point lateral movement amount Pb_diff_y_cmd may be determined variably in accordance with, for example, the detected first steering angle δf1_act and the detected second steering angle δf2_act.

Figure 15:
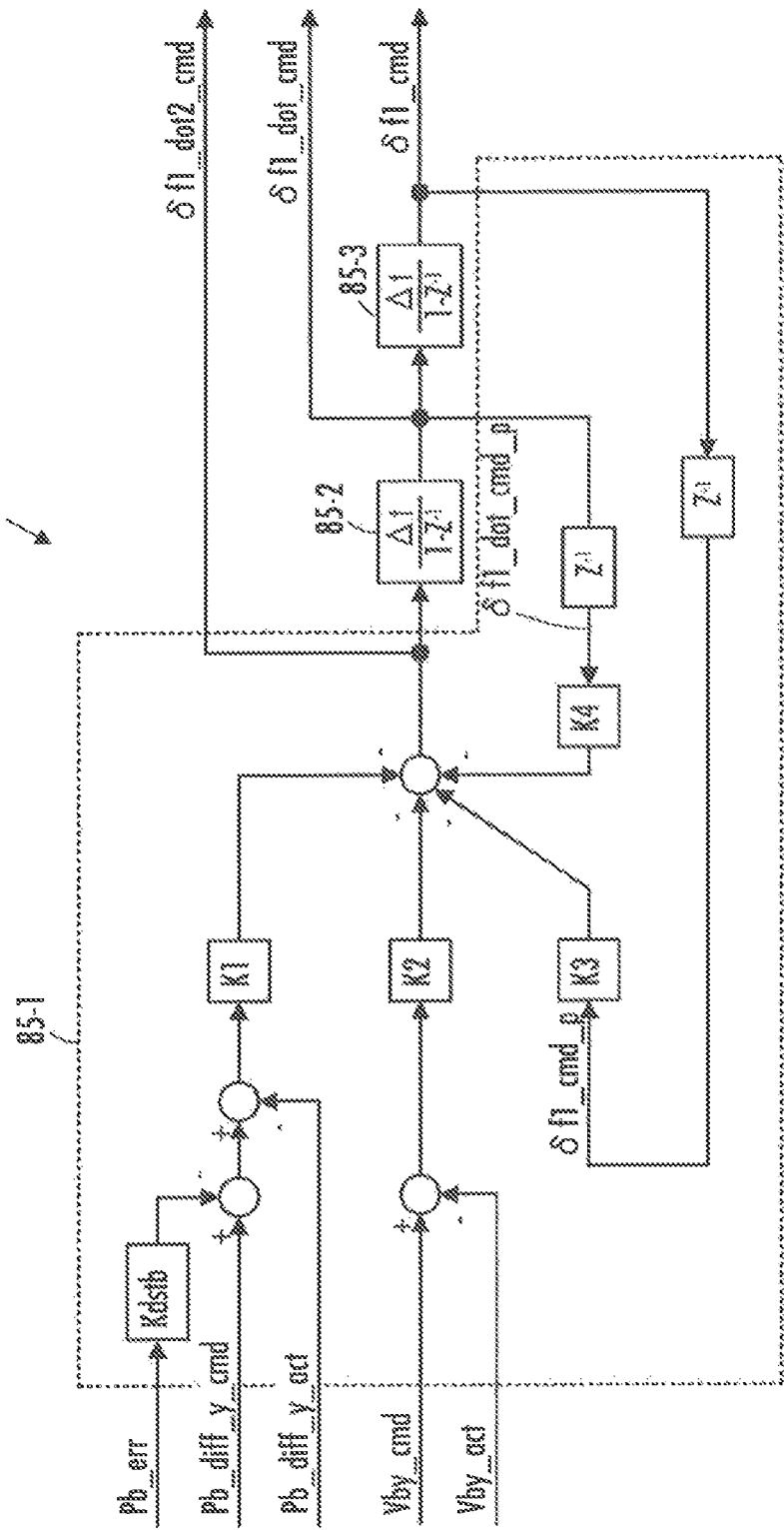
FIG. 15 is a block and line diagram showing the processing performed by the posture control arithmetic section shown in FIG. 8.

Next, the control device 60 carries out the processing in the posture control arithmetic section 85. As shown in FIG. 15, the posture control arithmetic section 85 receives: a desired inverted pendulum mass point lateral movement amount Pb_diff_y_cmd and a desired inverted pendulum mass point lateral velocity Vby_cmd determined in the desired posture state determining section 84, an estimated inverted pendulum mass point lateral movement amount Pb_diff_y_act calculated in the estimated inverted pendulum mass point lateral movement amount calculating section 81, an estimated inverted pendulum mass point lateral velocity Vby_act calculated in the estimated inverted pendulum mass point lateral velocity calculating section 82, and an estimated inverted pendulum mass point lateral displacement Pb_err calculated in the rider's center-of-gravity lateral displacement index value calculating section 83.

The posture control arithmetic section 85 uses these input values to perform the arithmetic processing shown by the block and line diagram in FIG. 15, to determine a desired first steering angle δf1_cmd, a desired first steering angular velocity δf1_dot_cmd, and a desired first steering angular acceleration δf1_dot2_cmd.

That is, the posture control arithmetic section 85 calculates the desired first steering angular acceleration δf1_dot2_cmd by the arithmetic processing of the following expression (17a). Further, the posture control arithmetic section 85 integrates the desired first steering angular acceleration δf1_dot2_cmd as shown by the following expression (17b) to calculate the desired first steering angular velocity δf1_dot_cmd. Further, the posture control arithmetic section 85 integrates the desired first steering angular velocity δf1_dot_cmd as shown by the following expression (17c) to calculate the desired first steering angle δf1_cmd.

$$\delta f1\_dot2\_cmd = -K1 * ((Pb\_diff\_y\_cmd - Kdstb * Pb\_err) - Pb\_diff\_y\_act) - K2 * (Vby\_cmd - Vby\_act) - K3 * \delta f1\_cmd\_p - K4 * \delta f1\_dot\_cmd\_p \qquad (17a)$$

$$\delta f1\_dot\_cmd = \text{integral of } \delta f1\_dot2\_cmd \qquad (17b)$$

$$\delta f1\_cmd = \text{integral of } \delta f1\_dot\_cmd \qquad (17c)$$

In FIG. 15, processing sections 85-1, 85-2, and 85-3 represent processing sections which perform the arithmetic processing of the expressions (17a), (17b), and (17c), respectively.

Here, Kdstb, K1, K2, K3, and K4 in the expression (17a) are gains of prescribed values. The values of these gains Kdstb, K1, K2, K3, and K4 are set variably in accordance with, for example, the estimated traveling speed Vox_act of the two-wheeled vehicle 1, or the detected first steering angle δf1_act and the detected second steering angle δf2_act.

In this case, in the present embodiment, the values of the gains Kdstb, K1, K2, K3, and K4 are set such that the moment in the roll direction acting on the vehicle body 2 by the steering of the front wheel 3f according to δf1_dot2_cmd, δf1_dot_cmd, and δf1_cmd will become not so large (such that the operator can lean the vehicle body 2 in the roll direction relatively easily by shifting his/her weight).

Further, the magnitudes of the gains Kdstb. K1, K2, K3, and K4 are all set variably such that they become smaller as the estimated traveling speed Vox_act of the two-wheeled vehicle 1 is higher.

δf1_cmd_p is a value (last time's value) of the desired first steering angle δf1_cmd that was determined by the posture control arithmetic section 85 in the last time's control processing cycle. δf1_dot_cmd_p is a value (last time's value) of the desired first steering angular velocity δf1_dot_cmd that was determined by the posture control arithmetic section 85 in the last time's control processing cycle.

Kdstb*Pb_err in the expression (17a) is a correction amount, applicable in the case of occurrence of lateral displacement of the center of gravity of the operator (rider) (where Pb_err≠0), i.e. in the lean-out or lean-in state, for correcting the desired inverted pendulum mass point lateral movement amount Pb_diff_y_cmd determined in the desired posture state determining section 84 in the direction of reducing Pb_err (in the direction from the lean-out or lean-in state toward the lean-with state).

Further, in the expression (17a), −K1*((Pb_diff_y_cmd−Kdstb*Pb_err)−Pb_diff_y_act) is a feedback manipulated variable component having the function of causing the deviation between the desired value (Pb_diff_y_cmd−Kdstb*Pb_err), obtained by correcting Pb_diff_y_cmd, and the estimated inverted pendulum mass point lateral movement amount Pb_diff_y_act to approach zero, −K2*(Vby_cmd−Vby_act) is a feedback manipulated variable component having the function of causing the deviation (Vby_cmd−Vby_act) to approach zero, −K3*δf1_cmd_p is a feedback manipulated variable component having the function of causing δf1_cmd to approach zero, and −K4*δf1_dot_cmd_p is a feedback manipulated variable component having the function of causing δf1_dot_cmd to approach zero.

In the above-described manner, the posture control arithmetic section 85 performs the arithmetic processing of the above expressions (17a) to (17c), at each control processing cycle, to thereby calculate δf1_cmd, δf1_dot_cmd, and δf1_dot2_cmd.

Supplementally. δf1_cmd_p and δf1_dot_cmd_p used in the computation of the expression (17a) have the meanings as pseudo estimates (alternative observed values) of the actual first steering angle and first steering angular velocity, respectively, at the present time. Therefore, instead of δf1_cmd_p, a detected first steering angle δf_act at the present time may be used. Further, instead of δf1_dot_cmd_p, a detected first steering angular velocity δf1_dot_act based on an output from the aforesaid first steering angle detector 62 may be used.

Figure 16:
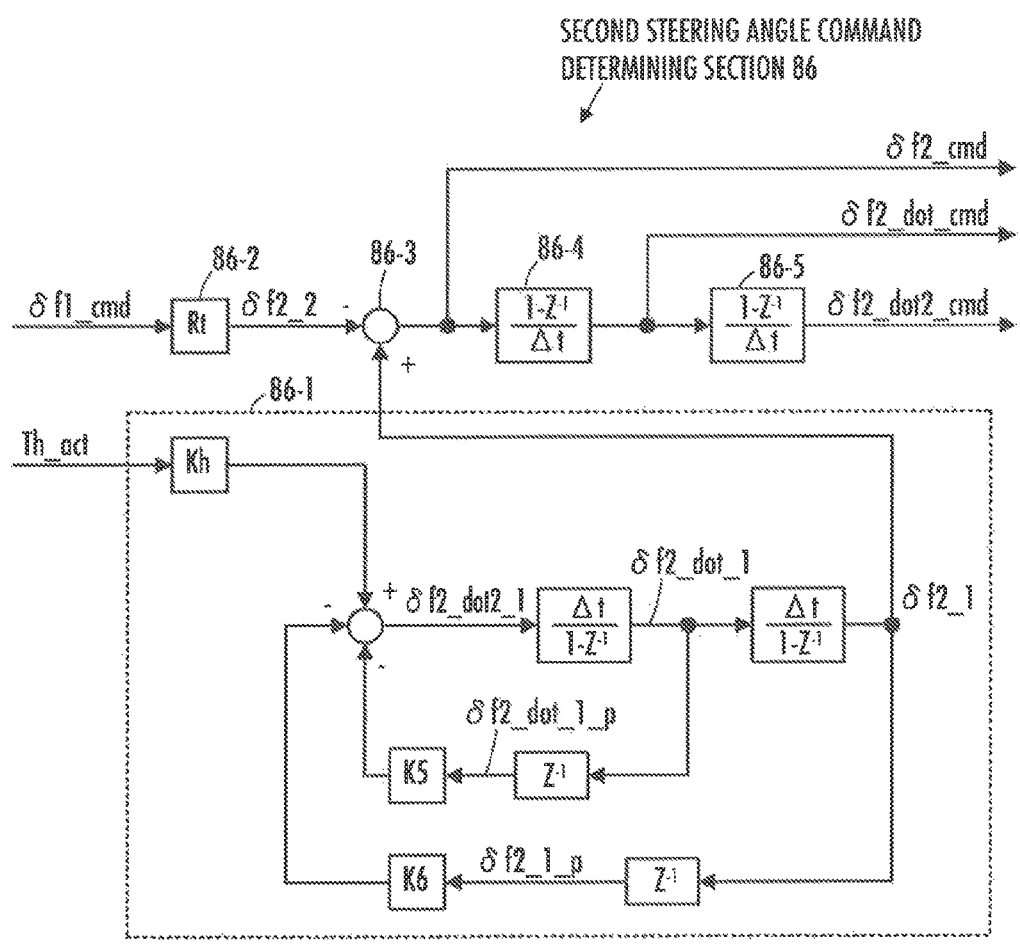
FIG. 16 is a block and line diagram showing the processing performed by the second steering angle command determining section shown in FIG. 8.

Next, the control device 60 carries out the processing in the second steering angle command determining section 86. As shown in FIG. 16, the second steering angle command determining section 86 receives: a desired first steering angle δf1_cmd determined in the posture control arithmetic section 85, and a detected value Th_act (hereinafter, referred to as "detected handlebar torque Th_act") of a handlebar torque Th indicated by an output from the aforesaid handlebar torque detector 64.

The second steering angle command determining section 86 uses these input values to perform the arithmetic processing shown by the block and line diagram in FIG. 16, to determine a desired second steering angle δf2_cmd, a desired second steering angular velocity δf2_dot_cmd, and a desired second steering angular acceleration δf2_dot2_cmd.

That is, the second steering angle command determining section 86 calculates the desired second steering angle δf2_cmd by the arithmetic processing of the following expressions (18a) to (18e). Further, the second steering angle command determining section 86 differentiates the desired second steering angle δf2_cmd, as shown by the following expression (18f), to calculate the desired second steering angular velocity δf2_dot_cmd. Further, the second steering angle command determining section 86 differentiates the desired second steering angular velocity δf2_dot_cmd, as shown by the following expression (18g), to calculate the desired second steering angular acceleration δf2_dot2 cmd.

$$δf2\_dot2\_1 = Kh*Th\_act - K5*δf2\_dot\_1\_p - K6*δf2\_y\_p \quad (18a)$$

$$δf2\_dot\_1 = \text{integral of } δf2\_dot2\_1 \quad (18b)$$

$$δf2\_1 = \text{integral of } δf2\_dot\_1 \quad (18c)$$

$$δf2\_2 = Rt*δf1\_cmd \quad (18d)$$

$$δf2\_cmd = f2\_1 - δf2\_2 \quad (18e)$$

$$δf2\_dot\_cmd = \text{differential(temporal change rate) of } δf2\_cmd \quad (18f)$$

$$δf2\_dot2\_cmd = \text{differential(temporal change rate) of } δf2\_dot\_cmd \quad (18g)$$

In FIG. 16, a processing section 86-1 represents a processing section which perform the arithmetic processing of the expressions (18a), (18b), and (18c), and processing sections 86-2, 86-3, 86-4, and 86-5 represent processing sections which perform the arithmetic processing of the expressions (18d), (18e), (18f), and (18g), respectively.

Here, δf2_dot2_1 calculated by the expression (18a) is a required value of the steering angular acceleration (of the front wheel 3f about the second steering axis Cf2) according to the handlebar torque Th that is applied about the second steering axis Cf2 by the operator's manipulation of the handlebar 46.

In this case, Kh, K5, and K6 used in the arithmetic processing of the expression (18a) are gains of prescribed values. The values of these gains Kh, K5, and K6 are set variably in accordance with, for example, the traveling speed Vox_act of the two-wheeled vehicle 1, or the detected first steering angle δf1_act and the detected second steering angle δf2_act.

Further, δf2_dot_1_p in the expression (18a) is a value (last time's value) of the steering angular velocity δf2_dot1_that was calculated by the expression (18b) in the last time's control processing cycle, and δf2_1_p is a value (last time's value) of the steering angle δf2_1 that was calculated by the expression (18c) in the last time's control processing cycle.

The first term on the right side of the expression (18a) is a feedforward manipulated variable according to the detected handlebar torque Th_act, the second term on the right side is a feedback manipulated variable for making the steering angular velocity δf2_dot_1 approach zero, and the third term on the right side is a feedback manipulated variable for making the steering angle δf2_1 approach zero. δf2_1, which is calculated by performing integration twice by the expressions (18b) and (18c) on δf2_dot2_1 calculated by the expression (18a), is a basic value of the desired second steering angle δf2_cmd.

Further, δf2_2 calculated by the expression (18d) is a steering angle correction amount for correcting the basic value δf2_1 in accordance with the desired first steering angle δf1_cmd. Rt in the expression (18d) is a coefficient for defining the ratio of the steering angle correction amount δf2_2 to the desired first steering angle δf1_cmd. The value of the coefficient Rt is set to a fixed value, or set variably in accordance with the traveling speed Vox_act of the two-wheeled vehicle 1.

As the steering angle correction amount δf2_2 calculated by the expression (18d) is subtracted from the basic value δf2_1 of the desired second steering angle δf2_cmd, the basic value δf2_1 is corrected (expression (18e)). The desired second steering angle δf2_cmd is thus determined. Further, the desired second steering angular velocity δf2_dot_cmd and the desired second steering angular acceleration δf2_dot2_cmd are determined from this desired second steering angle δf2_cmd, by the differential operations (expressions (18f) and (18g)).

In the above-described manner, the second steering angle command determining section 86 performs the arithmetic processing of the above expressions (18a) to (18g), at each control processing cycle, to thereby calculate δf2_cmd. δf2_dot_cmd, and δf2_dot2_cmd.

Figure 17:
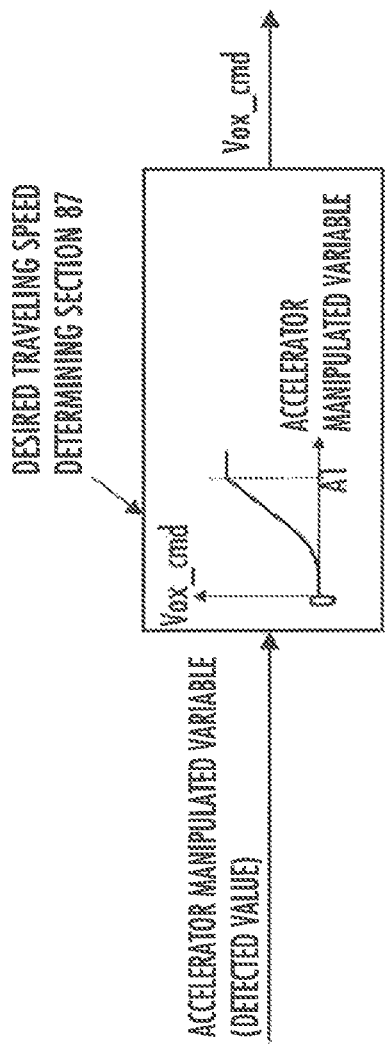
FIG. 17 is a block and line diagram showing the processing performed by the desired traveling speed determining section shown in FIG. 8.

The control device 60 further carries out the processing in the desired traveling speed determining section 87. As shown in FIG. 17, the desired traveling speed determining section 87 receives a detected value of the actual accelerator manipulated variable indicated by an output from the aforesaid accelerator manipulation detector 66.

The desired traveling speed determining section 87 determines a desired traveling speed Vox_cmd from the detected value of the accelerator manipulated variable by a preset conversion function.

This conversion function is configured, for example, by a mapping or an arithmetic expression. This conversion function is set such that Vox_cmd increases monotonically with increasing accelerator manipulated variable, as illustrated by the graph in FIG. 17, for example.

In the example shown in FIG. 17, Vox_cmd is kept at its maximum value when the detected value of the accelerator manipulated variable is A1 or greater.

Supplementally, the pattern of increase of Vox_cmd with respect to the increase of the accelerator manipulated variable may differ from that shown in FIG. 17.

A description will now be made about the control of the aforesaid first steering actuator 15, second steering actuator 37, and front-wheel driving actuator 7.

Figure 18:
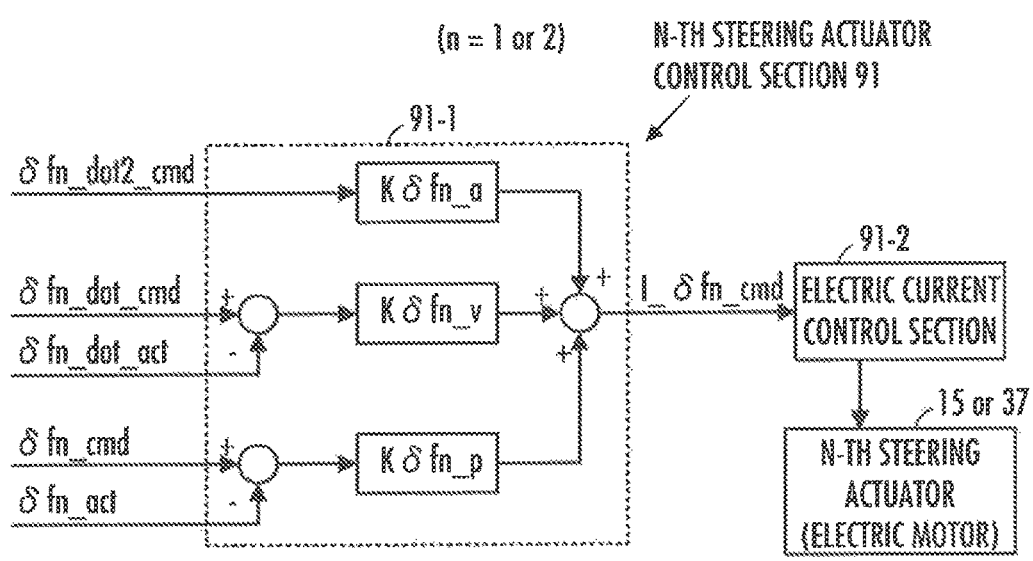
FIG. 18 is a block and line diagram showing the processing performed by a first steering actuator control section and a second steering actuator control section included in the control device in the first or second embodiment.
Figure 19:
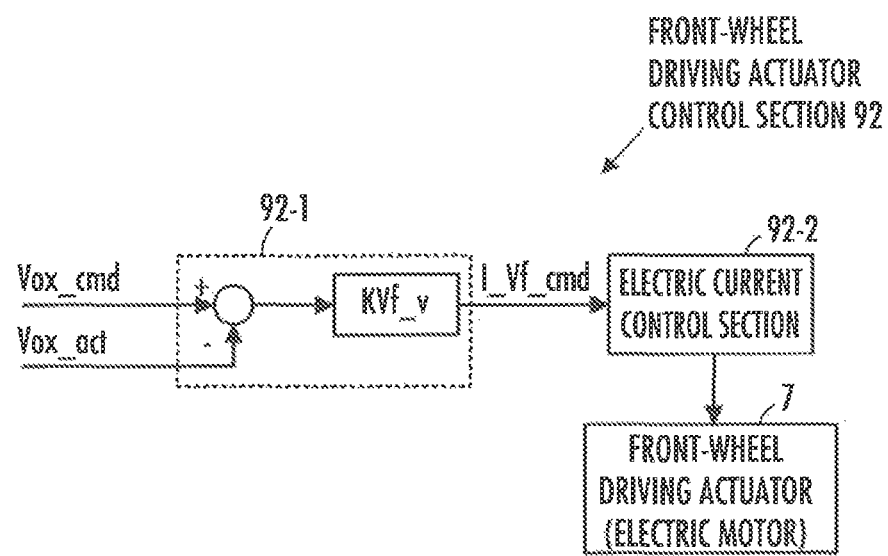
FIG. 19 is a block and line diagram showing the processing performed by a front-wheel driving actuator control section included in the control device in the first or second embodiment.

The control device 60 further includes, as functions other than those shown in FIG. 8, an n-th steering actuator control section 91 (where n=1 or 2), shown in FIG. 18, and a front-wheel driving actuator control section 92, shown in FIG. 19.

It should be noted that the control processing for the first steering actuator 15 and the second steering actuator 37 are the same. Thus, in FIG. 18, the functional sections controlling the first steering actuator 15 and the second steering actuator 37 are collectively referred to as the n-th steering actuator control section 91. In this case, n=1 for the control of the first steering actuator 15, and n=2 for the control of the second steering actuator 37.

The n-th steering actuator control section 91 performs drive control of the n-th steering actuator 15 or 37, through the control processing shown by the block and line diagram in FIG. 18, to cause the n-th steering angle (detected n-th steering angle δfn_act) of the front wheel 3f to track a desired n-th steering angle δfn_cmd.

In this example, the n-th steering actuator control section 91 receives: a desired n-th steering angle δfn_cmd, a desired n-th steering angular velocity δfn_dot_cmd, and a desired n-th steering angular acceleration δfn_dot2_cmd determined in the posture control arithmetic section 85 or the second steering angle command determining section 86 in the above-described manner, a detected n-th steering angle δfn_act, and a detected n-th steering angular velocity δfn_dot_act (detected value of the steering angular velocity of the front wheel 3f about the n-th steering axis Cfn).

It should be noted that the detected n-th steering angular velocity δfn_dot_act is a value of the steering angular velocity that is recognized on the basis of an output from the n-th steering angle detector 62 or 63, or a value calculated as a differential (temporal change rate) of the detected n-th steering angle δfn_act.

The n-th steering actuator control section 91 determines an electric current command value I_δfn_cmd, which is a desired value of the electric current passed through the n-th steering actuator 15 or 37 (electric motor), from the above-described input values by the arithmetic processing in an electric current command value determining section 91-1.

This electric current command value determining section 91-1 determines the electric current command value I_δfn_cmd by summing up: a feedback manipulated variable component obtained by multiplying the deviation between δfn_cmd and δfn_act by a gain Kδfn_p of a prescribed value, a feedback manipulated variable component obtained by multiplying the deviation between δfn_dot_cmd and δfn_dot_act by a gain Kδfn_v of a prescribed value, and a feedforward manipulated variable component obtained by multiplying δfn_dot2_cmd by a gain Kδfn_a of a prescribed value, as shown by the following expression (19).

$$I\_\delta fn\_cmd = K\delta fn\_p*(\delta fn\_cmd - \delta fn\_act) + K\delta fn\_v*(\delta fn\_dot\_cmd - \delta fn\_dot\_act) + K\delta fn\_a*\delta fn\_dot2\_cmd \quad (19)$$

The n-th steering actuator control section 91 then performs control, by an electric current control section 91-2 configured with a motor driver or the like, to cause the electric current actually passed through the n-th steering actuator 15 or 37 to match the electric current command value I_δfn_cmd.

Accordingly, control is performed such that the actual steering angle of the front wheel 3f about the n-th steering axis Cfn tracks the desired n-th steering angle δfn_cmd.

It should be noted that the technique of controlling the n-th steering actuator 15 or 37 to cause the actual steering angle of the front wheel 3f about the n-th steering axis Cfn to track the desired n-th steering angle δfn_cmd is not limited to the above-described technique; other techniques may be used as well. For example, various kinds of known servo control techniques related to electric motors (feedback control techniques for causing the actual angle of rotation of the rotor of the electric motor to track a desired value) may be adopted.

Next, the front-wheel driving actuator control section 92 performs drive control of the front-wheel driving actuator 7, through for example the control processing shown by the block and line diagram in FIG. 19, to cause the actual rotational transfer velocity of the front wheel 3f to track a desired traveling speed Vox_cmd (or to cause the actual rotational angular velocity of the front wheel 3f to track a desired rotational angular velocity corresponding to Vox_cmd).

In this example, the front-wheel driving actuator control section 92 receives: a desired traveling speed Vox_cmd determined in the desired traveling speed determining section 87 in the above-described manner, and an estimated traveling speed Vox_act calculated by the above expression (13e).

The front-wheel driving actuator control section 92 determines an electric current command value I_Vf_cmd, which is a desired value of the electric current passed through the front-wheel driving actuator 7 (electric motor), from the above-described input values by the processing in an electric current command value determining section 92-1.

This electric current command value determining section 92-1 determines, as the electric current command value I_Vf_cmd, a feedback manipulated variable component obtained by multiplying the deviation between Vox_cmd and Vox_act by a gain KVf_v of a prescribed value, as shown by the following expression (20).

$$I\_Vf\_cmd = KVf\_v*(Vox\_cmd - Vox\_act) \quad (20)$$

It should be noted that, instead of determining I_Vf_cmd by the above expression (20), it may be possible to determine I_Vf_cmd by, for example, multiplying the deviation between a value Vf_cmd, obtained by dividing Vox_cmd by cos(δ'f_act) (i.e. a desired value of the rotational transfer velocity of the front wheel 3f), and the estimated front-wheel rotational transfer velocity Vf_act by a gain of a prescribed value. Alternatively, it may be possible to determine I_Vf_cmd by multiplying the deviation between a value obtained by dividing Vf_cmd by the effective rolling radius of the front wheel 3f (i.e. a desired value of the rotational angular velocity of the front wheel 3f) and the detected value of the actual rotational angular velocity of the front wheel 3f, indicated by an output from the front-wheel rotational speed detector 65, by a gain of a prescribed value.

The front-wheel driving actuator control section 92 then performs control, by an electric current control section 92-2 configured with a motor driver or the like, to cause the electric current actually passed through the front-wheel driving actuator 7 to match the electric current command value I_Vf_cmd.

Accordingly, control is performed such that the actual rotational transfer velocity of the front wheel 3f tracks Vf_cmd (or the actual rotational angular velocity tracks a desired value of the rotational angular velocity corresponding to Vf_cmd) and, hence, that the actual traveling speed tracks the desired traveling speed Vox_cmd.

It should be noted that the technique of controlling the front-wheel driving actuator 7 to cause the traveling speed of the two-wheeled vehicle 1 or the rotational transfer velocity of the front wheel 3f to track the desired value is not limited to the above-described technique; other techniques may be used as well. For example, various kinds of known speed control techniques related to electric motors (feedback control techniques for causing the actual rotational angular velocity of the rotor of the electric motor to track a desired value) may be adopted.

The above has described the details of the control processing in the control device 60 according to the present embodiment.

Here, the correspondence between the present embodiment and the present invention will be described supplementally.

In the present embodiment, the first steering actuator 15 and the second steering actuator 37 correspond to the actuator in the present invention. In this case, they have the function as an actuator which moves the center of gravity of the vehicle body 2 in the lateral direction (Y-axis direction) so as to cause a moment in the roll direction to act on the vehicle body 2 by the gravitational force acting on the vehicle body 2.

In this case, the first steering actuator 15 is able to move the center of gravity of the vehicle body 2 in the lateral direction (Y-axis direction), without causing the ground contact point of the front wheel 3f (steered wheel) to move in the lateral direction (Y-axis direction).

Further, the second steering actuator 37 primarily has the function as an actuator which steers the front wheel 3f so as to cause the ground contact point of the front wheel 3f (steered wheel) to move in the lateral direction (Y-axis direction).

It should be noted that in the state where the second steering angle δf2 of the front wheel 3f is kept constant by the second steering actuator 37, the first steering actuator 15 has the function as the actuator which steers the front wheel 3f so as to cause the ground contact point of the front wheel 3f (steered wheel) to move in the lateral direction.

The first steering actuator 15 also has the function as the actuator which moves the center of gravity of the vehicle body 2 in the lateral direction (Y-axis direction).

Further, the rider's center-of-gravity lateral displacement index value calculating section 83 corresponds to the center-of-gravity displacement degree index value determining section in the present invention. In this case, the rider's center-of-gravity lateral displacement index value Pb_err corresponds to the center-of-gravity displacement degree index value in the present invention. Further, the position on the plane of symmetry of the vehicle body 2 corresponds to the prescribed reference position related to the position of the center of gravity of the operator.

Further, the estimated front-wheel rotational transfer velocity Vf_act, the detected first steering angle δf1_act, the detected second steering angle δf2_act, and the second estimated inverted pendulum mass point lateral velocity Pb_diff_dot_y_2 as a differential of the estimated inverted pendulum mass point lateral movement amount Pb_diff_y_act correspond to the observed values of the motional state of the mobile body (two-wheeled vehicle 1) used in the processing of the center-of-gravity displacement degree index value determining section (rider's center-of-gravity lateral displacement index value calculating section 83). In this case, Pb_diff_dot_y_2 corresponds to the observed value of the inclination state quantity of the vehicle body 2.

Further, the above expressions (12a) and (12b) correspond to the dynamics computation in the present invention. The first estimated inverted pendulum mass point lateral velocity Pb_diff_dot_y_1 calculated by the expression (12b) corresponds to the calculated value of the inclination state quantity of the vehicle body 2.

Furthermore, the posture control arithmetic section 85 corresponds to the control input determining section in the present invention, and δf1_dot2_cmd calculated by the posture control arithmetic section 85 corresponds to the control input in the present invention. The gain Kdstb in the above expression (17a) performed by the posture control arithmetic section 85 corresponds to the sensitivity of the change in control input (δf1_dot2_cmd) to the change in center-of-gravity displacement degree index value (rider's center-of-gravity lateral displacement index value Pb_err).

According to the first embodiment described above, the front wheel 3f is steered via the first steering actuator 15 and the second steering actuator 37 in such a manner that divergence of the estimated inverted pendulum mass point lateral movement amount Pb_diff_y_act from a desired inverted pendulum mass point lateral movement amount Pb_diff_y_cmd and divergence in the lateral direction of the position of the center of gravity of the operator from a position on the plane of symmetry of the vehicle body 2 are both prevented.

It is therefore possible to improve the tracking of the roll angle of the vehicle body 2 to the shift of the operator's weight.

Second Embodiment

A second embodiment of the present invention will be described below with reference to FIGS. 20 to 22. The mobile body in the present embodiment is the same as the mobile body (two-wheeled vehicle 1) in the first embodiment. The present embodiment differs from the first embodiment only in part of the control processing of the control device. Therefore, the description of the present embodiment will focus on the matters different from the first embodiment. Detailed descriptions of the matters identical to those in the first embodiment will be omitted.

Figure 20:
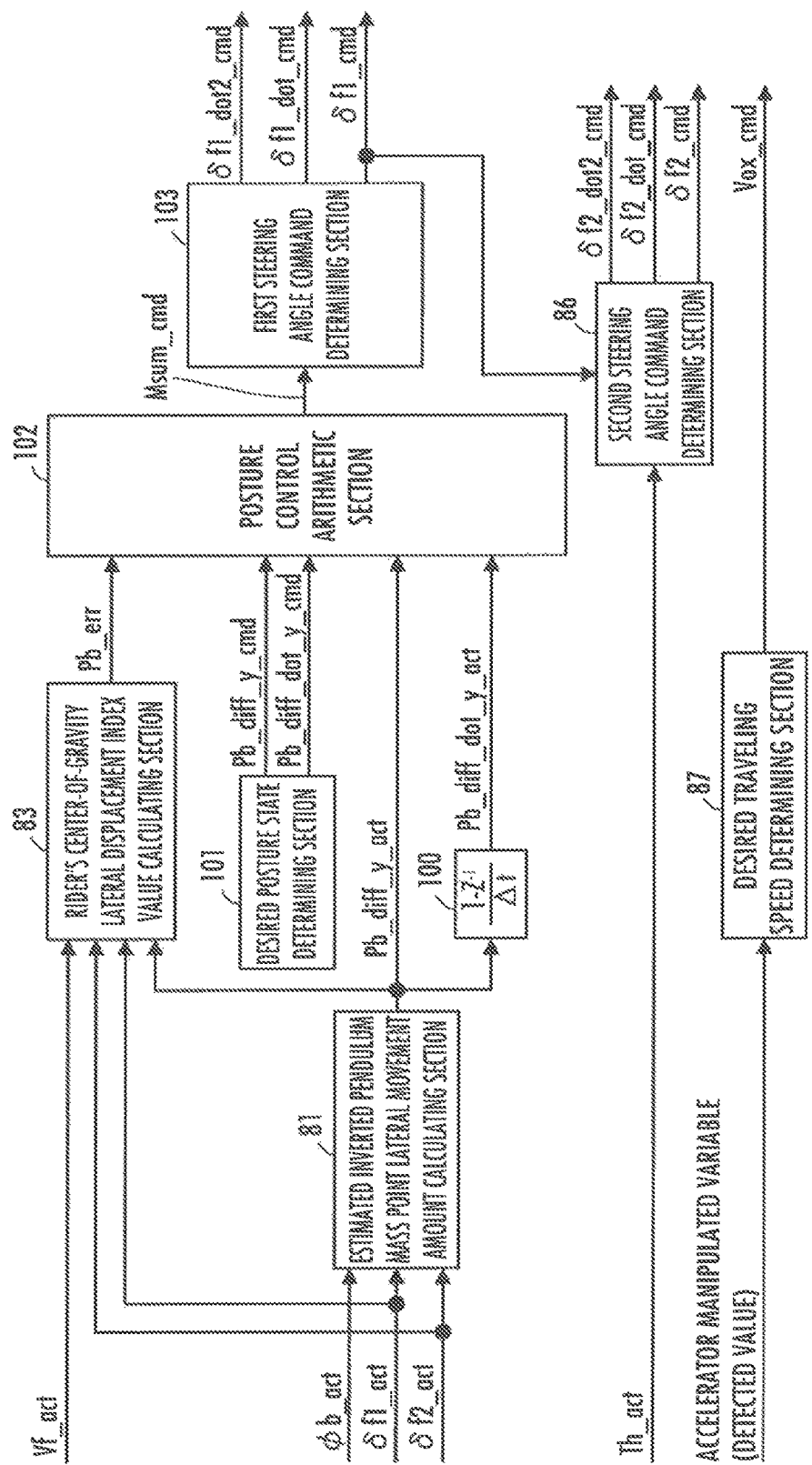
FIG. 20 is a block diagram showing the major functions of the control device in the second embodiment.

Referring to FIG. 20, in the present embodiment, the control device 60 includes, instead of the estimated inverted pendulum mass point lateral velocity calculating section 82 in the first embodiment, an estimated inverted pendulum mass point lateral velocity calculating section 100 which calculates, as an estimated inverted pendulum mass point lateral velocity, a differential (temporal change rate) Pb_diff_dot_y_act of an estimated inverted pendulum mass point lateral movement amount Pb_diff_y_act.

Further, in the present embodiment, the control device 60 includes, instead of the desired posture state determining section 84 in the first embodiment, a desired posture state determining section 101 which determines a desired inverted pendulum mass point lateral movement amount Pb_diff_y_cmd and a desired inverted pendulum mass point lateral velocity Pb_diff_dot_y_cmd as a desired value for Pb_diff_dot_y_act.

Further, in the present embodiment, the control device 60 includes, instead of the posture control arithmetic section 85 in the first embodiment, a posture control arithmetic section 102 and a first steering angle command determining section 103. The posture control arithmetic section 102 determines, as a manipulated variable (control input) for controlling the posture (inclination angle) in the roll direction of the vehicle body 2 of the two-wheeled vehicle 1, a desired posture manipulation moment Msum_cmd which is a desired value of the moment in the roll direction to be acted on the vehicle body 2. The first steering angle command determining section 103 determines, from the desired posture manipulation moment Msum_cmd, a desired first steering angular acceleration δf1_dot2_cmd, a desired first steering angular velocity δf1_dot_cmd, and a desired first steering angle δf1_cmd.

The functions of the control device 60 other than the estimated inverted pendulum mass point lateral velocity calculating section 100, the desired posture state determining section 101, the posture control arithmetic section 102, and the first steering angle command determining section 103 are the same as in the first embodiment.

The desired posture state determining section 101 determines the desired inverted pendulum mass point lateral movement amount Pb_diff_y_cmd in a similar manner as in the first embodiment. The desired posture state determining section 101 sets the desired inverted pendulum mass point lateral velocity Pb_diff_dot_y_cmd to zero, for example. The desired inverted pendulum mass point lateral velocity Pb_diff_dot_y_cmd, however, may be determined variably in accordance with, for example, the detected first steering angle δf1_act and the detected second steering angle δf2_act.

Further, the desired inverted pendulum mass point lateral movement amount Pb_diff_y_cmd may be set to zero, for example. Alternatively, the desired inverted pendulum mass point lateral movement amount Pb_diff_y_cmd may be determined variably in accordance with, for example, the detected first steering angle δf1_act and the detected second steering angle δf2_act.

The posture control arithmetic section 102 receives: an estimated inverted pendulum mass point lateral movement amount Pb_diff_y_act, an estimated inverted pendulum mass point lateral velocity Pb_diff_dot_y_act as a differential of Pb_diff_y_act, a desired inverted pendulum mass point lateral movement amount Pb_diff_y_cmd, a desired inverted pendulum mass point lateral velocity Pb_diff_dot_y_cmd, and an estimated inverted pendulum mass point lateral displacement Pb_err.

In this case, Pb_diff_y_act, Pb_diff_y_cmd, and Pb_err are the same as those explained above in the first embodiment. On the other hand, Pb_diff_dot_y_act and Pb_diff_dot_y_cmd are the values determined in the estimated inverted pendulum mass point lateral velocity calculating section 100 and the desired posture state determining section 101, respectively, in the present embodiment.

Figure 21:
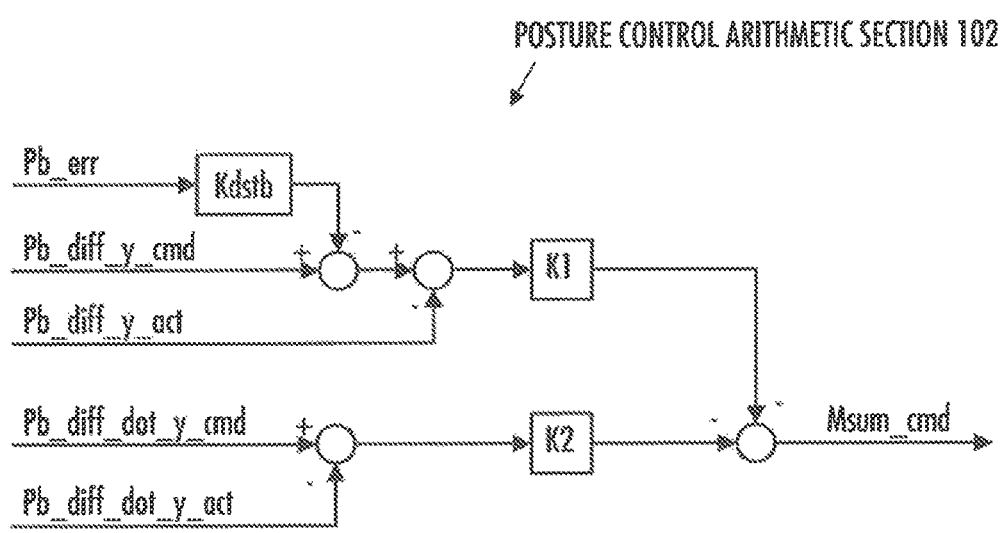
FIG. 21 is a block and line diagram showing the processing performed by the posture control arithmetic section shown in FIG. 20.

The posture control arithmetic section 102 uses these input values to perform the arithmetic processing shown by the block and line diagram in FIG. 21, to determine a desired posture manipulation moment Msum_cmd.

That is, the posture control arithmetic section 102 calculates the desired posture manipulation moment Msum_cmd by the arithmetic processing of the following expression (21).

$$M\text{sum\_cmd}=-K1*((Pb\_\text{diff}\_y\_\text{cmd}-Kdstb*Pb\_\text{err})-Pb\_\text{diff}\_y\_\text{act})-K2*(Pb\_\text{diff}\_\text{dot}\_y\_\text{cmd}-Pb\_\text{diff}\_\text{dot}\_y\_\text{act}) \quad (21)$$

Here, Kdstb, K1, and K2 in the expression (21) are gains of prescribed values. The values of these gains Kdstb, K1, and K2 are set variably in accordance with, for example, the estimated traveling speed Vox_act of the two-wheeled vehicle 1, or the detected first steering angle δf1_act and the detected second steering angle δf2_act, as in the first embodiment.

In this case, in the present embodiment, the values of the gains Kdstb, K1, and K2 are set such that the moment in the roll direction acting on the vehicle body 2 by the steering of the front wheel 3f according to δf1_dot2_cmd, δf1_dot_cmd, and δf1_cmd will become not so large (such that the operator can lean the vehicle body 2 in the roll direction relatively easily by shifting his/her weight).

Further, the magnitudes of the gains Kdstb, K1, and K2 are all set variably such that they become smaller as the estimated traveling speed Vox_act of the two-wheeled vehicle 1 is higher.

In the expression (21), $-K1*((Pb\_\text{diff}\_y\_\text{cmd}-Kdstb*Pb\_\text{err})-Pb\_\text{diff}\_y\_\text{act})$ is a feedback manipulated variable component having the function of causing the deviation between a desired value (Pb_diff_y_cmd−Kdstb*Pb_err), obtained by correcting Pb_diff_y_cmd according to Pb_err, and Pb_diff_y_act to approach zero, and $-K2*(Pb\_\text{diff}\_\text{dot}\_y\_\text{cmd}-Pb\_\text{diff}\_\text{dot}\_y\_\text{act})$ is a feedback manipulated variable component having the function of causing the deviation (Pb_diff_dot_y_cmd−Pb_diff_dot_y_act) to approach zero.

In the above-described manner, in the present embodiment, the posture control arithmetic section 102 performs the arithmetic processing of the expression (21), at each control processing cycle, to thereby calculate the desired posture manipulation moment Msum_cmd.

Here, the reasons why Pb_diff_dot_y_cmd and Pb_diff_dot_y_act are used instead of Vby_cmd and Vby_act in the arithmetic processing in the posture control arithmetic section 102 in the present embodiment will be described supplementally.

In the first embodiment described above, the desired first steering angular acceleration δf1_dot2_cmd is used as a basic control input for manipulation of the posture of the vehicle body 2 (for manipulation of the inverted pendulum mass point lateral movement amount Pb_diff_y). In this case, the state equation regarding the posture control of the vehicle body 2 is expressed by the following expression (22).

$$\frac{d}{dt}\begin{pmatrix} Pb\_\text{diff}\_y \\ Vby \\ \delta f1 \\ \delta f1\_\text{dot} \end{pmatrix} = \begin{pmatrix} 0 & 1 & -Vox\cdot\frac{Lr}{L}\cdot\cos(\theta cs) & 0 \\ \frac{g}{h'} & 0 & -f(\delta f1, Vox) & 0 \\ 0 & 0 & 0 & 1 \\ 0 & 0 & 0 & 0 \end{pmatrix}\cdot\begin{pmatrix} Pb\_\text{diff}\_y \\ Vby \\ \delta f1 \\ \delta f1\_\text{dot} \end{pmatrix} + \quad (22)$$

-continued $$\begin{pmatrix} 0 \\ 0 \\ 0 \\ 0 \\ 1 \end{pmatrix} \cdot \delta f1\_dot2\_cmd$$

It should be noted that f(δf1,Vox) represents a function of the first steering angle δf1 and the traveling speed Vox of the two-wheeled vehicle 1.

Therefore, the controlled state quantities become four parameters of Pb_diff_y. Vby, δf1, and δf1_dot.

On the other hand, in the second embodiment, the desired posture manipulation moment Msum_cmd as a desired value of the moment in the roll direction is used as a basic control input for manipulation of the posture of the vehicle body 2 (for manipulation of the inverted pendulum mass point lateral movement amount Pb_diff_y). In this case, the state equation regarding the posture control of the vehicle body 2 is expressed by the following expression (23).

$$\frac{d}{dt}\begin{pmatrix} Pb\_diff\_y \\ Pb\_diff\_dot\_y \end{pmatrix} = \begin{pmatrix} 0 & 1 \\ \frac{g}{h'} & 0 \end{pmatrix} \cdot \begin{pmatrix} Pb\_diff\_y \\ Pb\_diff\_dot\_y \end{pmatrix} + \begin{pmatrix} 0 \\ -\frac{1}{m1 \cdot h'} \end{pmatrix} \cdot Msum\_cmd \quad (23)$$

Therefore, the controlled state quantities become two parameters of Pb_diff_y and Pb_diff_dot_y. Accordingly, in the present embodiment, Pb_diff_dot_y_cmd and Pb_diff_dot_y_act are used instead of Vby_cmd and Vby_act in the arithmetic processing in the posture control arithmetic section 102.

Next, the first steering angle command determining section 103 receives a desired posture manipulation moment Msum_cmd determined in the posture control arithmetic section 102. The first steering angle command determining section 103 uses the input value of Msum_cmd to perform the arithmetic processing shown by the block and line diagram in FIG. 22, to determine a desired first steering angle δf1_cmd, a desired first steering angular velocity δf1_dot_cmd, and a desired first steering angular acceleration δf1_dot2_cmd.

That is, the first steering angle command determining section 103 determines δf1_cmd, δf1_dot_cmd, and δf1_dot2_cmd by the arithmetic processing of the following expressions (24a), (24b), and (24c).

δf1_cmd=f1(Msum_cmd) (24a)

δf1_dot_cmd=differential(temporal change rate) of δf1_cmd (24b)

δf1_dot2_cmd=differential(temporal change rate) of δf1_dot_cmd (24c)

Figure 22:
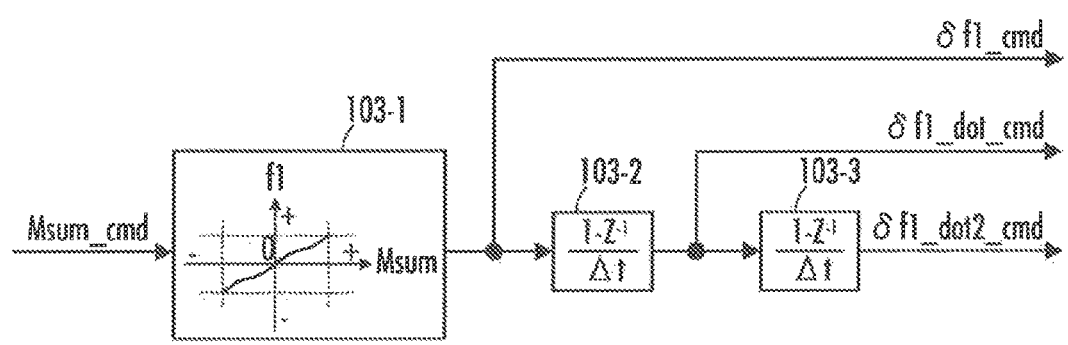
FIG. 22 is a block and line diagram showing the processing performed by the first steering angle command determining section shown in FIG. 20.

In FIG. 22, processing sections 103-1, 103-2, and 103-3 represent processing sections which perform the arithmetic processing of the expressions (24a), (24b), and (24c), respectively.

Here, f1(Msum_cmd) in the expression (24a) is a function value which is determined by a preset conversion function f1(Msum) from the value of Msum_cmd in the processing section 103-1 in FIG. 22. Therefore, by the conversion function f1(Msum), Msum_cmd is converted into δf1_cmd as a function value of that conversion function.

The conversion function f1(Msum) is configured, for example, by a mapping or an arithmetic expression. In the present embodiment, the conversion function f1(Msum) has been set, as illustrated by the graph in the processing section 103-1, such that the value of f1 (=value of δf1_cmd) increases monotonically from a value on the negative side to a value on the positive side as the value of Msum increases (from a value on the negative side to a value on the positive side).

In the above-described manner, the first steering angle command determining section 103 performs the arithmetic processing of the above expressions (24a) to (24c), at each control processing cycle, to thereby calculate δf1_cmd, δf1_dot_cmd, and δf1_dot2_cmd.

The present embodiment is identical to the first embodiment except for the matters described above.

Here, the correspondence between the present embodiment and the present invention will be described supplementally. The posture control arithmetic section 102 corresponds to the control input determining section in the present invention, and Msum_cmd calculated by the posture control arithmetic section 102 corresponds to the control input in the present invention. The gain Kdstb in the above expression (21) performed by the posture control arithmetic section 102 corresponds to the sensitivity of the change in control input (Msum_cmd) to the change in center-of-gravity displacement degree index value (rider's center-of-gravity lateral displacement index value Pb_err).

Otherwise, the correspondence between the present embodiment and the present invention is identical to that in the first embodiment.

According to the second embodiment described above, it is possible to achieve the effects similar to those in the first embodiment.

Third Embodiment

Figure 23:
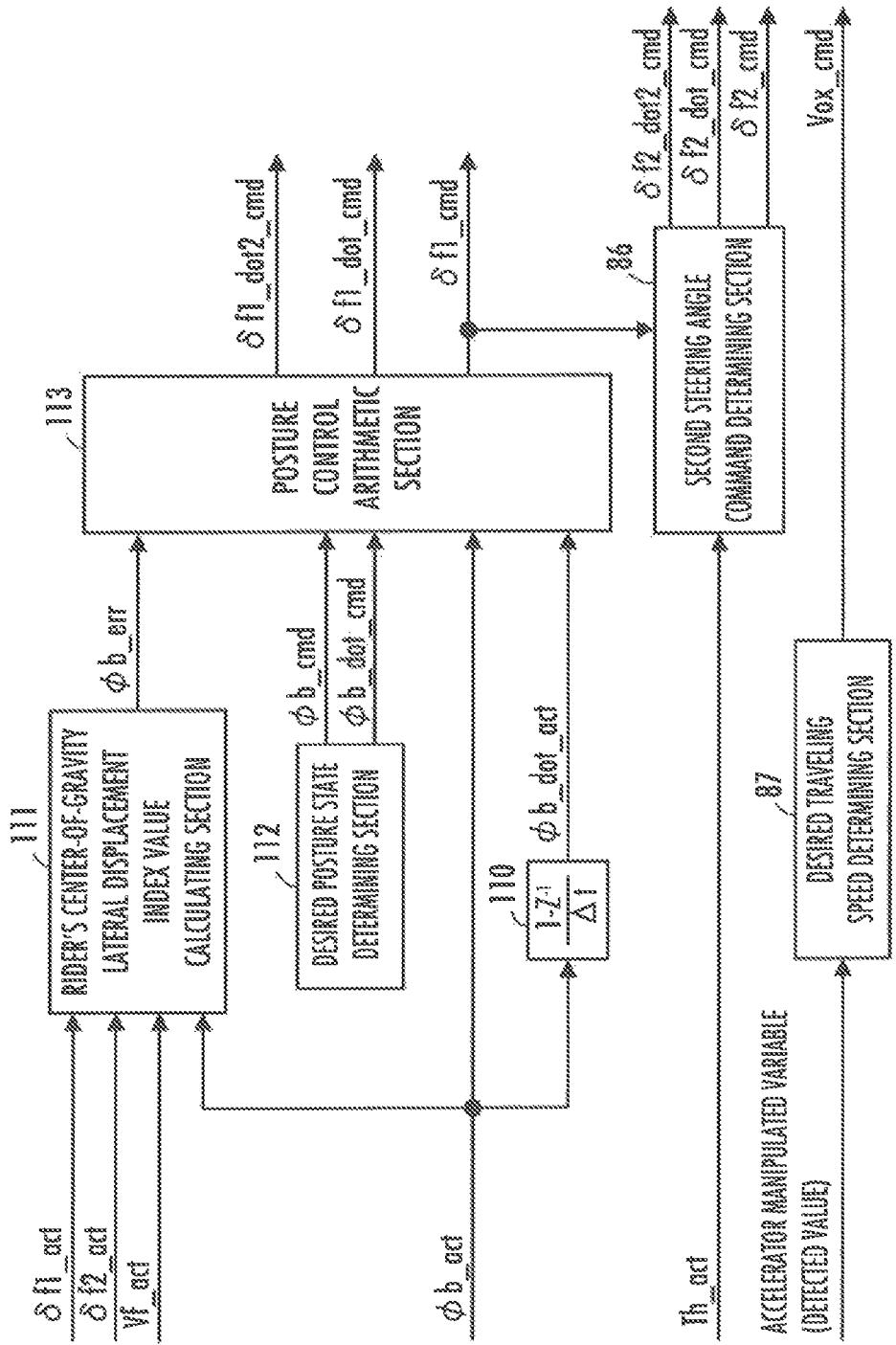
FIG. 23 is a block diagram showing the major functions of the control device in the third embodiment.

A third embodiment of the present invention will now be described with reference to FIGS. 23 to 25. The mobile body in the present embodiment is the same as the mobile body (two-wheeled vehicle 1) in the first embodiment. The present embodiment differs from the first embodiment only in part of the control processing of the control device. Therefore, the description of the present embodiment will focus on the matters different from the first embodiment. Detailed descriptions of the matters identical to those in the first embodiment will be omitted.

In the first embodiment described above, the inverted pendulum mass point lateral movement amount Pb_diff_y and the inverted pendulum mass point lateral velocity Vby for the inverted pendulum mass point 71 in the two-mass-point model were used as the controlled state quantities.

In contrast, in the present embodiment, the roll angle φb of the vehicle body 2 and its temporal change rate, or, the roll angular velocity φb_dot are used as the controlled state quantities.

Described below more specifically, the control device 60 in the present embodiment includes, as functions implemented when the CPU executes installed programs (functions implemented by software) or as functions implemented by hardware configurations, the functions shown by the block diagram in FIG. 23.

That is, the control device 60 includes: a roll angular velocity detecting section 110 which calculates a differential (temporal change rate) of the detected roll angle φb_act of the vehicle body 2 as a detected value φb_dot_act (hereinafter, referred to as "detected roll angular velocity φb_dot_act") of the roll angular velocity φb_dot, a rider's center-of-gravity lateral displacement index value calculating section 111 which calculates, as the aforesaid rider's center-of-gravity lateral displacement index value, an estimate φb_err (hereinafter, referred to as "estimated vehicle body inclination angle displacement φb_err") of the deviation between an estimate of the roll angle φb of the vehicle body 2 when the vehicle body 2 is leaned in the roll direction to cause the operator's center of gravity to be placed on the plane of symmetry of the vehicle body 2 and the detected roll angle φb_act as a value of the actual roll angle 4b, and a desired posture state determining section 112 which determines a desired value φb_cmd (hereinafter, referred to as "desired roll angle φb_cmd") of the roll angle φb of the vehicle body 2 and a desired value φb_dot_cmd (hereinafter, referred to as "desired roll angular velocity φb_dot_cmd") of the roll angular velocity φb_dot.

The control device 60 further includes: a posture control arithmetic section 113 which determines a desired first steering angle δf1_cmd, a desired first steering angular velocity δf1_dot_cmd, and a desired first steering angular acceleration δf1_dot2_cmd as primary control inputs (manipulated variables) for controlling the posture in the roll direction of the vehicle body 2, a second steering angle command determining section 86 which determines a desired second steering angle δf2_cmd, a desired second steering angular velocity δf2_dot_cmd, and a desired second steering angular acceleration δf2_dot2_cmd, and a desired traveling speed determining section 87 which determines a desired traveling speed Vox_cmd. The second steering angle command determining section 86 and the desired traveling speed determining section 87 are identical to those in the first embodiment.

In the present embodiment, the processing in the rider's center-of-gravity lateral displacement index value calculating section 111, the desired posture state determining section 112, and the posture control arithmetic section 113 are carried out, at each control processing cycle, in the following manner.

First, the desired posture state determining section 112 determines, as the desired roll angle φb_cmd, a roll angle φb_lean which is calculated by the expression (16a) explained above in conjunction with the first embodiment, for example. The section 112 sets the desired roll angular velocity φb_dot_cmd to zero, for example. It should be noted that the desired roll angular velocity φb_dot_cmd may be determined variably in accordance with, for example, the detected first steering angle δf1_act and the detected second steering angle δf2_act.

Further, the desired roll angle φb_cmd may be set to zero, for example. Alternatively, the desired roll angle φb_cmd may be determined variably in accordance with, for example, the detected first steering angle δf1_act and the detected second steering angle δf2_act.

Figure 24:
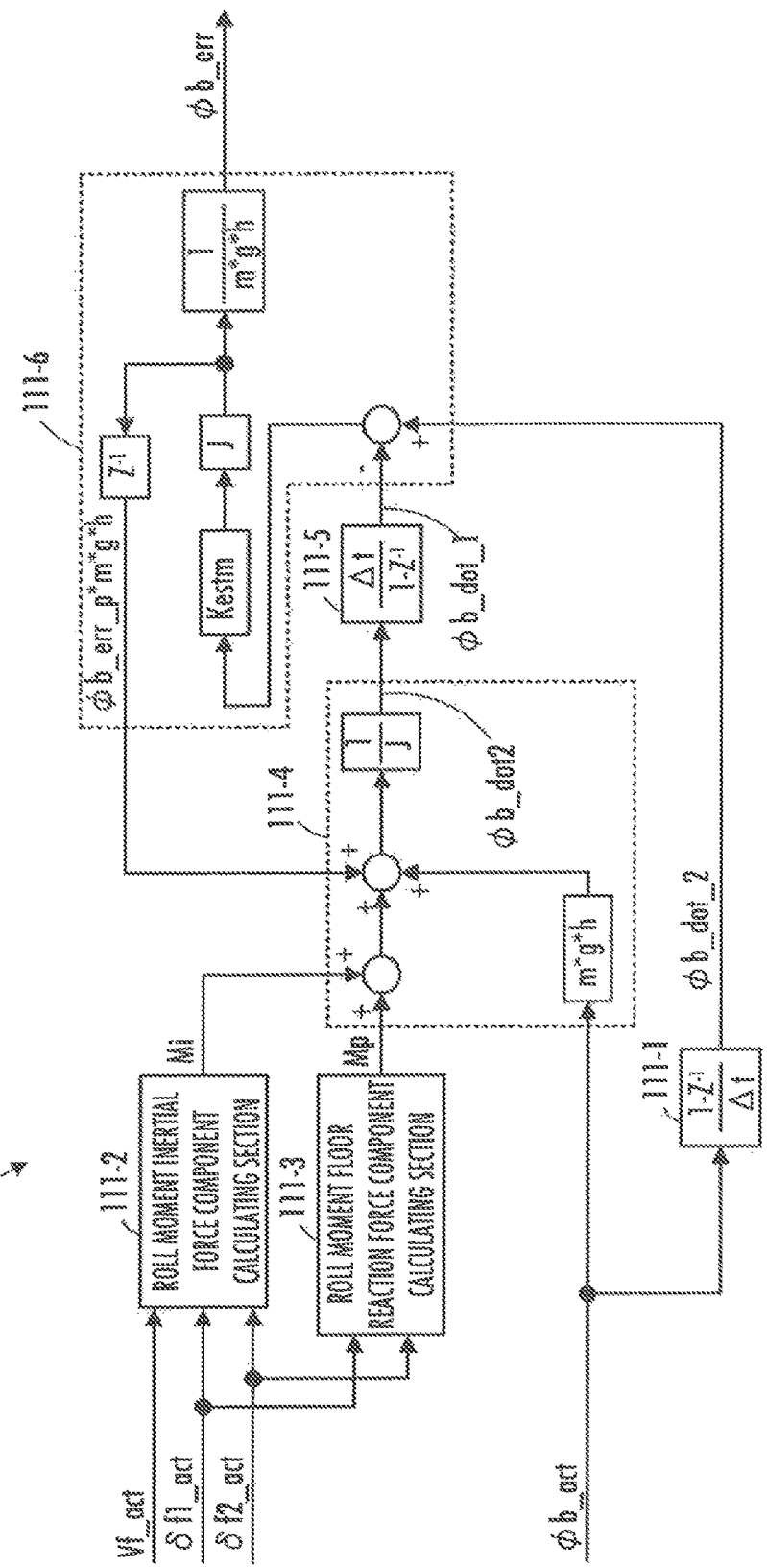
FIG. 24 is a block and line diagram showing the processing performed by the rider's center-of-gravity lateral displacement index value calculating section shown in FIG. 23.

As shown in FIG. 24, the rider's center-of-gravity lateral displacement index value calculating section 111 receives: a detected roll angle φb_act, a detected first steering angle δf1_act and a detected second steering angle δf2_act, and an estimated front-wheel rotational transfer velocity Vf_act.

The rider's center-of-gravity lateral displacement index value calculating section 111 calculates an estimated vehicle body inclination angle displacement φb_err as a rider's center-of-gravity lateral displacement index value, through the arithmetic processing shown by the block and line diagram in FIG. 24. In this case, the rider's center-of-gravity lateral displacement index value calculating section 111 is configured as an observer, as in the first embodiment.

Specifically, the rider's center-of-gravity lateral displacement index value calculating section 111 calculates an estimate of the aforesaid roll moment inertial force component Mi and an estimate of the aforesaid roll moment floor reaction force component Mp by a roll moment inertial force component calculating section 111-2 and a roll moment floor reaction force component calculating section 111-3, respectively, on the basis of the input values of δf1_act. δf2_act, and Vf_act.

In this case, the roll moment inertial force component calculating section 111-2 calculates an estimate of the roll moment inertial force component Mi by the arithmetic processing similar to that in the first embodiment. More specifically, the roll moment inertial force component calculating section 111-2 calculates an estimate of Mi by performing the arithmetic processing of the above expressions (13a) to (13e) and the following expression (13f) which is obtained by replacing m1*h' on the right side of the above expression (13f) with m*h.

$$Mi=(Voy\_dot\_act+\omega z\_act^* Vox\_act)^* m^* h \qquad (13f)$$

Further, the roll moment floor reaction force component calculating section 111-3 calculates an estimate of the roll moment floor reaction force component Mp by performing the arithmetic processing of the above expression (14a), included in the arithmetic processing by the roll moment floor reaction force component calculating section 83-3 in the first embodiment, and the following expression (14d) which is obtained by setting p2 in the expression (14c) to zero.

$$Mp=Pfy(\delta f1\_act+\delta f2\_act)^*(Lr/L)^* m^* g \qquad (14d)$$

The rider's center-of-gravity lateral displacement index value calculating section 111 then carries out a dynamics computation according to the following expression (25a) in a processing section 111-4, on the basis of the estimates of Mi and Mp, the input value of φb_act, and a value (last time's value) φb_err_p of the estimated vehicle body inclination angle displacement φb_err calculated in the last time's control processing cycle, to thereby calculate an estimate of the roll angular acceleration φb_dot2 of the vehicle body 2.

Stated differently, the last time's value φb_err_p corresponds to the latest one of the estimated vehicle body inclination angle displacements φb_err calculated up to then.

$$\phi b\_dot2=(m^*g^*h^*(\phi b\_act+b\_err\_p)+Mp+Mi)/J \qquad (25a)$$

In the expression (25a), J is a predetermined, set value of the inertia of the entirety of the two-wheeled vehicle 1 (including the operator) about the X axis of the aforesaid XYZ coordinate system.

The rider's center-of-gravity lateral displacement index value calculating section 111 then integrates, in a processing section 111-5. φb_dot2 calculated by the above expression (25a), to thereby calculate a first estimated roll angular velocity φb_dot_as a first estimate of the roll angular velocity φb_dot of the vehicle body 2, as shown by the following expression (25b).

$$\phi b\_dot\_=\text{integral of } \phi b\_dot2 \qquad (25b)$$

Further, the rider's center-of-gravity lateral displacement index value calculating section 111 performs a differential operation on the input value of φb_act in a processing section 111-1, to thereby calculate a second estimated roll angular velocity φb_dot_2 as a second estimate of the roll angular velocity φb_dot of the vehicle body 2, as shown by the following expression (25c).

$$\phi b\_dot\_2 = \text{differential(temporal change rate) of } \phi b\_act \qquad (25c)$$

It should be noted that φb_dot_2 calculated by the expression (25c) is the same as the detected roll angular velocity φb_dot_act calculated in the roll angular velocity detecting section 110. Therefore, the detected roll angular velocity φb_dot_act may be used, without modification, as the second estimated roll angular velocity φb_dot_2.

Here, the first estimated roll angular velocity φb_dot_1 calculated by the above expression (25b) corresponds to the estimate of the roll angle of the vehicle body 2 calculated by assuming that the overall center of gravity G of the two-wheeled vehicle 1 is located on the plane of symmetry of the vehicle body 2.

Therefore, the deviation between the second estimated roll angular velocity φb_dot_2 and the first estimated roll angular velocity φb_dot_1, calculated dynamically according to the above expressions (25a) and (25b), becomes a value depending on the vehicle body inclination angle displacement amount caused by the lateral displacement of the center of gravity of the operator.

Therefore, the rider's center-of-gravity lateral displacement index value calculating section 111 calculates the estimated vehicle body inclination angle displacement φb_err in a processing section 111-6 by the arithmetic processing of the following expression (25d).

$$\phi b\_err=(\phi b\_dot\_2-\phi b\_dot\_1)*Kestm*J/(m*g*h) \quad (25d)$$

Kestm used in the arithmetic processing of this expression (25d) is a predetermined gain of a prescribed value. It should be noted that φb_err calculated by this expression (25d) takes a negative value when the center of gravity of the operator is displaced on the lean-in side from a position on the plane of symmetry of the vehicle body 2, and takes a positive value when it is displaced on the lean-out side.

Supplementally, Kestm*J/(m*g*h) in the expression (25d) may be set in advance as a single gain value.

Further, in the block and line diagram in FIG. 24, the last time's value (=b_err_p*m*g*h) of (φb_dot_2−φb_dot_1)*Kestm*J is input to the processing section 111-4 from the processing section 111-6. However, the last time's value φb_err_p of the estimated vehicle body inclination angle displacement φb_err, for example, may be directly input to the processing section 111-4.

In the above-described manner, the rider's center-of-gravity lateral displacement index value calculating section 111 in the present embodiment calculates the estimates of Mi and Mp, and uses these estimates and the detected vehicle body roll angle φb_act to perform the arithmetic processing of the expressions (25a) to (25d), to thereby calculate the estimated vehicle body inclination angle displacement φb_err.

Figure 25:
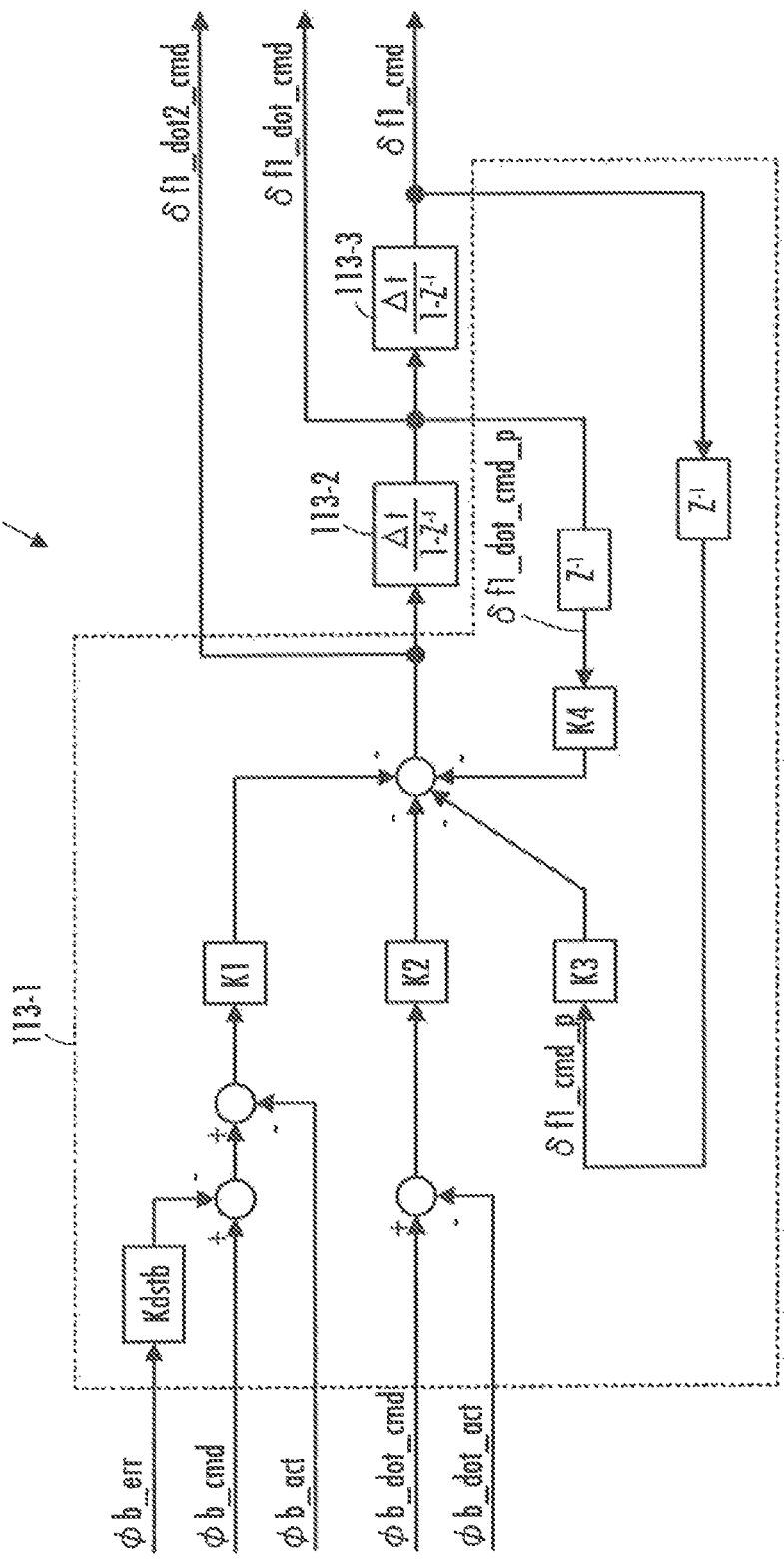
FIG. 25 is a block and line diagram showing the processing performed by the posture control arithmetic section shown in FIG. 23.

Next, as shown in FIG. 25, the posture control arithmetic section 113 receives: a desired roll angle φb_cmd and a desired roll angular velocity φb_dot_cmd, determined in the desired posture state determining section 112, a detected roll angle φb_act and a detected roll angular velocity φb_dot_act, and an estimated vehicle body inclination angle displacement φb_err calculated in the rider's center-of-gravity lateral displacement index value calculating section 111.

The posture control arithmetic section 113 uses these input values to perform the arithmetic processing shown by the block and line diagram in FIG. 25, to determine a desired first steering angle δf1_cmd, a desired first steering angular velocity δf1_dot_cmd, and a desired first steering angular acceleration δf1_dot2_cmd.

That is, the posture control arithmetic section 113 calculates the desired first steering angular acceleration δf1_dot2_cmd by the arithmetic processing of the following expression (26a), which is similar in form to the above expression (17a) in the first embodiment. Further, the posture control arithmetic section 113 performs integration operations on δf1_dot2_cmd, as shown by the following expressions (26b) and (26c), to calculate the desired first steering angular velocity δf1_dot_cmd and the desired first steering angle δf1_cmd. The expressions (26b) and (26c) are identical to the above expressions (17b) and (17c), respectively.

$$\delta f1\_dot2\_cmd=-K1*((\phi b\_cmd-Kdstb*\phi b\_err)-\phi b\_act)-K2*(\phi b\_dot\_cmd-\phi b\_dot\_act)-K3*\delta f1\_cmd\_p-K4*\delta f1\_dot\_cmd\_p \quad (26a)$$

$$\delta f1\_dot\_cmd=\text{integral of } \delta f1\_dot2\_cmd \quad (26b)$$

$$\delta f1\_cmd=\text{integral of } \delta f1\_dot\_cmd \quad (26c)$$

In FIG. 25, processing sections 113-1, 113-2, and 113-3 represent processing sections which perform the arithmetic processing of the expressions (26a), (26b), and (26c), respectively.

Here, Kdstb, K1, K2, K3, and K4 in the expression (26a) are gains of prescribed values. The values of these gains Kdstb, K1, K2, K3, and K4 are set variably in accordance with, for example, the estimated traveling speed Vox_act of the two-wheeled vehicle 1, or the detected first steering angle δf1_act and the detected second steering angle δf2_act.

In this case, the values of the gains Kdstb, K1, K2, K3, and K4 are set such that the moment in the roll direction acting on the vehicle body 2 by the steering of the front wheel 3f according to δf1_dot2_cmd, δf1_dot_cmd, and δf1_cmd will become not so large (such that the operator can lean the vehicle body 2 in the roll direction relatively easily by shifting his/her weight).

Further, the magnitudes of the gains Kdstb, K1, K2, K3, and K4 are all set variably such that they become smaller as the estimated traveling speed Vox_act of the two-wheeled vehicle 1 is higher.

It should be noted that the values of the gains Kdstb, K1. K2, K3, and K4 are generally different from those in the first embodiment.

Kdstb*φb_err in the expression (26a) is a correction amount, applicable in the case of occurrence of lateral displacement of the center of gravity of the operator (rider) (where φb_err≠0). i.e. in the lean-out or lean-in state, for correcting the desired roll angle φb_cmd determined in the desired posture state determining section 112 in the direction of reducing φb_err (in the direction from the lean-out or lean-in state toward the lean-with state).

Further, in the expression (26a), −K1*((φb_cmd−Kdstb*φb_err)−φb_act) is a feedback manipulated variable component having the function of causing the deviation between the desired value (φb_cmd−Kdstb*φb_err) obtained by correcting φb_cmd and the detected roll angle φb_act to approach zero, −K2*(φb_dot_cmd−φb_dot_act) is a feedback manipulated variable component having the function of causing the deviation (φb_dot_cmd−φb_dot_act) to approach zero, −K3*δf1_cmd_p is a feedback manipulated variable component having the function of causing δf1_cmd to approach zero, and −K4*δf1_dot_cmd_p is a feedback manipulated variable component having the function of causing δf1_dot_cmd to approach zero.

In the above-described manner, the posture control arithmetic section 113 performs the arithmetic processing of the above expressions (26a) to (26c), at each control processing cycle, to thereby calculate δf1_cmd, δf1_dot_cmd, and δf1_dot2_cmd.

The present embodiment is identical to the first embodiment except for the matters described above.

Here, the correspondence between the present embodiment and the present invention will be described supplementally.

In the present embodiment, the first steering actuator 15 and the second steering actuator 37 correspond to the actuator in the present invention. In this case, they have the function as an actuator which moves the center of gravity of the vehicle body 2 in the lateral direction (Y-axis direction) so as to cause a moment in the roll direction to act on the vehicle body 2 by the gravitational force acting on the vehicle body 2.

In this case, the first steering actuator 15 is able to move the center of gravity of the vehicle body 2 in the lateral direction (Y-axis direction), without causing the ground contact point of the front wheel 3f (steered wheel) to move in the lateral direction (Y-axis direction).

Further, the second steering actuator 37 primarily has the function as an actuator which steers the front wheel 3f so as to cause the ground contact point of the front wheel 3f (steered wheel) to move in the lateral direction (Y-axis direction).

It should be noted that in the state where the second steering angle δf2 of the front wheel 3f is kept constant by the second steering actuator 37, the first steering actuator 15 has the function as the actuator which steers the front wheel 3f so as to cause the ground contact point of the front wheel 3f (steered wheel) to move in the lateral direction.

The first steering actuator 15 also has the function as the actuator which moves the center of gravity of the vehicle body 2 in the lateral direction (Y-axis direction).

Further, the rider's center-of-gravity lateral displacement index value calculating section 111 corresponds to the center-of-gravity displacement degree index value determining section in the present invention. In this case, the rider's center-of-gravity lateral displacement index value φb_err corresponds to the center-of-gravity displacement degree index value in the present invention. Further, the position on the plane of symmetry of the vehicle body 2 corresponds to the prescribed reference position related to the position of the center of gravity of the operator.

Further, the estimated front-wheel rotational transfer velocity Vf_act, the detected first steering angle δf1_act, the detected second steering angle δf2_act, and the second estimated roll angular velocity φb_dot_2 (=detected roll angular velocity φb_dot_act) as a differential of the detected roll angle φb_act correspond to the observed values of the motional state of the mobile body (two-wheeled vehicle 1) used in the processing of the center-of-gravity displacement degree index value determining section (rider's center-of-gravity lateral displacement index value calculating section 111). In this case, φb_dot_2 corresponds to the observed value of the inclination state quantity of the vehicle body 2.

Further, the above expressions (25a) and (25b) correspond to the dynamics computation in the present invention. The first estimated roll angular velocity φb_dot_1 calculated by the expression (25b) corresponds to the calculated value of the inclination state quantity of the vehicle body 2.

It should be noted that the dynamics computation in this case becomes the dynamics computation based on the dynamic model of the system made up of the mass point of the mass m (mass point of the overall center of gravity) and the inertia J.

Furthermore, the posture control arithmetic section 113 corresponds to the control input determining section in the present invention, and δf1_dot2_cmd calculated by the posture control arithmetic section 113 corresponds to the control input in the present invention. The gain Kdstb in the above expression (26a) performed by the posture control arithmetic section 113 corresponds to the sensitivity of the change in control input (δf1_dot2_cmd) to the change in center-of-gravity displacement degree index value (rider's center-of-gravity lateral displacement index value φb_err).

According to the third embodiment described above, it is possible to achieve the effects similar to those in the first embodiment. The first or second embodiment, however, is more advantageous than the third embodiment in terms of improving the reliability of the posture control of the vehicle body 2.

Fourth Embodiment

A fourth embodiment of the present invention will be described below with reference to FIGS. 26 and 27. The mobile body in the present embodiment is the same as the mobile body (two-wheeled vehicle 1) in the third embodiment. The present embodiment differs from the third embodiment only in part of the control processing of the control device. Therefore, the description of the present embodiment will focus on the matters different from the third embodiment. Detailed descriptions of the matters identical to those in the third embodiment will be omitted.

Figure 26:
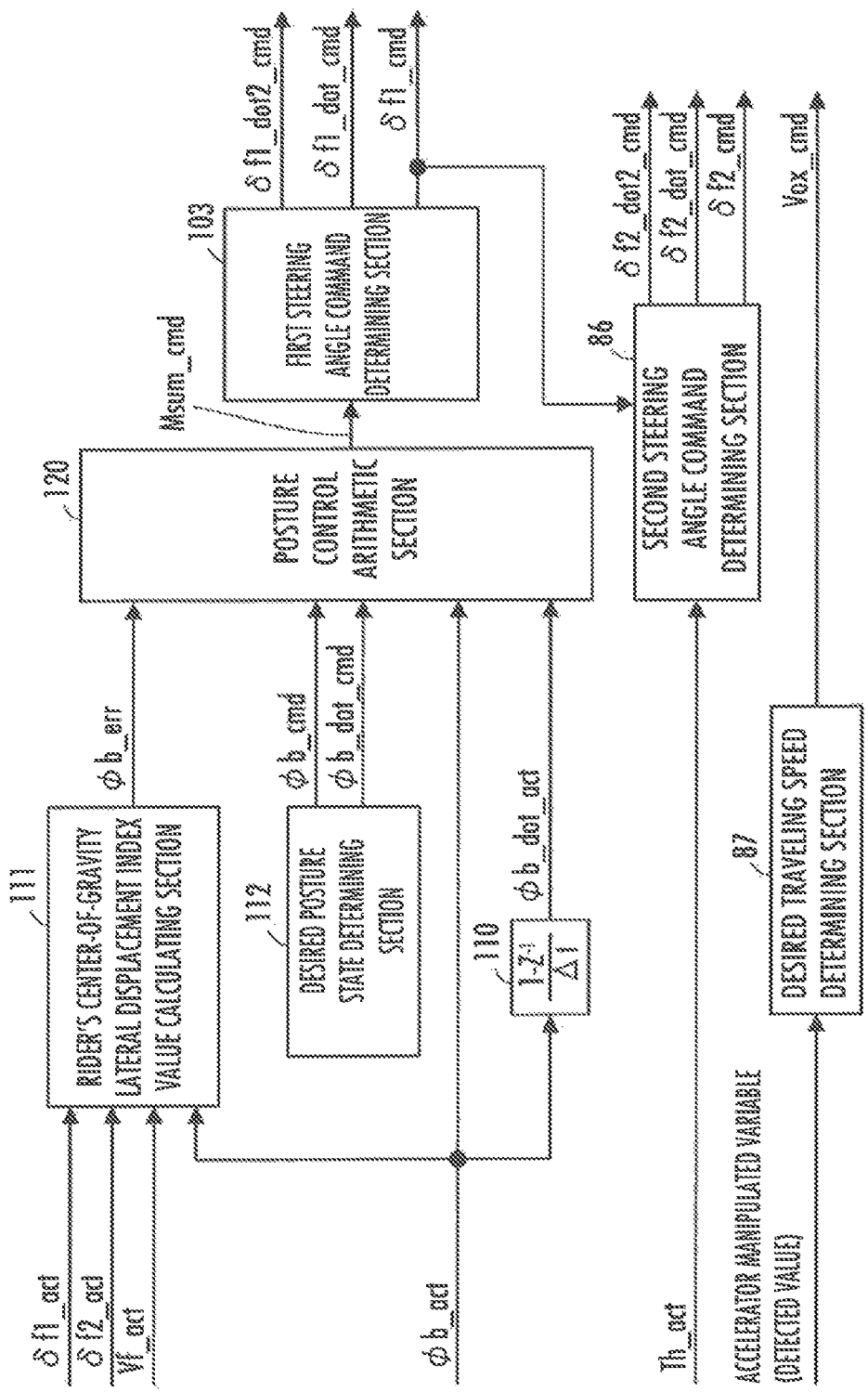
FIG. 26 is a block diagram showing the major functions of the control device in the fourth embodiment.

Referring to FIG. 26, in the present embodiment, the control device 60 includes, instead of the posture control arithmetic section 113 in the third embodiment, a posture control arithmetic section 120 and a first steering angle command determining section 103. The posture control arithmetic section 120 determines, as a manipulated variable (control input) for controlling the posture (inclination angle) in the roll direction of the vehicle body 2 of the two-wheeled vehicle 1, a desired posture manipulation moment Msum_cmd which is a desired value of the moment in the roll direction to be acted on the vehicle body 2. The first steering angle command determining section 103 determines a desired first steering angular acceleration δf1_dot2_cmd, a desired first steering angular velocity δf1_dot_cmd, and a desired first steering angle δf1_cmd from the desired posture manipulation moment Msum_cmd.

The functions of the control device 60 other than the posture control arithmetic section 120 and the first steering angle command determining section 103 are the same as in the third embodiment.

The posture control arithmetic section 120 receives: a detected roll angle φb_act and a detected roll angular velocity eb_dot_act of the vehicle body 2, a desired roll angle φb_cmd and a desired roll angular velocity φb_dot_cmd determined in the desired posture state determining section 112, and an estimated vehicle body inclination angle displacement φb_err calculated in the rider's center-of-gravity lateral displacement index value calculating section 111.

Figure 27:
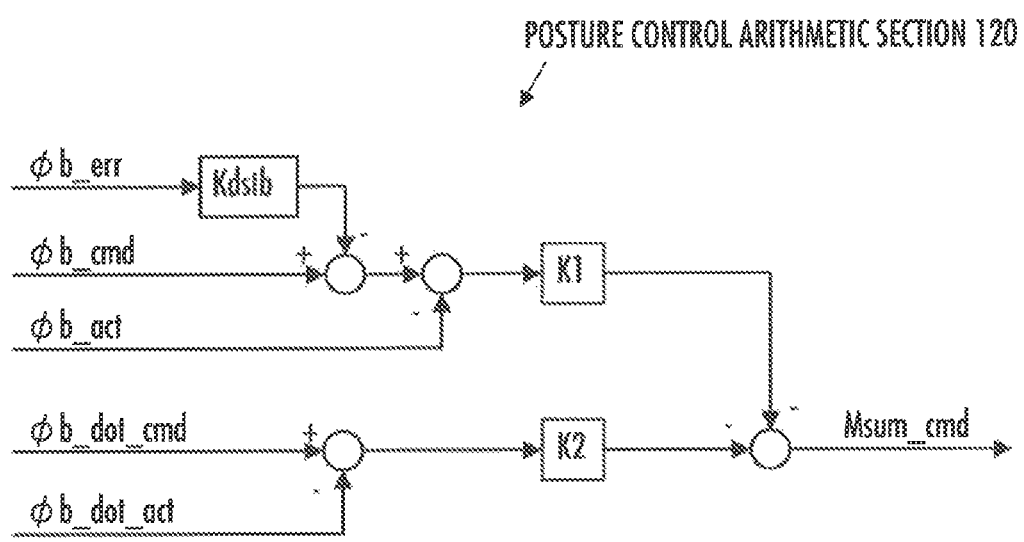
FIG. 27 is a block and line diagram showing the processing performed by the posture control arithmetic section shown in FIG. 26.

The posture control arithmetic section 120 uses these input values to perform the arithmetic processing shown by the block and line diagram in FIG. 27, to determine a desired posture manipulation moment Msum_cmd.

That is, the posture control arithmetic section 120 calculates the desired posture manipulation moment Msum_cmd by the arithmetic processing of the following expression (27).

$$M\text{sum\_cmd} = -K1*((\phi b\_\text{cmd} - Kdstb*\phi b\_\text{err}) - \phi b\_\text{act}) - K2*(\phi b\_\text{dot\_cmd} - \phi b\_\text{dot\_act}) \quad (27)$$

Here, Kdstb, K1, and K2 in the expression (27) are gains of prescribed values. The values of these gains Kdstb, K1, and K2 are set variably in accordance with, for example, the estimated traveling speed Vox_act of the two-wheeled vehicle 1, or the detected first steering angle δf1_act and the detected second steering angle δf2_act, as in the third embodiment.

In this case, the values of the gains Kdstb, K1, and K2 are set such that the moment in the roll direction acting on the vehicle body 2 by the steering of the front wheel 3f according to Msum_cmd will become not so large (such that the operator can lean the vehicle body 2 in the roll direction relatively easily by shifting his/her weight).

Further, the magnitudes of the gains Kdstb, K1, and K2 are all set variably such that they become smaller as the estimated traveling speed Vox_act of the two-wheeled vehicle 1 is higher.

Further, in the expression (27), −K1*((φb_cmd−Kdstb*φb_err)−φb_act) is a feedback manipulated variable component having the function of causing the deviation between the desired value (φb_cmd−Kdstb*φb_err), obtained by correcting φb_cmd according to φb_err, and φb_act to approach zero, and −K2*(φb_dot_cmd−φb_dot_act) is a feedback manipulated variable component having the function of causing the deviation (φb_dot_cmd−φb_dot_act) to approach zero.

In the above-described manner, in the present embodiment, the posture control arithmetic section 120 performs the arithmetic processing of the expression (27), at each control processing cycle, to thereby calculate the desired posture manipulation moment Msum_cmd.

Next, the first steering angle command determining section 103 receives a desired posture manipulation moment Msum_cmd calculated in the posture control arithmetic section 120.

The first steering angle command determining section 103 in the present embodiment is the same as that in the second embodiment. Therefore, the first steering angle command determining section 103 determines a desired first steering angular acceleration δf1_dot2_cmd, a desired first steering angular velocity δf1_dot_cmd, and a desired first steering angle δf1_cmd through the arithmetic processing (of the above expressions (24a) to (24c)) shown by the block and line diagram in FIG. 22.

The present embodiment is identical to the third embodiment except for the matters described above.

Here, the correspondence between the present embodiment and the present invention will be described supplementally. The posture control arithmetic section 120 corresponds to the control input determining section in the present invention, and Msum_cmd calculated by the posture control arithmetic section 120 corresponds to the control input in the present invention. The gain Kdstb in the above expression (27) performed by the posture control arithmetic section 120 corresponds to the sensitivity of the change in control input (Msum_cmd) to the change in center-of-gravity displacement degree index value (rider's center-of-gravity lateral displacement index value φb_err).

Otherwise, the correspondence between the present embodiment and the present invention is identical to that in the third embodiment.

According to the fourth embodiment described above, it is possible to achieve the effects similar to those in the third embodiment.

Fifth Embodiment

Figure 28A:
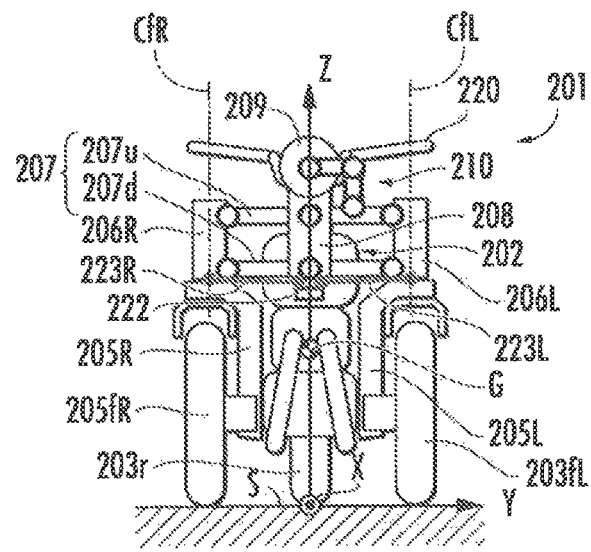
FIGS. 28A, 28B, and 28C are a front view, a side view, and a plan view, respectively, of a mobile body (three-wheeled vehicle) in the fifth or sixth embodiment of the present invention.
Figure 28B:
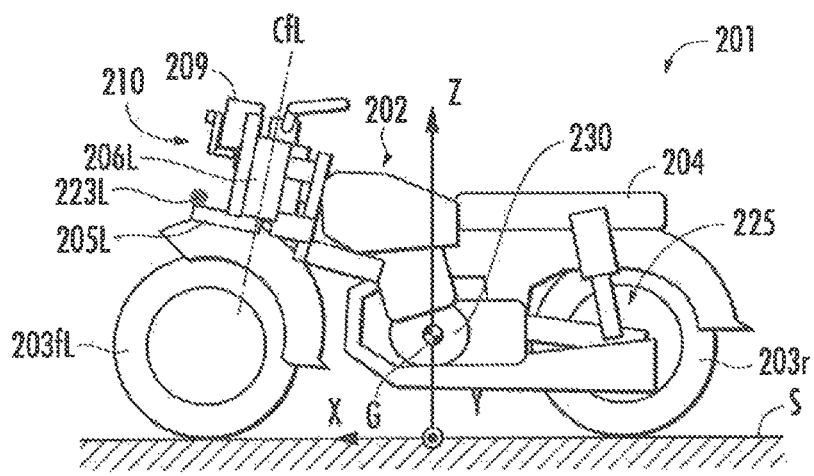
Figure 28C:
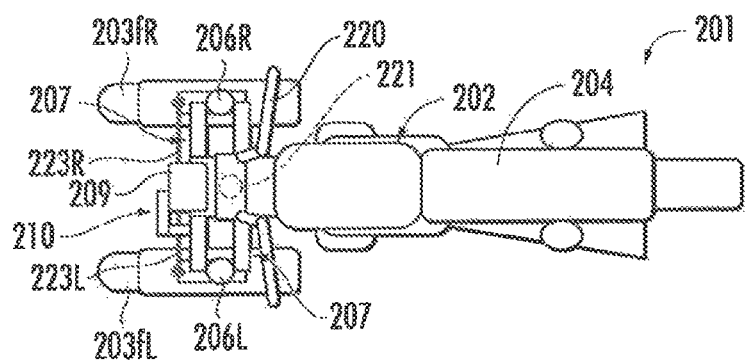

A fifth embodiment of the present invention will now be described. Referring to FIGS. 28A to 28C, a mobile body 201 of the present embodiment is a straddle-ridden three-wheeled vehicle which includes a vehicle body 202, and front wheels 203f, 203f and a rear wheel 203r arranged spaced apart in the longitudinal direction of the vehicle body 202. Hereinafter, the mobile body 201 will be referred to as "three-wheeled vehicle 201".

FIGS. 28A to 28C show the three-wheeled vehicle 201 in a basic posture state.

The basic posture state of the three-wheeled vehicle 201 is the posture state when the three-wheeled vehicle 201 is traveling straight ahead.

The three-wheeled vehicle 201 has two front wheels 203f, 203f arranged spaced apart in the lateral direction (vehicle width direction) of the vehicle body 202.

In the following description, a symbol R will be added to the reference characters of any member on the right side (toward the front) of the vehicle body 202, and a symbol L will be added to the reference characters of any member on the left side of the vehicle body 202. For example, the front wheel 203f on the right side will be denoted as the front wheel 203fR, and the front wheel 203f on the left side will be denoted as the front wheel 203fL. The symbol R or L will be omitted when there is no need to differentiate between the right and left side.

The vehicle body 202 is provided with a seat section 204 for an operator (rider). In the present embodiment, the seat section 204 is a seat for the operator (rider) to sit astride.

At the front portion of the vehicle body 202, front-wheel support mechanisms 205L, 205R are arranged on the left side and the right side, respectively. A front wheel 203f is pivotally supported at the lower end portion of a front-wheel support mechanism 205. Each front wheel 203f is pivotally supported by the front-wheel support mechanism 205 on the same side, via bearings or the like, such that the front wheel 203f can rotate about its axle centerline.

The front-wheel support mechanisms 205L, 205R are coupled to the vehicle body 202 via a mechanism which enables leaning of the vehicle body 202 with respect to a ground surface S with which the front wheels 203f, 203f and the rear wheel 203r come into contact.

Specifically, pipes 206L, 206R are arranged on top of the respective front-wheel support mechanisms 205L, 205R. The front-wheel support mechanisms 205L. 205R are attached to the corresponding pipes 206L. 206R so as to be rotatable about steering axes CfL, CfR as the center axes of the respective pipes 206L, 206R. The steering axes CfL and CfR of the pipes 206L and 206R are tilted backward, parallel to each other.

The left and right pipes 206L and 206R are coupled via a parallel link 207 which is made up of an upper link 207u and a lower link 207d spaced apart in the up-and-down direction and extending in the lateral direction. Such a parallel link 207 is disposed on the front side and the rear side of the pipes 206L, 206R.

The upper link 207u and the lower link 207d of a parallel link 207 have their center portions pivotally supported so as to be swingable about the axes in the longitudinal direction with respect to a support strut 208 which is secured to the front end of the vehicle body 202.

At the upper end of the support strut 208, an actuator 209 is mounted, which generates a rotative driving force to cause the parallel link 207 to swing with respect to the vehicle body 202. The actuator 209 is made up, for example, of an electric motor with a speed reducer. The output shaft of the actuator 209 is coupled, via a link mechanism 210, to one of the upper link 207*u* and the lower link 207*d* (for example, to the upper link 207*u*) of the parallel link 207 of the pipes 206L, 206R.

Figure 29A:
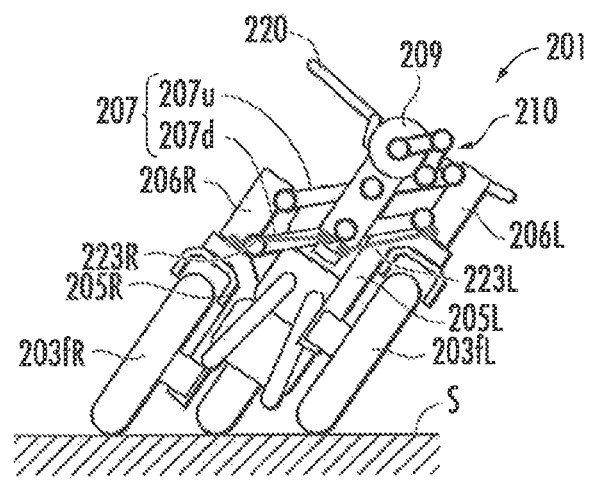
FIG. 29A shows the leaned state of the vehicle body of the mobile body in the fifth or sixth embodiment.

In this case, the rotative driving force of the actuator 209 is transmitted to the parallel link 207 via the link mechanism 210. Such transmission of power makes it possible for the parallel link 207 to swing about the longitudinal axes with respect to the support strut 208 (and hence, with respect to the vehicle body 202), as shown in FIG. 29A. As the parallel link 207 swings with respect to the vehicle body 202, the vehicle body 202 is rotatively driven in the roll direction with respect to the front wheels 203*f*L, 203*f*R. As a result, as shown in FIG. 29A, the vehicle body 202 leans, together with the front wheels 203*f*L, 203*f*R, with respect to the ground surface S.

It should be noted that the actuator 209 (hereinafter, referred to as "vehicle-body leaning actuator 209") may be a hydraulic actuator, for example, instead of the electric motor.

On the upper side of the support strut 208, a handlebar 220 is disposed. The handlebar 220 extends generally in the vehicle width direction. Although not shown in detail in the figure, the handlebar 220 is equipped with an accelerator grip, brake lever, turn signal switch, and so on.

This handlebar 220 is coupled to the front-wheel support mechanisms 205L, 205R via a steering mechanism.

More specifically, a handlebar shaft 221 having a center axis (rotational axis) in the up-and-down direction is supported by the support strut 208 in a freely rotatable manner. The handlebar shaft 221 penetrates through the support strut 208 in the up-and-down direction. The handlebar 220 is secured to the upper end of the handlebar shaft 221. The handlebar axis is in parallel with the steering axis Cf of each front wheel 203*f*.

A steering arm 222 is disposed to extend toward the front from the lower end of the handlebar shaft 221 protruding downward from the support strut 208. Tie rods 223L and 223R are disposed to extend to the left and right, respectively, from the front end of the steering arm 222.

The left tie rod 223L has its respective ends coupled via spherical joints to the steering arm 222 and to the left front-wheel support mechanism 205L. The right tie rod 223R has its respective ends coupled via spherical joints to the steering arm 222 and to the right front-wheel support mechanism 205R.

In the above-described manner, the handlebar 220 is coupled to the front-wheel support mechanisms 205L, 205R via the steering mechanism having the handlebar shaft 221, the steering arm 222, and the tie rods 223L, 223R.

Figure 29B:
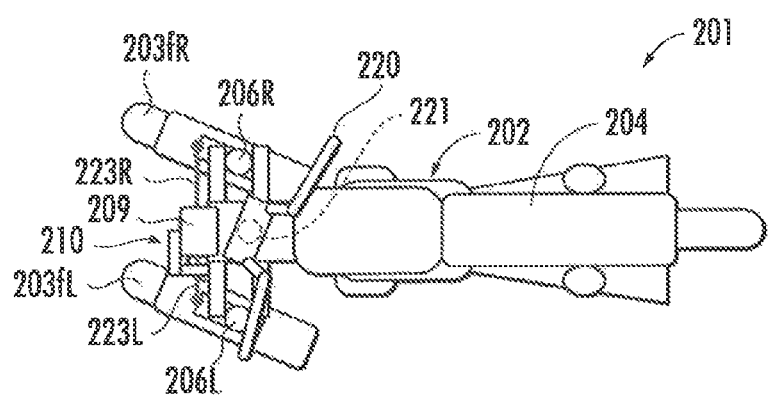
FIG. 29B shows the steered state of the front wheels of the mobile body in the fifth or sixth embodiment.

Therefore, as the handlebar 220 is rotated about the center axis of the handlebar shaft 221, the front wheels 203*f*R, 203*f*L are steered in conjunction therewith, as shown in FIG. 29B.

At the rear portion of the vehicle body 202, a rear-wheel support mechanism 225 for pivotally supporting the rear wheel 203*r* is mounted. The rear wheel 203*r* is pivotally supported by the rear-wheel support mechanism 225, via bearings or the like, such that the rear wheel 203*r* can rotate about its axle centerline.

The rear-wheel support mechanism 225 is configured, for example, with a suspension mechanism including a swing arm, coil spring, damper, and so on.

Further, a rear-wheel driving actuator 230 as a power engine for traveling of the three-wheeled vehicle 201 is mounted to the vehicle body 202. The rear-wheel driving actuator 230 is made up of an electric motor, for example. The rear-wheel driving actuator 230 transmits a rotative driving force to the rear wheel 203*r* via a power transmission mechanism (not shown). As the power transmission mechanism, a mechanism including a chain, for example, may be adopted.

It should be noted that the rear-wheel driving actuator 230 may be a hydraulic actuator, for example, instead of the electric motor, or it may be made up of an internal combustion engine.

Figure 30:
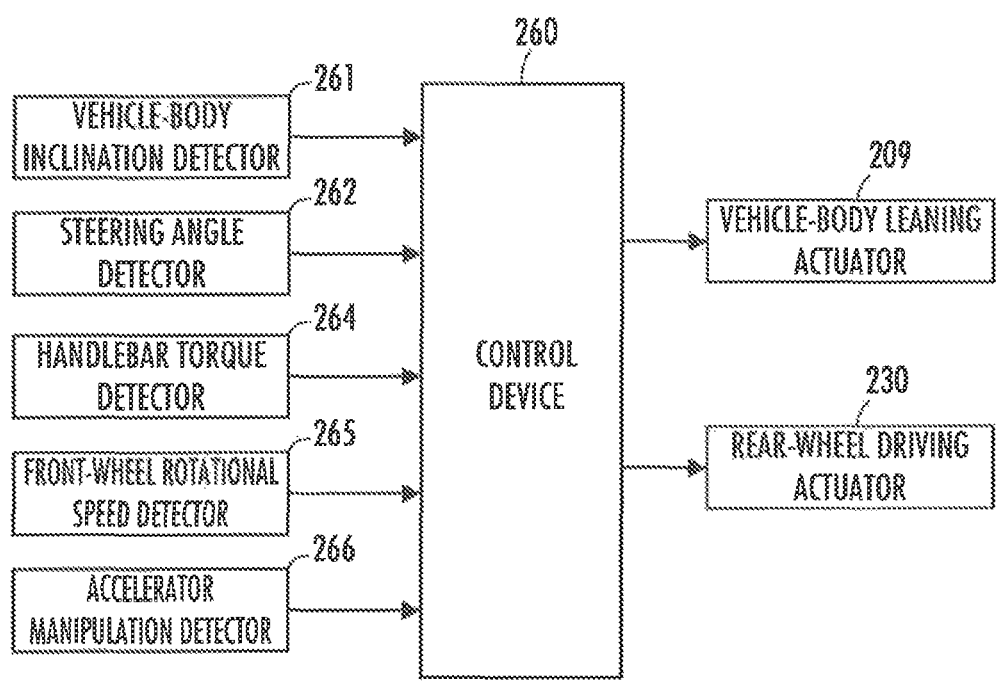
FIG. 30 is a block diagram showing the configuration related to the control of the mobile body in the fifth or sixth embodiment.

The three-wheeled vehicle 201 of the present embodiment further includes the configuration shown in FIG. 30 as the configuration for operation control.

Specifically, as shown in FIG. 30, the three-wheeled vehicle 201 includes a control device 260 which carries out control processing for controlling the operations of the aforesaid vehicle-body leaning actuator 209 and rear-wheel driving actuator 230.

The three-wheeled vehicle 201 further includes, as sensors for detecting various kinds of state quantities necessary for the control processing in the control device 260, a vehicle-body inclination detector 261 for detecting an inclination angle in the roll direction of the vehicle body 202, a steering angle detector 262 for detecting a steering angle of a front wheel 203*f*, a handlebar torque detector 264 for detecting a handlebar torque which is a steering force of the front wheels 203*f* applied via the handlebar 220 by an operator, a front-wheel rotational speed detector 265 for detecting a rotational speed (angular velocity) of a front wheel 203*f*, and an accelerator manipulation detector 266 for detecting an accelerator manipulated variable which is the manipulated variable (rotational amount) of the accelerator grip of the handlebar 220. It should be noted that illustration of these detectors 261 to 266 is omitted in FIGS. 28A to 28C, 29A, and 29B.

The control device 260 is an electronic circuit unit made up of a CPU, RAM, ROM, interface circuit, and so on. The control device 260 is mounted on an appropriate portion of the vehicle body 202. The control device 260 receives outputs (detection signals) from the respective detectors 261 to 266 described above.

The control device 260 may be made up of a plurality of mutually communicable electronic circuit units. In this case, the electronic circuit units constituting the control device 260 may be disposed in places distant from one another.

The vehicle-body inclination detector 261 is made up of an acceleration sensor and a gyro sensor (angular velocity sensor), for example. The vehicle-body inclination detector 261 is mounted on an appropriate portion of the vehicle body 202. In this case, the control device 260 carries out prescribed measurement and computation processing, such as computation by a strapdown system, on the basis of the outputs from the acceleration sensor and the gyro sensor, to thereby measure the inclination angle in the roll direction (more specifically, inclination angle in the roll direction with respect to the vertical direction (direction of gravitational force)) of the vehicle body 202.

In the description of the present embodiment, the inclination angle in the roll direction of the vehicle body 202 in the basic posture state of the three-wheeled vehicle 201 is zero. The positive direction of the inclination angle in the roll direction corresponds to the direction that makes the vehicle body 202 lean to the right (in the clockwise direction) as the three-wheeled vehicle 201 is seen from behind.

The steering angle detector 262 is made up, for example, of a rotary encoder or a potentiometer. In this case, the steering angle detector 262 is attached to the aforesaid pipe 206R or 206L or the handlebar shaft 221, for example, so as to output a signal corresponding to the rotation of either one of the front wheels 203fR, 203fL about the corresponding steering axis CfR or CfL.

In the description of the present embodiment, the steering angle of a front wheel 203f is zero in the basic posture state of the three-wheeled vehicle 201. The positive direction of the steering angle corresponds to the direction that makes each front wheel 203f rotate counterclockwise about the steering axis Cf as the three-wheeled vehicle 201 is seen from above.

The handlebar torque detector 264 is made up, for example, of a force sensor or a torque sensor disposed in a power transmission system between the handlebar 220 and the handlebar shaft 221, so as to output a signal corresponding to the handlebar torque that is applied from the handlebar 220 side to the handlebar shaft 221.

In the description of the present embodiment, the positive direction of the handlebar torque corresponds to the direction of steering the front wheels 203f in the positive direction.

The front-wheel rotational speed detector 265 is made up, for example, of a rotary encoder attached to the axle of either one of the front wheels 203f, so as to output a signal corresponding to the rotational speed of that front wheel 203f.

The accelerator manipulation detector 266 is made up, for example, of a rotary encoder or a potentiometer built in the handlebar 220, so as to output a signal corresponding to the manipulated variable (rotational amount) of the accelerator grip.

The functions of the above-described control device 260 will be described further below. In the following description, an XYZ coordinate system, shown in FIGS. 28A and 28B, is used. This XYZ coordinate system is a coordinate system in which, in the basic posture state of the three-wheeled vehicle 201, the vertical direction (up-and-down direction) is defined as the Z-axis direction, the longitudinal direction of the vehicle body 202 as the X-axis direction, the lateral direction of the vehicle body 202 as the Y-axis direction, and a point on the ground surface S immediately beneath the overall center of gravity G of the three-wheeled vehicle 201 as the origin. The positive directions of the X, Y, and Z axes are frontward, leftward, and upward, respectively.

In the present embodiment, for controlling the posture (inclination angle) in the roll direction of the three-wheeled vehicle 201, a two-mass-point model is used which describes the dynamic behavior of the three-wheeled vehicle 201 (behavior related to the inclination in the roll direction of the vehicle body 202) using two mass points, as in the aforesaid first or second embodiment.

Therefore, in the present embodiment, the control device 260 controls the posture (inclination angle) in the roll direction of the vehicle body 202 by controlling the inverted pendulum mass point lateral movement amount Pb_diff_y, which is the amount of movement in the Y-axis direction of the inverted pendulum mass point 71, as the controlled state quantity.

In the present embodiment, however, the control of the posture (inclination angle) in the roll direction of the vehicle body 202 is performed by the aforesaid vehicle-body leaning actuator 209 which causes the parallel link 207 to swing with respect to the vehicle body 202.

In this control, the posture (inclination angle) in the roll direction of the vehicle body 202 is controlled to reduce the lateral displacement of the center of gravity of the operator (from a position on the plane of symmetry of the vehicle body 202) in the lean-in or lean-out state, similarly as in the first or second embodiment.

Further, in the present embodiment, the posture (inclination angle) in the roll direction of the vehicle body 202 is controlled such that the inclination angle (roll angle) of the vehicle body 202 approaches an inclination angle according to the steering force of the front wheels 203f by the operator.

The functions of the control device 260 for carrying out such control processing will now be described specifically. The suffixes "_act" and "_cmd" added to the reference characters in the following description have the same meanings as in the first through fourth embodiments.

Figure 31:
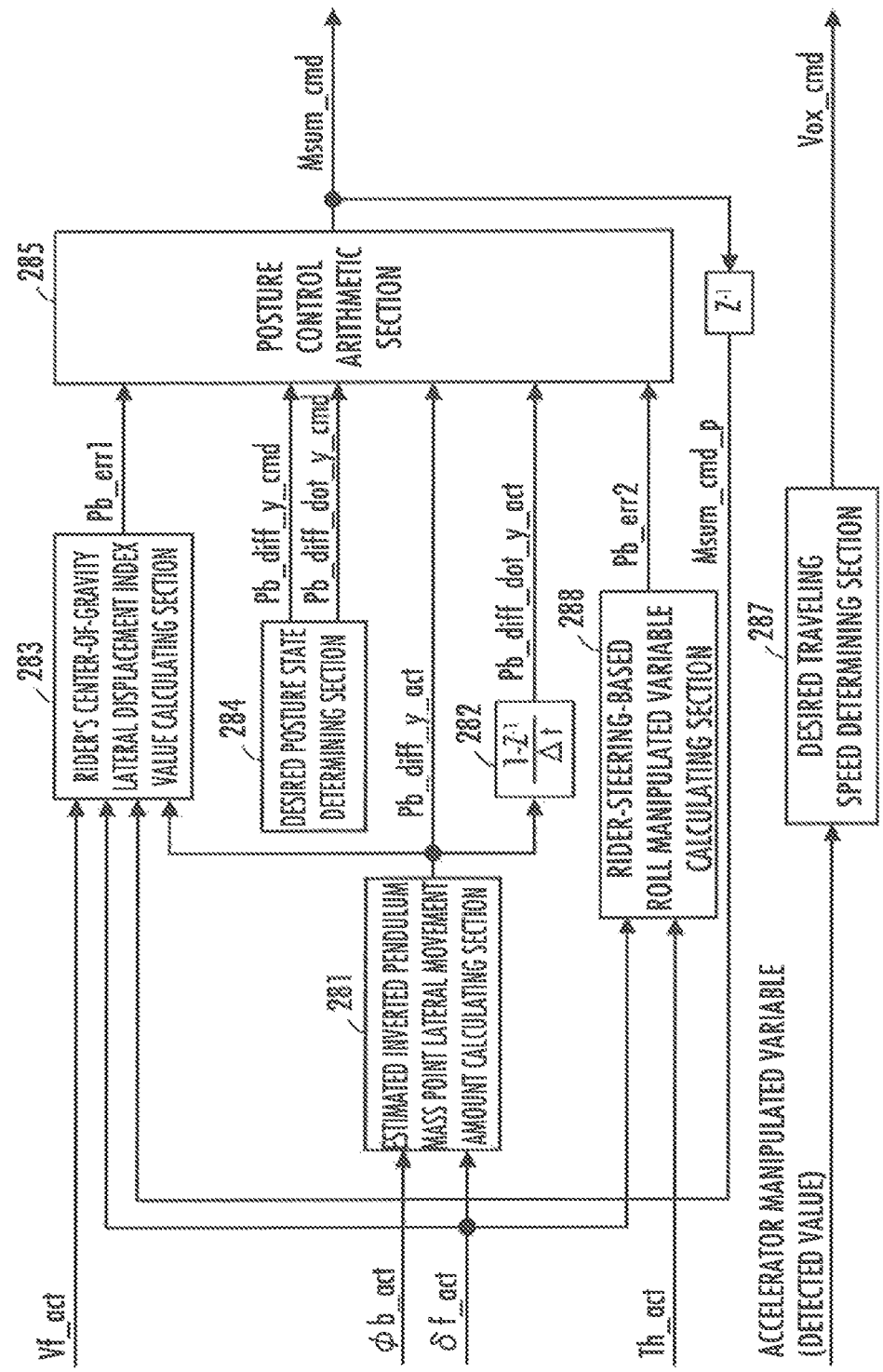
FIG. 31 is a block diagram showing the major functions of the control device in the fifth embodiment.

The control device 260 includes, as functions implemented when the CPU executes installed programs (functions implemented by software) or as functions implemented by hardware configurations, the functions shown by the block diagram in FIG. 31.

That is, the control device 260 includes: an estimated inverted pendulum mass point lateral movement amount calculating section 281 which calculates an estimated inverted pendulum mass point lateral movement amount Pb_diff_act, an estimated inverted pendulum mass point lateral velocity calculating section 282 which calculates an estimated inverted pendulum mass point lateral velocity Pb_diff_dot_act, a rider's center-of-gravity lateral displacement index value calculating section 283 which calculates an estimated inverted pendulum mass point lateral displacement Pb_err1 as a rider's center-of-gravity lateral displacement index value, and a desired posture state determining section 284 which determines a desired inverted pendulum mass point lateral movement amount Pb_diff_y_cmd and a desired inverted pendulum mass point lateral velocity Pb_diff_dot_y_cmd.

Here, the estimated inverted pendulum mass point lateral movement amount Pb_diff_y_act, the estimated inverted pendulum mass point lateral velocity Pb_diff_dot_y_act, the estimated inverted pendulum mass point lateral displacement Pb_err1, the desired inverted pendulum mass point lateral movement amount Pb_diff_cmd, and the desired inverted pendulum mass point lateral velocity Pb_diff_dot_y_cmd have the same technical meanings as in the aforesaid first or second embodiment.

The control device 260 further includes a rider-steering-based roll manipulated variable calculating section 288 which calculates a rider-steering-based roll manipulated variable Pb_err2 which is a manipulated variable for causing the roll angle φb of the vehicle body 202 to approach an inclination angle appropriate to the steering force of the front wheels 203f caused by the operator's manipulation of the handlebar 220.

In the present embodiment, the rider-steering-based roll manipulated variable is a correction amount for correcting the desired inverted pendulum mass point lateral movement amount Pb_diff_y_cmd.

The control device 260 further includes a posture control arithmetic section 285 which determines a desired posture manipulation moment Msum_cmd as a manipulated variable (control input) for controlling the posture (inclination angle) in the roll direction of the vehicle body 202 of the three-wheeled vehicle 201, and a desired traveling speed determining section 287 which determines a desired traveling speed Vox_cmd of the three-wheeled vehicle 201.

Here, the desired posture manipulation moment Msum_cmd and the desired traveling speed Vox_cmd have the same technical meanings as in the first or second embodiment.

The control device 260 carries out the processing in the above-described functional sections successively at prescribed control processing cycles. The control device 260 controls the vehicle-body leaning actuator 209 in accordance with the desired posture manipulation moment Msum_cmd determined by the posture control arithmetic section 285.

Further, the control device 260 controls the rear-wheel driving actuator 230 in accordance with the desired traveling speed Vox_cmd determined by the desired traveling speed determining section 287.

Details of the control processing in the control device 260 will be described below. In the arithmetic processing described below in relation to the control processing in the control device 260, values of the parameters m, m1, m2, and h' regarding the two-mass-point model described above and values of the parameters θcs, Lf, Lr, and Rg regarding the specification of the three-wheeled vehicle 201 are used. These parameters m, m1, m2, h', θcs, Lf, Lr, and Rg have the same technical meanings as in the first embodiment. The values of these parameters m, m1, m2, h', θcs, Lf, Lr, and Rg are set values determined in advance. Further, "g" in the arithmetic processing represents the gravitational acceleration constant.

The control device 260 carries out the processing in the estimated inverted pendulum mass point lateral movement amount calculating section 281 at each control processing cycle.

Figure 32:
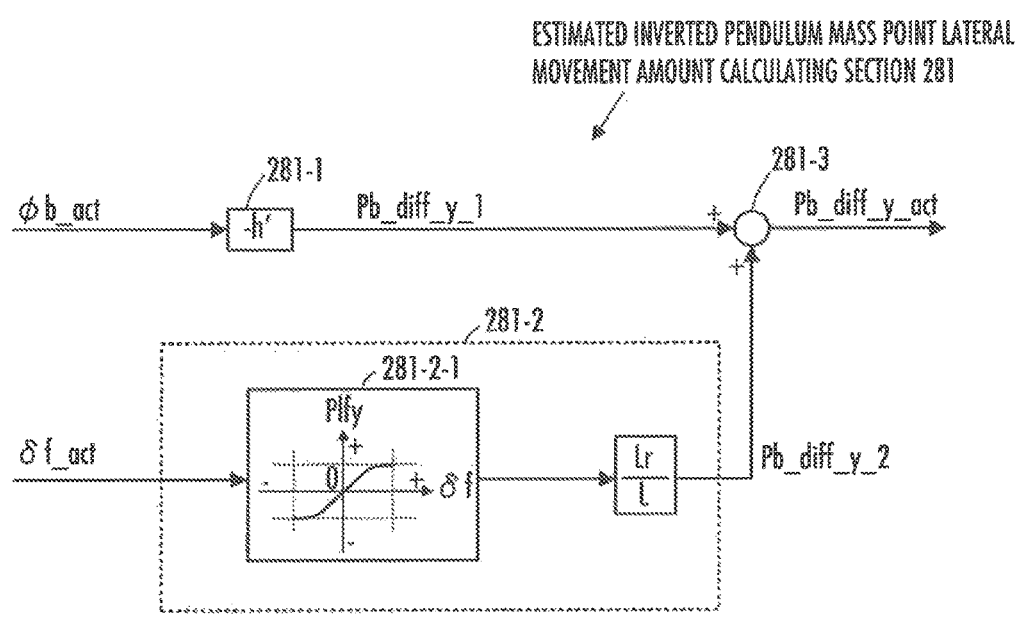
FIG. 32 is a block and line diagram showing the processing performed by the estimated inverted pendulum mass point lateral movement amount calculating section shown in FIG. 31.

As shown in FIG. 32, the estimated inverted pendulum mass point lateral movement amount calculating section 281 receives: a detected roll angle φb_act which is a detected value of the inclination angle in the roll direction (roll angle) of the vehicle body 202, and a detected steering angle δf_act which is a detected value of the steering angle δf of a front wheel 203f.

The detected roll angle φb_act is a detected value (observed value) indicated by an output from the vehicle-body inclination detector 261, and the detected steering angle δf_act is a detected value (observed value) indicated by an output from the steering angle detector 262.

The estimated inverted pendulum mass point lateral movement amount calculating section 281 calculates an estimated inverted pendulum mass point lateral movement amount Pb_diff_y_act by the arithmetic processing shown by the block and line diagram in FIG. 32. That is, the estimated inverted pendulum mass point lateral movement amount calculating section 281 calculates Pb_diff_y_act by the arithmetic processing of the following expressions (30a) to (30c).

$$Pb\_diff\_y\_1 = -h'^* \phi b\_act \quad (30a)$$

$$Pb\_diff\_y\_2 = Plfy(\delta f\_act)^*(Lr/L) \quad (30b)$$

$$Pb\_diff\_y\_act = Pb\_diff\_y\_1 + Pb\_diff\_y\_2 \quad (30c)$$

In FIG. 32, processing sections 281-1, 281-2, and 281-3 represent processing sections which perform the arithmetic processing of the expressions (30a), (30b), and (30c), respectively.

Here, Plfy(δf_act) in the expression (30b) is a function value which is determined in a processing section 281-2-1 in FIG. 32, from the value of δf_act, by a preset conversion function Plf(δf). This conversion function Plfy(δf) is configured, for example, by a mapping or an arithmetic expression. In the present embodiment, the conversion function Plfy(δf) has been set, as illustrated by the graph in the processing section 281-2-1, such that the value of Plfy increases from a value on the negative side to a value on the positive side as the value of the steering angle f of a front wheel 203f increases (from a value on the negative side to a value on the positive side).

In the above-described manner, the estimated inverted pendulum mass point lateral movement amount calculating section 281 performs the arithmetic processing of the above expressions (30a) to (30c), at each control processing cycle, to thereby calculate the estimated inverted pendulum mass point lateral movement amount Pb_diff_y_act.

Supplementally, the conversion function in the processing section 281-2-1 may be set such that a value of Plfy(δf_act)*(Lr/L) is obtained in the processing section 281-2-1. In this case, the output from the processing section 281-2-1, as it is, is calculated as Pb_diff_y_2.

Next, the control device 260 carries out the processing in the estimated inverted pendulum mass point lateral velocity calculating section 282.

The estimated inverted pendulum mass point lateral velocity calculating section 282 differentiates (obtains the temporal change rate of) the estimated inverted pendulum mass point lateral movement amount Pb_diff_y_act calculated in the estimated inverted pendulum mass point lateral movement amount calculating section 281, to calculate an estimated inverted pendulum mass point lateral velocity Pb_diff_dot_y_act, as shown by the following expression (31).

$$Pb\_diff\_dot\_y\_act = \text{differential(temporal change rate)} \text{ of } Pb\_diff\_y\_act \quad (31)$$

The control device 260 further carries out the processing in the rider's center-of-gravity lateral displacement index value calculating section 283. The rider's center-of-gravity lateral displacement index value calculating section 283 receives, as shown in FIG. 33, an estimated inverted pendulum mass point lateral movement amount Pb_diff_y_act calculated in the estimated inverted pendulum mass point lateral movement amount calculating section 281, a detected steering angle δf_act of a front wheel 203f, an estimated front-wheel rotational transfer velocity Vf_act, and a value (last time's value) Msum_cmd_p of the desired posture manipulation moment Msum_cmd calculated by the posture control arithmetic section 285 in the last time's control processing cycle.

The estimated front-wheel rotational transfer velocity Vf_act is a velocity which is calculated by multiplying the detected value (observed value) of the rotational angular velocity of a front wheel 203f, indicated by an output from the aforesaid front-wheel rotational speed detector 265, by the predetermined effective rolling radius of the front wheel 203f.

Further, Msum_cmd_p corresponds to a pseudo estimate (observed value) of the moment (posture manipulation moment) in the roll direction acting on the vehicle body 202 by the driving force of the vehicle-body leaning actuator 209.

Figure 33:
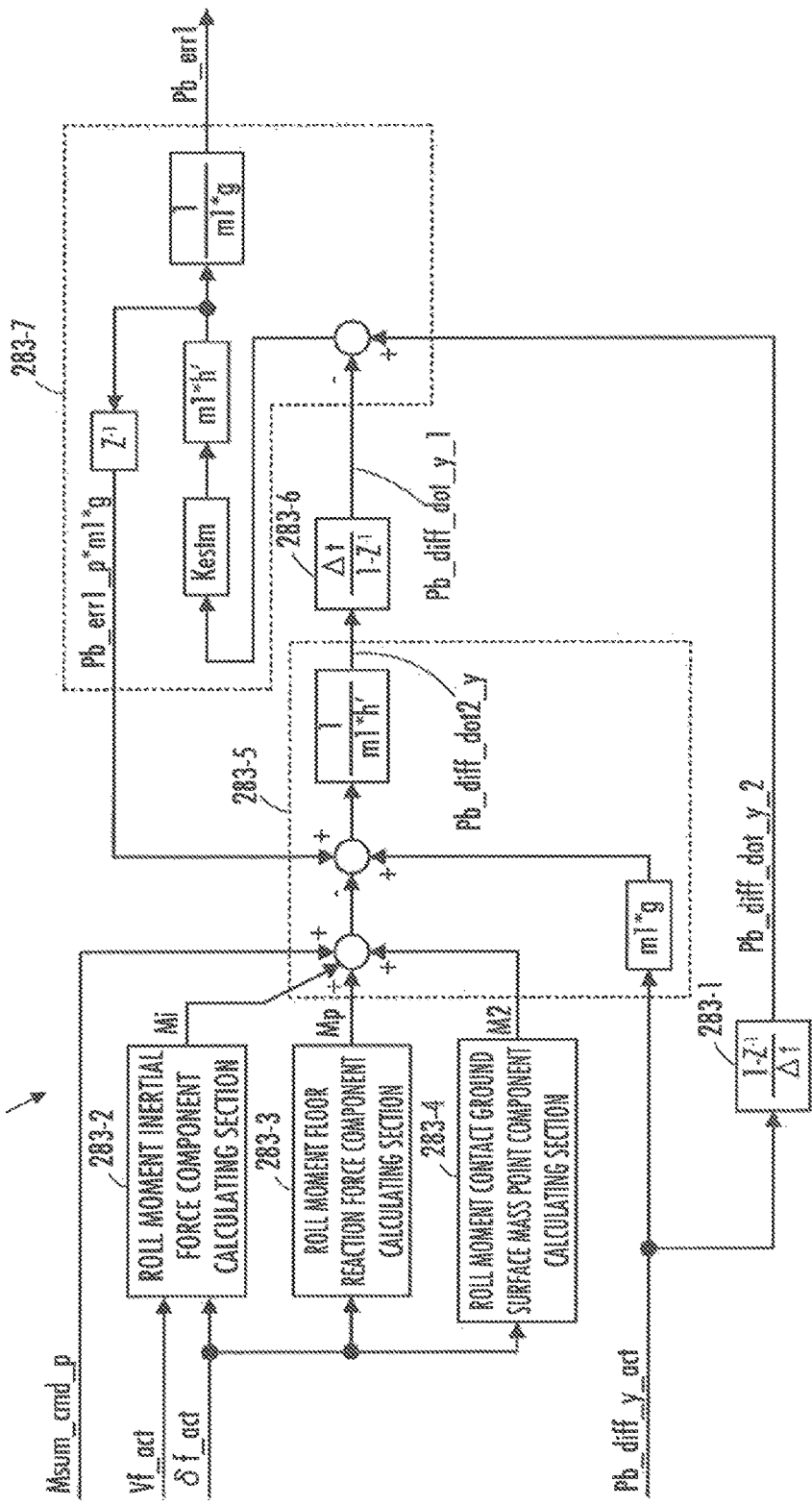
FIG. 33 is a block and line diagram showing the processing performed by the rider's center-of-gravity lateral displacement index value calculating section shown in FIG. 31.

The rider's center-of-gravity lateral displacement index value calculating section 283 calculates an estimated inverted pendulum mass point lateral displacement Pb_err1 as a rider's center-of-gravity lateral displacement index value, through the arithmetic processing shown by the block and line diagram in FIG. 33. In this case, the rider's center-of-gravity lateral displacement index value calculating section 283 is configured as an observer.

Specifically, the rider's center-of-gravity lateral displacement index value calculating section 283 calculates an estimate of the roll moment inertial force component Mi, an estimate of the roll moment floor reaction force component Mp, and an estimate of the roll moment ground surface mass point component M2 by a roll moment inertial force component calculating section 283-2, a roll moment floor reaction force component calculating section 283-3, and a roll moment ground surface mass point component calculating section 283-4, respectively, on the basis of the input values of δf_act and Vf_act.

Here, the roll moment inertial force component Mi, the roll moment floor reaction force component Mp, and the roll moment ground surface mass point component M2 have the same technical meanings as in the aforesaid first or second embodiment.

The specific processing in the calculating sections 283-2, 283-3, and 283-4 will be described later.

Then, the rider's center-of-gravity lateral displacement index value calculating section 283 carries out, in a processing section 283-5, arithmetic processing based on a dynamic model taking account of lateral displacement of the inverted pendulum mass point 71 due to lateral displacement of the center of gravity of the operator, on the basis of the estimates of Mi, Mp, and M2, the input value of Pb_diff_y_act, the last time's value Msum_cmd_p of Msum_cmd, and a value (last time's value) Pb_err1_p of the estimated inverted pendulum mass point lateral displacement Pb_err1 calculated in the last time's control processing cycle, to thereby calculate an estimate of a translational acceleration Pb_diff_dot2 v in the Y-axis direction of the inverted pendulum mass point 71.

Stated differently, the last time's value Pb_err1_p corresponds to the latest one of the estimated inverted pendulum mass point lateral displacements Pb_err1 calculated up to then.

Here, in the present embodiment, the dynamic model (equation of motion of the inverted pendulum mass point 71) taking account of the lateral displacement of the inverted pendulum mass point 71 due to the lateral displacement of the center of gravity of the operator is expressed by an equation of motion that is obtained by replacing Pb_diff_y on the right side of the above expression (2) with Pb_diff_y_act+Pb_err1 and also replacing −Mp−M2−Mi with −Mp−M2−Mi−Msum (where Msum is a posture manipulation moment of the vehicle body 202 by the vehicle-body leaning actuator 209).

Therefore, the arithmetic processing in the processing section 283-5 is carried out in accordance with the following expression (32a).

$$Pb\_diff\_dot2\_y = (m1*g*(Pb\_diff\_y\_act + Pb\_err1\_p) - Mp - M2 - Mi - Msum\_cmd\_p)/(m1*h') \quad (32a)$$

Then, the rider's center-of-gravity lateral displacement index value calculating section 283 integrates, in a processing section 283-6, Pb_diff_dot2_y calculated by the above expression (32a), to thereby calculate a first estimated inverted pendulum mass point lateral velocity Pb_diff_dot_y_1 as a first estimate of the moving velocity (as seen in the XYZ coordinate system) in the Y-axis direction of the inverted pendulum mass point 71, as shown by the following expression (32b).

$$Pb\_diff\_dot\_y\_1 = \text{integral of } Pb\_diff\_dot2\_y \quad (32b)$$

Further, the rider's center-of-gravity lateral displacement index value calculating section 283 performs, in a processing section 283-1, a differential operation on the input value of Pb_diff_y_act, to thereby calculate a second estimated inverted pendulum mass point lateral velocity Pb_diff_dot_y_2 as a second estimate of the moving velocity (as seen in the XYZ coordinate system) in the Y-axis direction of the inverted pendulum mass point 71, as shown by the following expression (32c).

$$Pb\_diff\_dot\_y\_2 = \text{differential(temporal change rate)} \text{ of } Pb\_diff\_y\_act \quad (32c)$$

It should be noted that Pb_diff_dot_y_2 calculated by the expression (32c) is the same as Pb_diff_dot_act calculated by the above expression (31) by the estimated inverted pendulum mass point lateral velocity calculating section 282. Therefore, Pb_diff_dot_act calculated in the estimated inverted pendulum mass point lateral velocity calculating section 282 may be used, without modification, as the second estimated inverted pendulum mass point lateral velocity Pb_diff_dot_y_2.

Here, the second estimated inverted pendulum mass point lateral velocity Pb_diff_dot_y_2 calculated by the expression (32c) corresponds to an estimate of the moving velocity in the Y-axis direction of the inverted pendulum mass point 71 on the assumption that there is no lateral displacement of the center of gravity of the operator.

Therefore, the deviation between this second estimated inverted pendulum mass point lateral velocity Pb_diff_dot_y_2 and the first estimated inverted pendulum mass point lateral velocity Pb_diff_dot_y_1, calculated dynamically according to the above expressions (32a) and (32b), becomes a value depending on the inverted pendulum mass point lateral displacement amount Pb_err1 caused by the lateral displacement of the center of gravity of the operator.

Therefore, the rider's center-of-gravity lateral displacement index value calculating section 283 calculates the estimated inverted pendulum mass point lateral displacement Pb_err1 in a processing section 283-7 by the arithmetic processing of the following expression (32d).

$$\begin{aligned} Pb\_err1 &= (Pb\_diff\_dot\_y\_2 - Pb\_diff\_dot\_y\_1) * Kestm * \\ &\quad (m1*h')/(m1*g) \\ &= (Pb\_diff\_dot\_y\_2 - Pb\_diff\_dot\_y\_1) * Kestm * h'/g \end{aligned} \quad (32d)$$

Kestm used in the arithmetic processing of this expression (32d) is a predetermined gain of a prescribed value. It should be noted that Kestm*h'/g in the expression (32d) may be set in advance as a single gain value.

Supplementally, in the block and line diagram in FIG. 33, a last time's value (=Pb_err1_p*m1*g) of (Pb_diff_dot_y_2−Pb_diff_dot_y_1)*Kestm*(m1*h') is input to the processing section 283-5 from the processing section 283-7. Alternatively, a last time's value Pb_err1_p of the estimated inverted pendulum mass point lateral displacement Pb_err1, for example, may be input directly to the processing section 283-5.

In the above-described manner, the rider's center-of-gravity lateral displacement index value calculating section 283 calculates the estimates of Mi. Mp, and M2, and uses these estimates, the estimated inverted pendulum mass point lateral movement amount Pb_diff_y_act, and the last time's value Msum_cmd_p of Msum_cmd to perform the arithmetic processing of the expressions (32a) to (32d), to thereby calculate the estimated inverted pendulum mass point lateral displacement Pb_err1.

In this case, the estimates of Mi, Mp, and M2 are calculated in the manner as described below.

Figure 34:
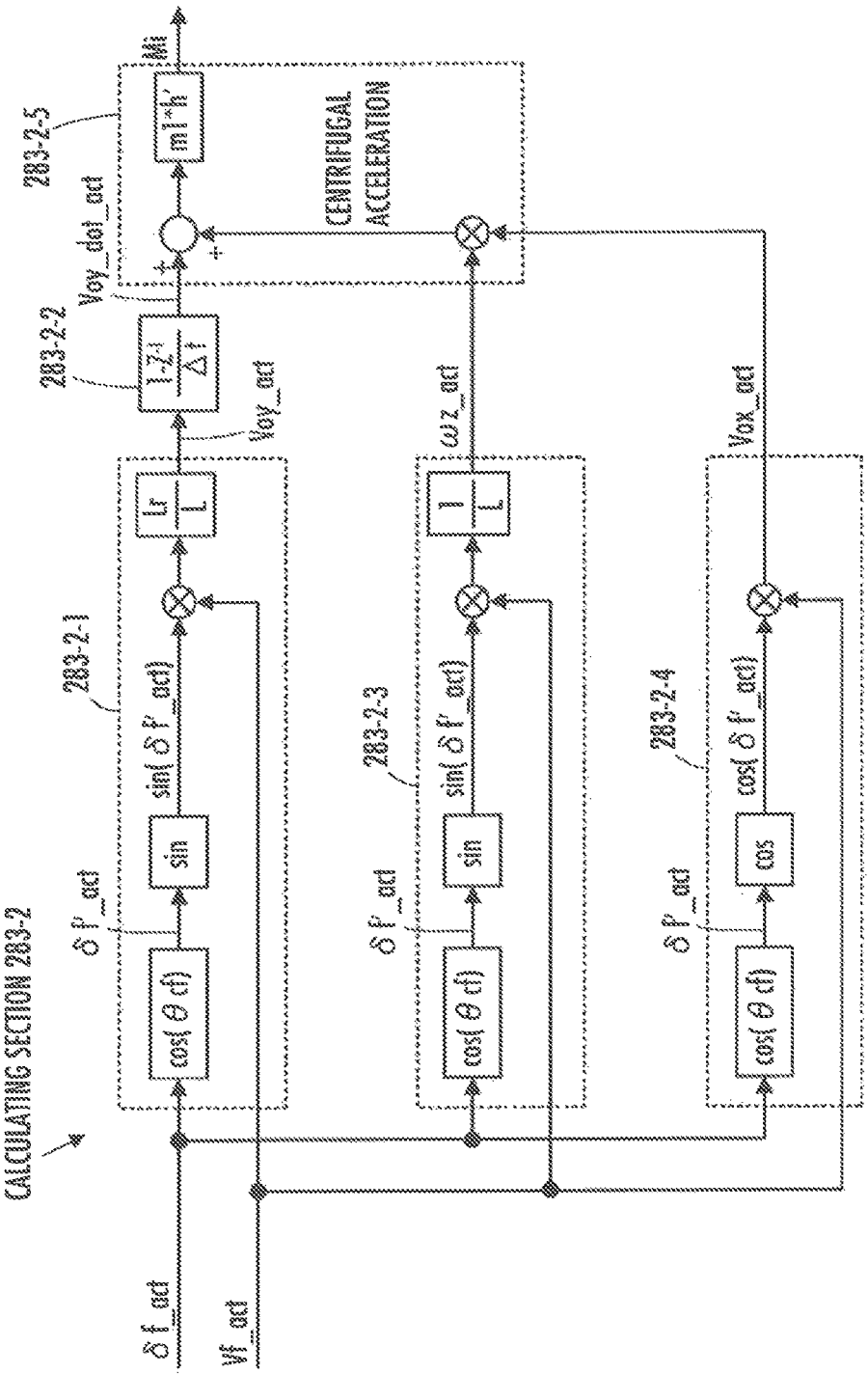
FIG. 34 is a block and line diagram showing the processing performed by the roll moment inertial force component calculating section shown in FIG. 33.

First, the roll moment inertial force component calculating section 283-2 in the rider's center-of-gravity lateral displacement index value calculating section 283 calculates an estimate of the roll moment inertial force component Mi by the arithmetic processing shown by the block and line diagram in FIG. 34. That is, the roll moment inertial force component calculating section 283-2 calculates the estimate of the roll moment inertial force component Mi by the arithmetic processing of the following expressions (33a) to (33f).

$$\delta' f\_act = \delta f\_act * \cos(\theta cs) \quad (33a)$$

$$Voy\_act = \sin(\delta' f\_act) * Vf\_act * (Lr/L) \quad (33b)$$

$$Voy\_dot\_act = \text{differential(temporal change rate) of } Voy\_act \quad (33c)$$

$$\omega z\_act = \sin(\delta' f\_act) * Vf\_act * (1/L) \quad (33d)$$

$$Vox\_act = \cos(\delta' f\_act) * Vf\_act \quad (33e)$$

$$Mi = (Voy\_dot\_act + \omega z\_act * Vox\_act) * m1 * h' \quad (33f)$$

It should be noted that δ'f_act, Voy_act, Voy_dot_act, ωz_act, and Vox_act calculated by the above expressions (33a) to (33e) have the same technical meanings as those calculated by the arithmetic processing (expressions (13a) to (13e)) of the roll moment inertial force component calculating section 83-2 in the first or second embodiment.

In FIG. 34, a processing section 283-2-1 represents a processing section which performs the arithmetic processing of the expressions (33a) and (33b), a processing section 283-2-2 represents a processing section which performs the arithmetic processing (differential operation) of the expression (33c), a processing section 283-2-3 represents a processing section which performs the arithmetic processing of the expressions (33a) and (33d), a processing section 283-2-4 represents a processing section which performs the arithmetic processing of the expressions (33a) and (33e), and a processing section 283-2-5 represents a processing section which performs the arithmetic processing of the expression (33f).

In the above-described manner, the roll moment inertial force component calculating section 283-2 performs the arithmetic processing of the above expressions (33a) to (33f), to thereby calculate the estimate of the roll moment inertial force component Mi.

Supplementally, for example in the case where an angular velocity sensor for detecting an angular velocity in the yaw direction is mounted on the vehicle body 202 of the three-wheeled vehicle 201, a detected value of the angular velocity in the yaw direction indicated by an output from that angular velocity sensor may be used as a value of ωz_act in the expression (33f). In this case, the arithmetic processing (expression (33d)) in the processing section 283-2-3 is unnecessary.

Furthermore, for example in the case where a rear-wheel rotational speed detector for detecting a rotational speed (angular velocity) of the rear wheel 203r of the three-wheeled vehicle 201 is mounted on the three-wheeled vehicle 201, an estimate of the translational moving velocity of the rear wheel 203r obtained by multiplying the detected value of the rotational speed of the rear wheel 203r indicated by an output from that rear-wheel rotational speed detector by the effective rolling radius of the rear wheel 203r may be used as a value of Vox_act in the expression (33f). In this case, the arithmetic processing (expression (33e)) in the processing section 283-2-4 is unnecessary.

Figure 35:
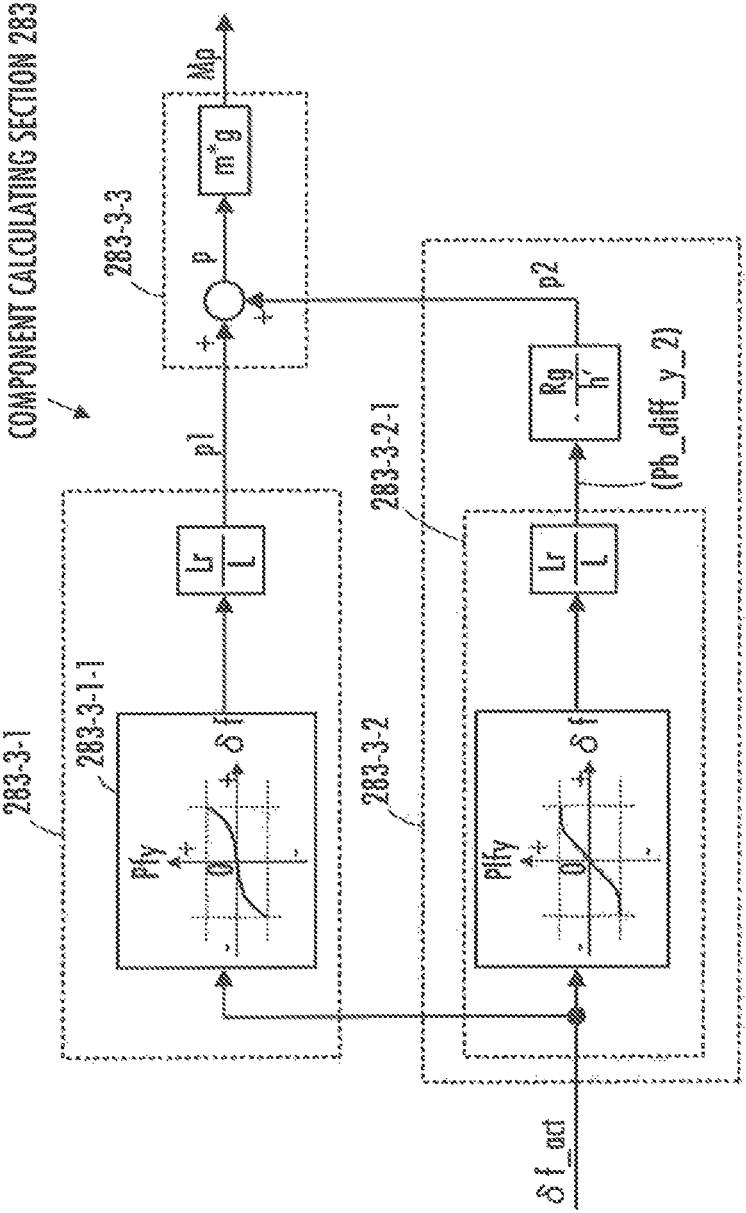
FIG. 35 is a block and line diagram showing the processing performed by the roll moment floor reaction force component calculating section shown in FIG. 33.

Next, the roll moment floor reaction force component calculating section 283-3 in the rider's center-of-gravity lateral displacement index value calculating section 283 calculates an estimate of the roll moment floor reaction force component Mp by the arithmetic processing shown by the block and line diagram in FIG. 35. That is, the roll moment floor reaction force component calculating section 283-3 calculates the estimate of the roll moment floor reaction force component Mp by the arithmetic processing of the following expressions (34a) to (34c).

$$p1 = Pfy(\delta f\_act) * (Lr/L) \quad (34a)$$

$$p2 = Plfy(\delta f\_act) * (Lr/L) * (-Rg/h') \quad (34b)$$

$$Mp = (p1 + p2) * m * g \quad (34c)$$

It should be noted that p1 and p2 calculated by the above expressions (34a) and (34b), respectively, have the same technical meanings as those calculated by the arithmetic processing (expressions (14a) and (14b)) of the roll moment floor reaction force component calculating section 83-3 in the first or second embodiment.

In FIG. 35, a processing section 283-3-1 represents a processing section which performs the arithmetic processing of the expression (34a), a processing section 283-3-2 represents a processing section which performs the arithmetic processing of the expression (34b), and a processing section 283-3-3 represents a processing section which performs the arithmetic processing of the expression (34c).

Here, Pfy(δf_act) in the expression (34a) is a function value which is determined by a preset conversion function Pfy(δf) from the value of δf_act in a processing section 283-3-1-1 in the processing section 283-3-1 in FIG. 35. This conversion function Pfy(δf) is configured, for example, by a mapping or an arithmetic expression. The conversion function Pfy(δf) has been set, as illustrated by the graph in the processing section 283-3-1-1, such that the value of Pfy increases monotonically from a value on the negative side to a value on the positive side as the value of δf increases (from a value on the negative side to a value on the positive side).

Further, the arithmetic processing of the computation of the right side of the expression (34b) excluding the multiplication of (−Rg/h'), i.e. the arithmetic processing in a processing section 283-3-2-1 in the processing section 283-3-2, is the same as the processing (of calculating Pb_diff_y_2) of the processing section 281-2 in the arithmetic processing of the aforesaid estimated inverted pendulum mass point lateral movement amount calculating section 281.

Therefore, the expression (34b) is equivalent to the following expression (34b').

$$p2 = Pb\_diff\_y\_2 * (-Rg/h') \quad (34b')$$

In the above-described manner, the roll moment floor reaction force component calculating section 283-3 calculates an estimate of the roll moment floor reaction force component Mp by the arithmetic processing of the above expressions (34a) to (34c).

Supplementally, in the processing section 283-3-1, a conversion function for obtaining a value (=p1) of Pfy (f_act)*(Lr/L) as a function value may be used instead of the conversion function Pfy(δf). In this case, p1 is obtained directly from the conversion function.

Further, the modifications explained supplementally about the processing section 281-2 in the estimated inverted pendulum mass point lateral movement amount calculating section 281 may also be adopted for the processing section 283-3-2-1 in the processing section 283-3-2.

Further, in the arithmetic processing in the processing section 283-3-2, a conversion function for obtaining a value of Plfy(f_act)*(Lr/L)*(−Rg/h') as a function value may be used instead of the conversion function Plfy(δf). In this case, the output value of the conversion function, as it is, is obtained as p2.

Figure 36:
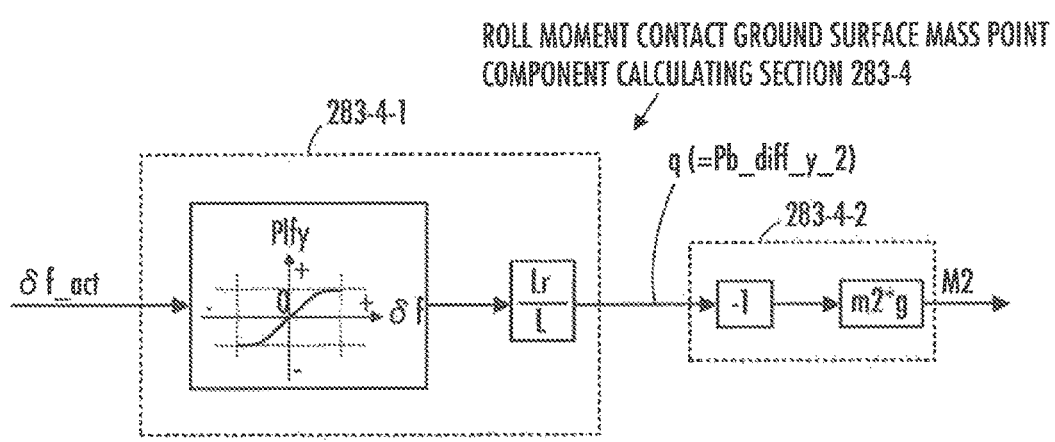
FIG. 36 is a block and line diagram showing the processing performed by the roll moment ground surface mass point component calculating section shown in FIG. 33.

Next, the roll moment ground surface mass point component calculating section 283-4 in the rider's center-of-gravity lateral displacement index value calculating section 283 calculates an estimate of the roll moment ground surface mass point component M2 by the arithmetic processing shown by the block and line diagram in FIG. 36. That is, the roll moment ground surface mass point component calculating section 283-4 calculates the estimate of the roll moment ground surface mass point component M2 by the arithmetic processing of the following expressions (35a) and (35b).

$$q = Plfy(\delta f\_act)*(Lr/L) \tag{35a}$$

$$M2 = q*(-m2*g) \tag{35b}$$

It should be noted that q calculated by the above expression (35a) has the same technical meaning as that calculated by the arithmetic processing (expression (15a)) of the roll moment ground surface mass point component calculating section 83-4 in the first or second embodiment.

In FIG. 36, a processing section 283-4-1 represents a processing section which performs the arithmetic processing of the expression (35a), and a processing section 283-4-2 represents a processing section which performs the arithmetic processing of the expression (35b).

In this case, the arithmetic processing in the processing section 283-4-1 is the same as the arithmetic processing (of calculating Pb_diff_y_2) of the processing section 281-2 in the arithmetic processing of the aforesaid estimated inverted pendulum mass point lateral movement amount calculating section 281. Therefore, in the arithmetic processing of the processing section 283-4-1, Pb_diff_y_2 is calculated as the lateral movement amount q of the ground surface mass point 72.

In the above-described manner, the roll moment ground surface mass point component calculating section 283-4 calculates an estimate of the roll moment ground surface mass point component M2 by the arithmetic processing of the above expressions (35a) and (35b).

Supplementally, the modifications explained supplementally about the processing section 281-2 in the estimated inverted pendulum mass point lateral movement amount calculating section 281 may also be adopted for the processing section 283-4-1.

Further, instead of the conversion function Plfy(δf), a conversion function for obtaining a value of Plfy(δf_act)*(Lr/L)*(−m2*g) as a function value may be used. In this case, the output value of the conversion function, as it is, is obtained as the roll moment ground surface mass point component M2.

Returning to FIG. 31, the control device 260 further carries out the processing in the desired posture state determining section 284.

In the present embodiment, the desired posture state determining section 284 determines a desired inverted pendulum mass point lateral movement amount Pb_diff_y_cmd, as in the desired posture state determining section 84 in the first or second embodiment.

That is, the desired posture state determining section 284 determines a desired inverted pendulum mass point lateral movement amount Pb_diff_y_cmd by the arithmetic processing of the following expressions (36a) and (36b), using ωz_act (estimate of the angular velocity in the yaw direction) calculated by the arithmetic processing of the above expression (33d), and Vox_act (estimate of the traveling speed) calculated by the arithmetic processing of the expression (33e). In the present embodiment, the desired posture state determining section 284 sets a desired inverted pendulum mass point lateral velocity Pb_diff_dot_y_cmd to zero.

$$\phi b\_lean = -Vox\_act*\omega z\_act/g \tag{36a}$$

$$Pd\_diff\_y\_cmd = \phi b\_lean*h' \tag{36b}$$

It should be noted that the desired inverted pendulum mass point lateral velocity Pb_diff_dot_y_cmd may be determined variably in accordance with, for example, the detected steering angle δf_act.

Further, the desired inverted pendulum mass point lateral movement amount Pb_diff_y_cmd may be set to zero, for example. Alternatively, the desired inverted pendulum mass point lateral movement amount Pb_diff_y_cmd may be determined variably in accordance with, for example, the detected steering angle δf_act.

The control device 260 further carries out the processing in the rider-steering-based roll manipulated variable calculating section 288. The rider-steering-based roll manipulated variable calculating section 288 receives a detected steering angle δf_act and a detected handlebar torque Th_act, as shown in FIG. 37.

The detected handlebar torque Th_act is a detected value indicated by an output from the aforesaid handlebar torque detector 264.

Figure 37:
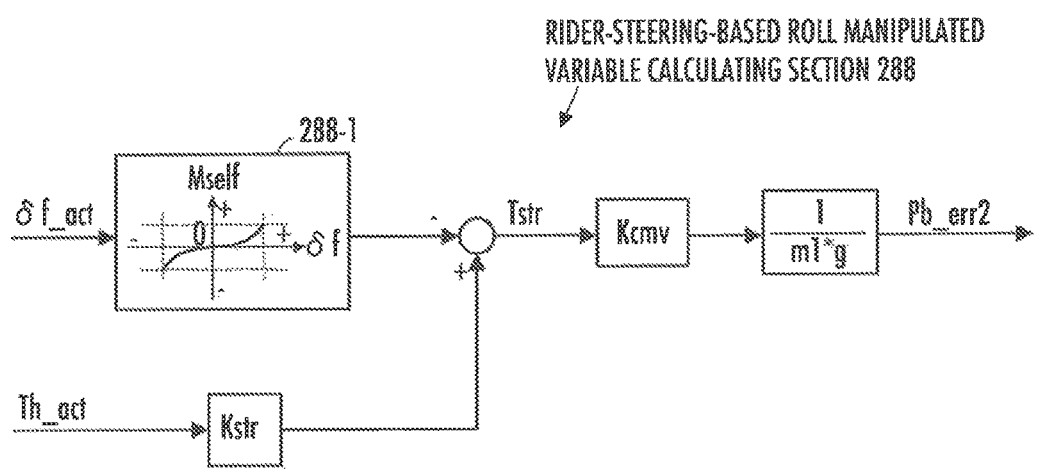
FIG. 37 is a block and line diagram showing the processing performed by the rider-steering-based roll manipulated variable calculating section shown in FIG. 31.

The rider-steering-based roll manipulated variable calculating section 288 calculates a rider-steering-based roll manipulated variable Pb_err2 as a correction amount of the desired inverted pendulum mass point lateral movement amount Pb_diff_y_cmd by the arithmetic processing shown by the block and line diagram in FIG. 37.

Specifically, the rider-steering-based roll manipulated variable calculating section 288 calculates the rider-steering-based roll manipulated variable Pb_err2 by the arithmetic processing of the following expressions (37a) and (37b).

$$Tstr = Kstr*Th\_act - Mself(\delta f\_act) \tag{37a}$$

$$Pb\_err2 = Kcmv*Tstr*(1/(m1*g)) \tag{37b}$$

Here, Kstr*Th_act on the right side of the expression (37a) corresponds to an estimate of the steering torque of the front wheels 203*f* (resultant torque of the torques about the steering axes CfR and CfL of the respective front wheels 203*f*R and 203*f*L) according to the handlebar torque Th_act. In this case, Kstr is a coefficient of a prescribed value. The positive direction of the steering torque is a counterclockwise direction when the three-wheeled vehicle 201 is seen from above.

Further, Mself(δf_act) on the right side of the expression (37a) is a moment (hereinafter, referred to as "self-steering moment") in the steering direction of the front wheels 203*f* which is generated spontaneously (without manipulation of the handlebar 220) by the phenomenon called "self-steering" in the three-wheeled vehicle 201.

The self-steering moment Mself(δf_act) is a function value which is determined by a preset conversion function Mself(δf) from the value of δf_act in a processing section 288-1 in FIG. 37. This conversion function Mself(δf) is configured, for example, by a mapping or an arithmetic expression. The conversion function Mself(δf) has been set, as illustrated by the graph in the processing section 288-1, such that the value of Mself increases monotonically from a value on the negative side to a value on the positive side as the value of δf increases (from a value on the negative side to a value on the positive side).

Therefore, Tstr calculated by the expression (37a) is a component of the steering torque of the front wheels 203*f* according to the handlebar torque Th_act, excluding the self-steering moment Mself(δf_act). This component corresponds to the steering torque (steering force) of the front wheels 203*f* that is intended by the operator through manipulation of the handlebar 220.

Further, Kcmv*Tstr on the right side of the expression (37b) is for converting the steering torque Tstr, calculated by the expression (37a), into a moment in the roll direction of the vehicle body 202. In this case, Kcmv is a conversion factor of a prescribed value.

The rider-steering-based roll manipulated variable Pb_err2 is calculated by dividing this moment Kcmv*Tstr by m1*g.

In this manner, the rider-steering-based roll manipulated variable Pb_err2 for correcting the desired inverted pendulum mass point lateral movement amount Pb_diff_y_cmd so as to make the vehicle body 202 lean according to the steering torque Tstr of the front wheels 203*f* by the operator's manipulation of the handlebar 220 is calculated.

In this case, in the case where the estimate Tstr of the steering torque is a torque in the positive (or, counterclockwise) direction, the rider-steering-based roll manipulated variable Pb_err2 is determined to become a manipulated variable in the direction making the vehicle body 202 lean to the left. In the case where the estimate Tstr of the steering torque is a torque in the negative (or, clockwise) direction, the rider-steering-based roll manipulated variable Pb_err2 is determined to become a manipulated variable in the direction making the vehicle body 202 lean to the right.

In the above-described manner, the rider-steering-based roll manipulated variable calculating section 288 calculates the rider-steering-based roll manipulated variable Pb_err2 by the arithmetic processing of the expressions (37a) and (37b).

Figure 38:
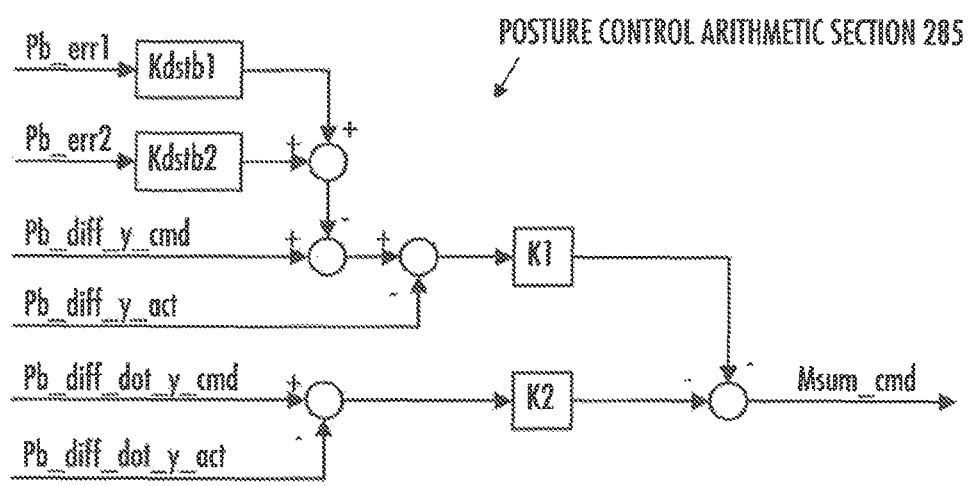
FIG. 38 is a block and line diagram showing the processing performed by the posture control arithmetic section shown in FIG. 31.

Next, the control device 260 carries out the processing in the posture control arithmetic section 285. As shown in FIG. 38, the posture control arithmetic section 285 receives: a desired inverted pendulum mass point lateral movement amount Pb_diff_y_cmd and a desired inverted pendulum mass point lateral velocity Pb_diff_dot_y_cmd determined in the desired posture state determining section 284, an estimated inverted pendulum mass point lateral movement amount Pb_diff_y_act calculated in the estimated inverted pendulum mass point lateral movement amount calculating section 281, an estimated inverted pendulum mass point lateral velocity Pb_diff_dot_y_act calculated in the estimated inverted pendulum mass point lateral velocity calculating section 282, an estimated inverted pendulum mass point lateral displacement Pb_err1 calculated in the rider's center-of-gravity lateral displacement index value calculating section 283, and a rider-steering-based roll manipulated variable Pb_err2 calculated in the rider-steering-based roll manipulated variable calculating section 288.

The posture control arithmetic section 285 uses these input values to perform the arithmetic processing shown by the block and line diagram in FIG. 38, to determine a desired posture manipulation moment Msum_cmd.

That is, the posture control arithmetic section 285 calculates the desired posture manipulation moment Msum_cmd by the arithmetic processing of the following expression (38).

$$M\text{sum\_cmd} = -K1*((Pb\_diff\_y\_cmd - Kdstb1*Pb\_err1 - Kdstb2*Pb\_err2) - Pb\_diff\_y\_act) - K2*(Pb\_diff\_dot\_y\_cmd - Pb\_diff\_dot\_act) \quad (38)$$

Here, Kdstb1, Kdstb2, K1, and K2 in the expression (38) are gains of prescribed values. The values of these gains Kdstb1, Kdstb2, K1, and K2 are set variably in accordance with, for example, the estimated traveling speed Vox_act of the three-wheeled vehicle 201, or the detected steering angle δf_act.

In this case, in the present embodiment, the values of the gains Kdstb1. Kdstb2, K1, and K2 are set such that the moment in the roll direction acting on the vehicle body 202 by the actuation of the vehicle-body leaning actuator 209 according to Msum_cmd will become not so large (such that the operator can lean the vehicle body 202 in the roll direction relatively easily by shifting his/her weight).

Further, the magnitudes of the gains Kdstb1, Kdstb2, K1, and K2 are all set variably such that they become smaller as the estimated traveling speed Vox_act of the three-wheeled vehicle 201 is higher.

Kdstb1*Pb_err1 in the expression (38) is a correction amount, applicable in the lean-out or lean-in state, for correcting the desired inverted pendulum mass point lateral movement amount Pb_diff_y_cmd determined in the desired posture state determining section 284 in the direction of reducing Pb_err1 (in the direction from the lean-out or lean-in state toward the lean-with state).

Further, Kdstb2*Pb_err2 in the expression (38) is a correction amount for correcting the desired inverted pendulum mass point lateral movement amount Pb_diff_y_cmd so as to make the vehicle body 202 lean according to the steering force of the front wheels 203*f* by the operator.

Further, in the expression (38), −K1*((Pb_diff_cmd−Kdstb1*Pb_err1−Kdstb2*Pb_err2)−Pb_diff_y_act) is a feedback manipulated variable component having the function of causing the deviation between the desired value (Pb_diff_y_cmd−Kdstb1*Pb_err1−Kdstb2*Pb_err2), obtained by correcting Pb_diff_y_cmd according to Pb_err1 and Pb_err2, and Pb_diff_y_act to approach zero, and −K2*(Pb_diff_dot_y_cmd−Pb_diff_dot_y_act) is a feedback manipulated variable component having the function of causing the deviation (Pb_diff_dot_y_cmd−Pb_diff_dot_y_act) to approach zero.

In the above-described manner, in the present embodiment, the posture control arithmetic section 285 performs the arithmetic processing of the expression (38), at each control processing cycle, to thereby calculate the desired posture manipulation moment Msum_cmd.

The control device 260 further carries out the processing in the desired traveling speed determining section 287. The processing in the desired traveling speed determining section 287 is the same as, for example, the processing in the desired traveling speed determining section 87 in the first through fourth embodiments. Therefore, a desired traveling speed Vox_cmd is determined by the processing shown by the block and line diagram in FIG. 17, for example.

A description will now be made about the control of the aforesaid vehicle-body leaning actuator 209 and rear-wheel driving actuator 230.

The control device 260 controls the vehicle-body leaning actuator 209 in accordance with the desired posture manipulation moment Msum_cmd determined in the posture control arithmetic section 285. In this case, the control device 260 converts Msum_cmd into a desired output torque of the vehicle-body leaning actuator 209 by a prescribed arithmetic expression or mapping which is set in advance. The control device 260 then controls the electric current passed through the vehicle-body leaning actuator 209 (electric motor), in accordance with an electric current command value that is determined according to the desired output torque.

Further, the control device 260 determines an electric current command value for the rear-wheel driving actuator 230 (electric motor), from the desired traveling speed Vox_cmd determined in the desired traveling speed determining section 287 and the estimated traveling speed Vox_act calculated by the above expression (33e), by the processing similar to that in the front-wheel driving actuator control section 92 in the first through fourth embodiments (see FIG. 19). The control device 260 then controls the electric current passed through the rear-wheel driving actuator 230 in accordance with the determined electric current command value.

The above has described the details of the control processing in the control device 260 according to the present embodiment.

Here, the correspondence between the present embodiment and the present invention will be described.

In the present embodiment, the vehicle-body leaning actuator 209 corresponds to the actuator in the present invention. In this case, the vehicle-body leaning actuator 209 primarily has the function as an actuator which causes the vehicle body 202 to swing in the roll direction with respect to the road surface. The vehicle-body leaning actuator 209 also has the function as an actuator which moves the center of gravity of the vehicle body 202 in the lateral direction (Y-axis direction).

Further, the rider's center-of-gravity lateral displacement index value calculating section 283 corresponds to the center-of-gravity displacement degree index value determining section in the present invention. In this case, the rider's center-of-gravity lateral displacement index value Pb_err1 corresponds to the center-of-gravity displacement degree index value in the present invention. Further, the position on the plane of symmetry of the vehicle body 202 corresponds to the prescribed reference position related to the position of the center of gravity of the operator.

Further, the estimated front-wheel rotational transfer velocity Vf_act, the detected steering angle δf_act, the last time's value Msum_cmd_p (which corresponds to a pseudo estimate of posture manipulation moment) of the desired posture manipulation moment Msum_cmd, and the second estimated inverted pendulum mass point lateral velocity Pb_diff_dot_y_2 as a differential of the estimated inverted pendulum mass point lateral movement amount Pb_diff_y_act correspond to the observed values of the motional state of the mobile body (three-wheeled vehicle 201) used in the processing of the center-of-gravity displacement degree index value determining section (rider's center-of-gravity lateral displacement index value calculating section 283). In this case, Pb_diff_dot_y_2 corresponds to the observed value of the inclination state quantity of the vehicle body 202.

Further, the above expressions (32a) and (32b) correspond to the dynamics computation in the present invention. The first estimated inverted pendulum mass point lateral velocity Pb_diff_dot_y_1 calculated by the expression (32b) corresponds to the calculated value of the inclination state quantity of the vehicle body 202.

Further, the rider-steering-based roll manipulated variable calculating section 288 includes the function as the steering force estimating section in the present invention. Specifically, the processing of the above expression (37a) corresponds to the steering force estimating section.

The posture control arithmetic section 285 corresponds to the control input determining section in the present invention, and Msum_cmd calculated by the posture control arithmetic section 285 corresponds to the control input in the present invention. The gain Kdstb1 in the above expression (38a) performed by the posture control arithmetic section 285 corresponds to the sensitivity of the change in control input (Msum_cmd) to the change in center-of-gravity displacement degree index value (riders center-of-gravity lateral displacement index value Pb_err1).

According to the fifth embodiment described above, divergence of the estimated inverted pendulum mass point lateral movement amount Pb_diff_y_act from a desired inverted pendulum mass point lateral movement amount Pb_diff_y_cmd and divergence in the lateral direction of the position of the center of gravity of the operator from a position on the plane of symmetry of the vehicle body 202 are both prevented.

It is therefore possible to improve the tracking of the roll angle of the vehicle body 202 to the shift of the operator's weight.

In addition, the rotative driving force of the vehicle-body leaning actuator 209 is controlled so as to make the roll angle φb_act of the vehicle body 202 approach the inclination angle according to the steering force of the front wheels 203f generated by the operator's manipulation of the handlebar 220.

It is therefore possible to make the vehicle body 202 lean in response to a request of turning the three-wheeled vehicle 201 according to the steering of the front wheels 203f by the operator.

Sixth Embodiment

A sixth embodiment of the present invention will be described below with reference to FIGS. 39 to 42. The mobile body in the present embodiment is the same as the mobile body (three-wheeled vehicle 201) in the fifth embodiment. The present embodiment differs from the fifth embodiment only in part of the control processing of the control device. Therefore, the description of the present embodiment will focus on the matters different from the fifth embodiment. Detailed descriptions of the matters identical to those in the fifth embodiment will be omitted.

In the fifth embodiment, the inverted pendulum mass point lateral movement amount Pb_diff_y and the inverted pendulum mass point lateral velocity Pb_diff_dot_y for the inverted pendulum mass point 71 in the two-mass-point model were used as the controlled state quantities.

In contrast, in the present embodiment, the roll angle φb of the vehicle body 202 and its temporal change rate, or, the roll angular velocity φb_dot are used as the controlled state quantities.

Figure 39:
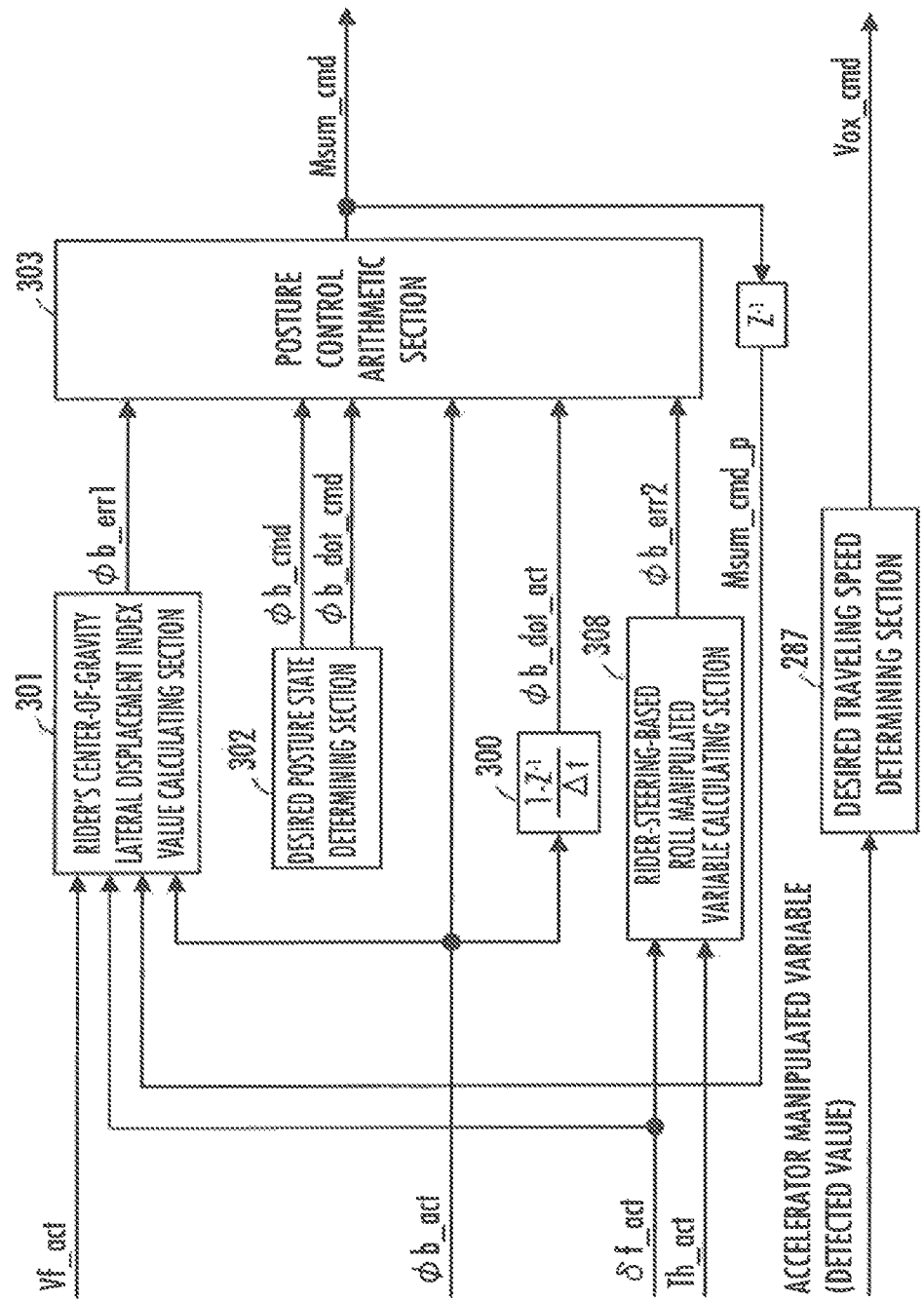
FIG. 39 is a block diagram showing the major functions of the control device in the sixth embodiment.

Described below more specifically, the control device 260 in the present embodiment includes, as functions implemented when the CPU executes installed programs (functions implemented by software) or as functions implemented by hardware configurations, the functions shown by the block diagram in FIG. 39.

That is, the control device 260 includes: a roll angular velocity detecting section 300 which calculates a differential (temporal change rate) of the detected roll angle φb_act of the vehicle body 202 as a detected roll angular velocity φb_dot_act, a rider's center-of-gravity lateral displacement index value calculating section 301 which calculates an estimated vehicle body inclination angle displacement φb_err1 as the aforesaid rider's center-of-gravity lateral displacement index value, and a desired posture state determining section 302 which determines a desired roll angle φb_cmd and a desired roll angular velocity φb_dot_cmd of the vehicle body 202.

Here, the estimated vehicle body inclination angle displacement φb_err1 has the same technical meaning as that in the third or fourth embodiment.

The control device 260 further includes a rider-steering-based roll manipulated variable calculating section 308 which calculates a rider-steering-based roll manipulated variable φb_err2 for causing the roll angle φb of the vehicle body 202 to approach an inclination angle appropriate to the steering force of the front wheels 203f caused by the operator's manipulation of the handlebar 220.

In the present embodiment, the rider-steering-based roll manipulated variable φb_err2 is a correction amount for correcting the desired roll angle φb_cmd.

The control device 260 further includes a posture control arithmetic section 303 which determines a desired posture manipulation moment Msum_cmd as a control input (manipulated variable) for controlling the posture in the roll direction of the vehicle body 202, and a desired traveling speed determining section 287 which determines a desired traveling speed Vox_cmd. The desired traveling speed determining section 287 is the same as that in the fifth (or first) embodiment.

In the present embodiment, the processing in the rider's center-of-gravity lateral displacement index value calculating section 301, the desired posture state determining section 302, the rider-steering-based roll manipulated variable calculating section 308, and the posture control arithmetic section 303 are carried out, at each control processing cycle, in the following manner.

First, the desired posture state determining section 302 determines, as the desired roll angle φb_cmd, a roll angle φb_lean which is calculated by the expression (36a) explained above in conjunction with the fifth embodiment, for example. The section 302 sets the desired roll angular velocity φb_dot_cmd to zero, for example. It should be noted that the desired roll angular velocity φb_dot_cmd may be determined variably in accordance with, for example, the detected steering angle δf_act.

Further, the desired roll angle φb_cmd may be set to zero, for example. Alternatively, the desired roll angle φb_cmd may be determined variably in accordance with, for example, the detected steering angle δf_act.

Figure 40:
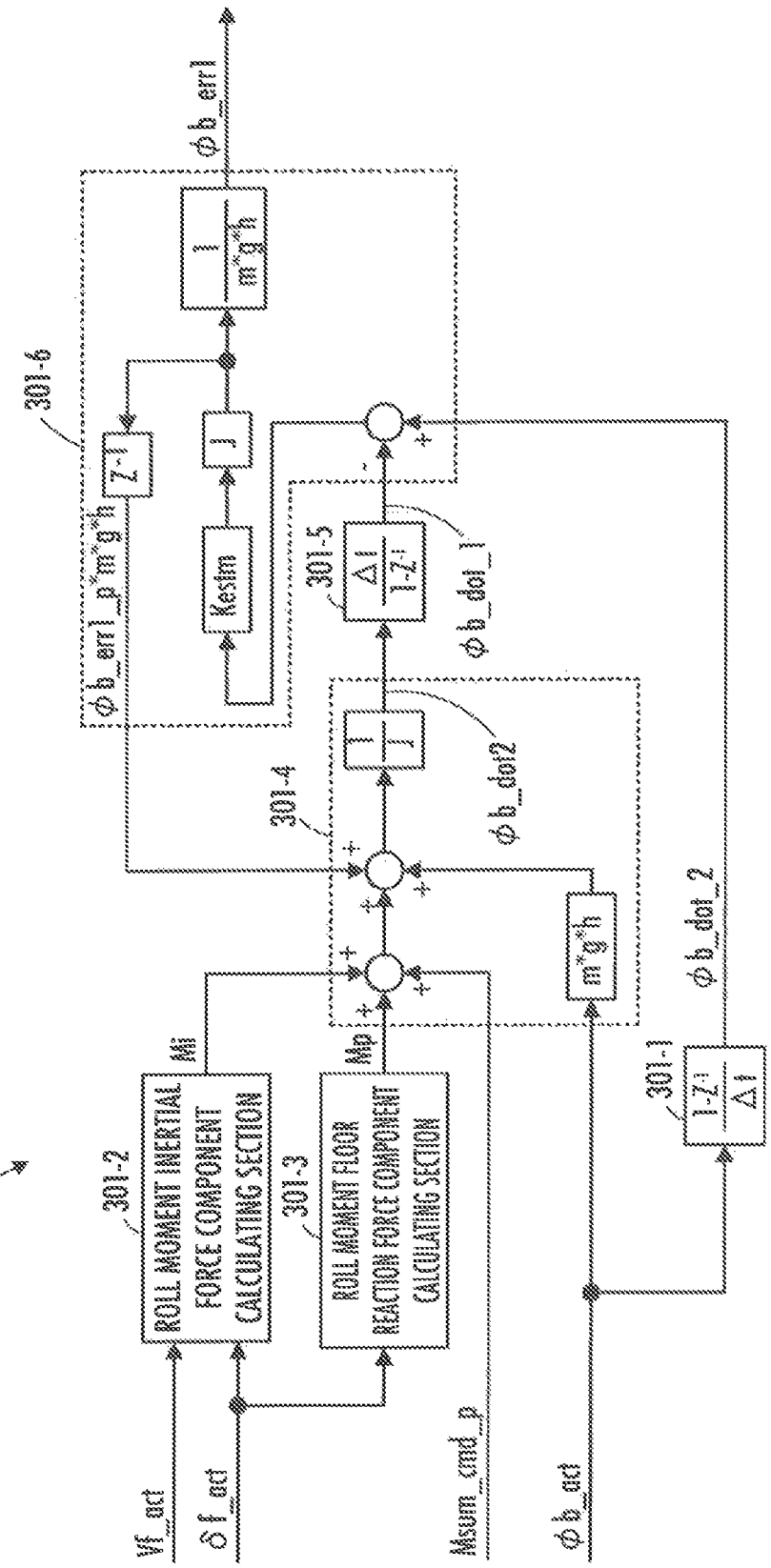
FIG. 40 is a block and line diagram showing the processing performed by the rider's center-of-gravity lateral displacement index value calculating section shown in FIG. 39.

The rider's center-of-gravity lateral displacement index value calculating section 301 receives, as shown in FIG. 40, a detected roll angle φb_act, a detected steering angle δf_act, an estimated front-wheel rotational transfer velocity Vf_act, and a last time's value Msum_cmd_p (determined in the last time's control processing cycle) of the desired posture manipulation moment Msum_cmd. It should be noted that Msum_cmd_p corresponds to a pseudo estimate (observed value) of the moment (posture manipulation moment) in the roll direction acting on the vehicle body 202 by the driving force of the vehicle-body leaning actuator 209.

The rider's center-of-gravity lateral displacement index value calculating section 301 calculates an estimated vehicle body inclination angle displacement φb_err1 as a rider's center-of-gravity lateral displacement index value, through the arithmetic processing shown by the block and line diagram in FIG. 40. In this case, the rider's center-of-gravity lateral displacement index value calculating section 301 is configured as an observer, as in the fifth embodiment.

Specifically, the rider's center-of-gravity lateral displacement index value calculating section 301 calculates an estimate of the roll moment inertial force component Mi and an estimate of the roll moment floor reaction force component Mp by a roll moment inertial force component calculating section 301-2 and a roll moment floor reaction force component calculating section 301-3, respectively, on the basis of the input values of δf_act and Vf_act.

In this case, the roll moment inertial force component calculating section 301-2 calculates an estimate of the roll moment inertial force component Mi by the arithmetic processing similar to that in the fifth embodiment. More specifically, the roll moment inertial force component calculating section 301-2 calculates the estimate of Mi by performing the arithmetic processing of the above expressions (33a) to (33e) and of the following expression (33f) which is obtained by replacing m1*h' on the right side of the above expression (33f) with m*h.

$$Mi=(Voy\_\text{dot}\_act+\omega z\_act*Vox\_act)*m*h \quad (33f)$$

Further, the roll moment floor reaction force component calculating section 301-3 calculates an estimate of the roll moment floor reaction force component Mp by performing the arithmetic processing of the above expression (34a) in the arithmetic processing of the roll moment floor reaction force component calculating section 283-3 in the fifth embodiment, and of the following expression (34d) which is obtained by setting p2 in the expression (34c) to zero.

$$Mp=Pf(\delta f\_act)*(Lr/L)*m*g \quad (34d)$$

The rider's center-of-gravity lateral displacement index value calculating section 301 then performs a dynamics computation of the following expression (40a) in a processing section 301-4, on the basis of the estimates of Mi and Mp, the input value of φb_act, a value (last time's value) φb_err1_p of the estimated vehicle body inclination angle displacement φb_err1 calculated in the last time's control processing cycle, and the last time's value Msum_cmd_p of Msum_cmd, to thereby calculate an estimate of an inclination angular acceleration φb_dot2 of the vehicle body 202.

Stated differently, the last time's value φb_err1_p corresponds to the latest one of the estimated vehicle body inclination angle displacements φb_err1 calculated up to then.

$$\phi b\_\text{dot}2=(m*g*h*(\phi b\_act+\phi b\_err1\_p)+Mp+Mi+Msum\_cmd\_p)/J \quad (40a)$$

In the expression (40a), J is a predetermined, set value of the inertia of the entirety of the three-wheeled vehicle 201 (including the operator) about the X axis of the aforesaid XYZ coordinate system.

Then, the rider's center-of-gravity lateral displacement index value calculating section 301 integrates, in a processing section 301-5, φb_dot2 calculated by the above expression (40a), to thereby calculate a first estimated roll angular velocity φb_dot_1 as a first estimate of the roll angular velocity φb_dot of the vehicle body 202, as shown by the following expression (40b).

$$\phi b\_\text{dot}\_1=\text{integral of } \phi b\_\text{dot}2 \quad (40b)$$

Further, the rider's center-of-gravity lateral displacement index value calculating section 301 performs, in a processing section 301-1, a differential operation on the input value of φb_act, to calculate a second estimated roll angular velocity φb_dot_2 as a second estimate of the roll angular velocity φb_dot of the vehicle body 202, as shown by the following expression (40c).

$$\phi b\_dot\_2 = \text{differential(temporal change rate) of } \phi b\_act \quad (40c)$$

It should be noted that φb_dot_2 calculated by the expression (40c) is the same as the detected roll angular velocity φb_dot_act calculated in the aforesaid roll angular velocity detecting section 300. Therefore, the detected roll angular velocity φb_dot_act may be used, without modification, as the second estimated roll angular velocity φb_dot_2.

Here, the first estimated roll angular velocity φb_dot_1 calculated by the above expression (40b) corresponds to an estimate of the roll angle of the vehicle body 202 calculated on the assumption that the overall center of gravity G of the three-wheeled vehicle 201 is on the plane of symmetry of the vehicle body 202.

Therefore, the deviation between the second estimated roll angular velocity φb_dot_2 and the first estimated roll angular velocity φb_dot_1, calculated dynamically according to the above expressions (40a) and (40b), becomes a value depending on the vehicle body inclination angle displacement amount caused by the lateral displacement of the center of gravity of the operator.

Therefore, the rider's center-of-gravity lateral displacement index value calculating section 301 calculates the estimated vehicle body inclination angle displacement φb_err1, in a processing section 301-6, by the arithmetic processing of the following expression (40d).

$$\phi b\_err1 = (\phi b\_dot\_2 - \phi b\_dot\_1) * Kestm * J/(m*g*h) \quad (40d)$$

Kestm used in the arithmetic processing of this expression (40d) is a predetermined gain of a prescribed value. It should be noted that Kestm*J/(m*g*h) in the expression (40d) may be set in advance as a single gain value.

Supplementally, in the block and line diagram in FIG. 40, a last time's value (=φb_err1_p*m*g*h) of (φb_dot_2−b_dot_1)*Kestm*J is input to the processing section 301-4 from the processing section 301-6. Alternatively, a last time's value φb_err1_p of the estimated vehicle body inclination angle displacement φb_err1, for example, may be input directly to the processing section 301-4.

In the above-described manner, the rider's center-of-gravity lateral displacement index value calculating section 301 in the present embodiment calculates the estimates of Mi and Mp, and uses these estimates, the detected vehicle body roll angle φb_act, and the last time's value Msum_cmd_p of Msum_cmd, as a pseudo estimate of the posture manipulation moment acted on the vehicle body 202 by the vehicle-body leaning actuator 209, to perform the arithmetic processing of the expressions (40a) to (40d), to thereby calculate the estimated vehicle body inclination angle displacement φb_err1.

Figure 41:
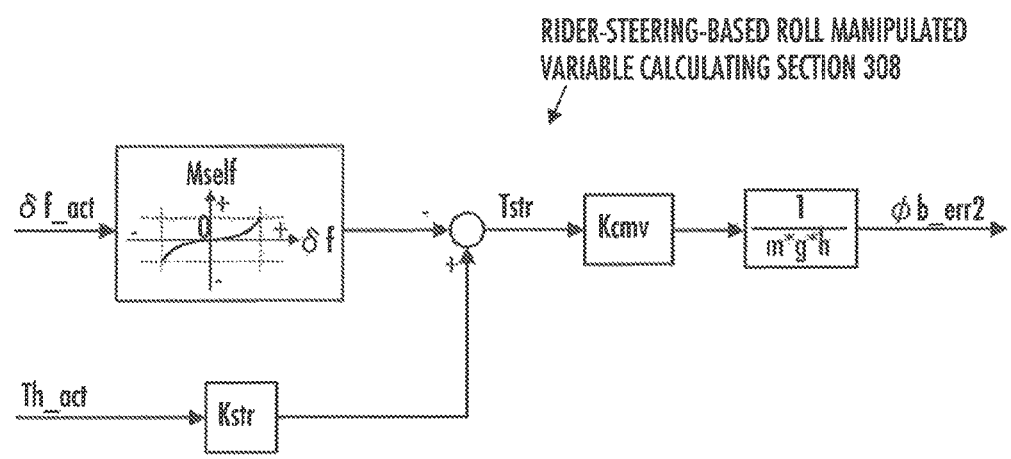
FIG. 41 is a block and line diagram showing the processing performed by the rider-steering-based roll manipulated variable calculating section shown in FIG. 39.

Next, the rider-steering-based roll manipulated variable calculating section 308 receives a detected steering angle δb_act and a detected handlebar torque Th_act, as shown in FIG. 41.

The rider-steering-based roll manipulated variable calculating section 308 calculates a rider-steering-based roll manipulated variable φb_err2 as a correction amount of the desired roll angle φb_cmd, by the arithmetic processing shown by the block and line diagram in FIG. 41.

Specifically, the rider-steering-based roll manipulated variable calculating section 308 calculates the rider-steering-based roll manipulated variable φb_err2 by the arithmetic processing of the above expression (37a) in the fifth embodiment and of the following expression (37b') which is obtained by replacing m1*g on the right side of the expression (37b) with m*g*h.

$$\phi b\_err2 = Kcmv * Tstr * (1/(m*g*h)) \quad (37b')$$

In this manner, the rider-steering-based roll manipulated variable φb_err2 for correcting the desired roll angle φb_cmd so as to make the vehicle body 202 lean according to the steering torque Tstr of the front wheels 203f by the operator's manipulation of the handlebar 220 is calculated.

In the above-described manner, the rider-steering-based roll manipulated variable calculating section 308 calculates the rider-steering-based roll manipulated variable φb_err2 by the arithmetic processing of the expressions (37a) and (37b').

Figure 42:
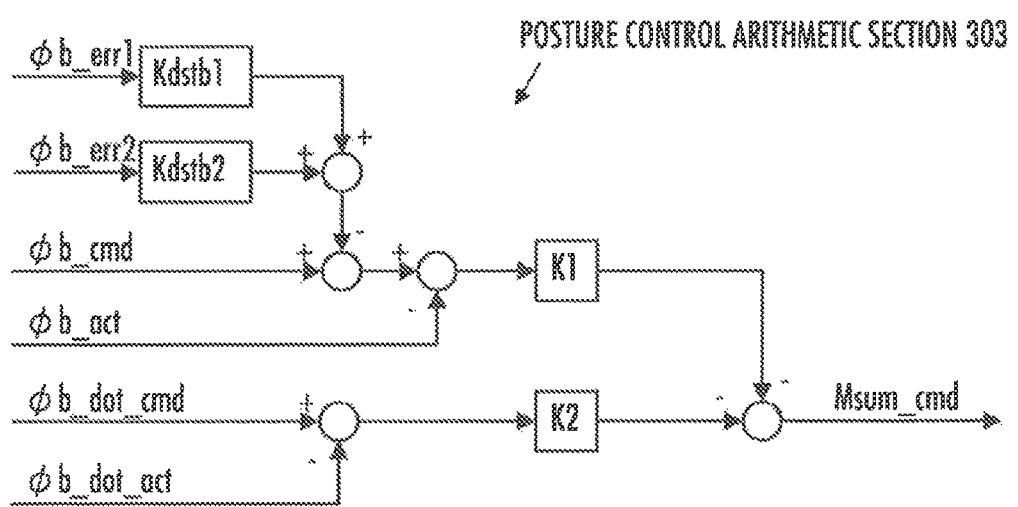
FIG. 42 is a block and line diagram showing the processing performed by the posture control arithmetic section shown in FIG. 39.

Next, the posture control arithmetic section 303 receives, as shown in FIG. 42, a desired roll angle φb_cmd and a desired roll angular velocity φb_dot_cmd determined in the desired posture state determining section 302, a detected roll angle φb_act and a detected roll angular velocity φb_dot_act, an estimated vehicle body inclination angle displacement φb_err1 calculated in the rider's center-of-gravity lateral displacement index value calculating section 301, and a rider-steering-based roll manipulated variable φb_err2 calculated in the rider-steering-based roll manipulated variable calculating section 308.

The posture control arithmetic section 303 uses these input values to perform the arithmetic processing shown by the block and line diagram in FIG. 42, to determine a desired posture manipulation moment Msum_cmd.

That is, the posture control arithmetic section 303 calculates the desired posture manipulation moment Msum_cmd by the arithmetic processing of the following expression (41).

$$M\text{sum\_cmd} = -K1*((\phi b\_cmd - Kdstb1*\phi b\_err1 - Kdstb2*\phi b\_err2) - b\_act) - K2*(\phi b\_dot\_cmd - \phi b\_dot\_act) \quad (41)$$

Here, Kdstb1, Kdstb2, K1, and K2 in the expression (41) are gains of prescribed values. The values of these gains Kdstb1, Kdstb2, K1, and K2 are set variably in accordance with, for example, the estimated traveling speed Vox_act of the three-wheeled vehicle 201, or the detected steering angle δf_act.

In this case, in the present embodiment, the values of the gains Kdstb1, Kdstb2, K1, and K2 are set such that the moment in the roll direction acting on the vehicle body 202 by the actuation of the vehicle-body leaning actuator 209 according to Msum_cmd will become not so large (such that the operator can lean the vehicle body 202 in the roll direction relatively easily by shifting his/her weight).

Further, the magnitudes of the gains Kdstb1, Kdstb2, K1, and K2 are all set variably such that they become smaller as the estimated traveling speed Vox_act of the three-wheeled vehicle 201 is higher.

It should be noted that the values of the gains Kdstb1, Kdstb2, K1, and K2 are generally different from those in the fifth embodiment.

Kdstb1*φb_err1 in the expression (41) is a correction amount, applicable in the lean-out or lean-in state, for correcting the desired roll angle φb_cmd determined in the desired posture state determining section 302 in the direction of reducing φb_err1 (in the direction from the lean-out or lean-in state toward the lean-with state).

Further, Kdstb2*φb_err2 in the expression (41) is a correction amount for correcting the desired roll angle φb_cmd so as to make the vehicle body 202 lean according to the steering force of the front wheels 203f by the operator.

Further, in the expression (41), $-K1*((\phi b\_cmd-Kdstb1*gb\_err1-Kdstb2*\phi b\_err2)-\phi b\_act)$ is a feedback manipulated variable component having the function of causing the deviation between the desired value ($\phi b\_cmd-Kdstb1*\phi b\_err1-Kdstb2*\phi b\_err2$), obtained by correcting $\phi b\_cmd$, and the detected roll angle $\phi b\_act$ to approach zero, and $-K2*(\phi b\_dot\_cmd-\phi b\_dot\_act)$ is a feedback manipulated variable component having the function of causing the deviation ($\phi b\_dot\_cmd-\phi b\_dot\_act$) to approach zero.

In the above-described manner, the posture control arithmetic section 303 performs the arithmetic processing of the above expression (41), at each control processing cycle, to thereby calculate the desired posture manipulation moment Msum_cmd.

The present embodiment is identical to the fifth embodiment except for the matters described above.

Here, the correspondence between the present embodiment and the present invention will be described supplementally.

In the present embodiment, the vehicle-body leaning actuator 209 corresponds to the actuator in the present invention. In this case, the vehicle-body leaning actuator 209 primarily has the function as an actuator which causes the vehicle body 202 to swing in the roll direction with respect to the road surface. The vehicle-body leaning actuator 209 also has the function as an actuator which moves the center of gravity of the vehicle body 202 in the lateral direction (Y-axis direction).

Further, the rider's center-of-gravity lateral displacement index value calculating section 301 corresponds to the center-of-gravity displacement degree index value determining section in the present invention. In this case, the rider's center-of-gravity lateral displacement index value $\phi b\_err1$ corresponds to the center-of-gravity displacement degree index value in the present invention. Further, the position on the plane of symmetry of the vehicle body 202 corresponds to the prescribed reference position related to the position of the center of gravity of the operator.

Further, the estimated front-wheel rotational transfer velocity Vf_act, the detected steering angle $\delta f\_act$, the last time's value Msum_cmd_p (which corresponds to a pseudo estimate of posture manipulation moment) of the desired posture manipulation moment Msum_cmd, and the second estimated roll angular velocity $\phi b\_dot\_2$ (=detected roll angular velocity $\phi b\_dot\_act$) as a differential of the detected roll angle $\phi b\_act$ correspond to the observed values of the motional state of the mobile body (three-wheeled vehicle 201) used in the processing of the center-of-gravity displacement degree index value determining section (rider's center-of-gravity lateral displacement index value calculating section 301). In this case, $\phi b\_dot\_2$ corresponds to the observed value of the inclination state quantity of the vehicle body 202.

Further, the above expressions (40a) and (40b) correspond to the dynamics computation in the present invention. The first estimated roll angular velocity $\phi b\_dot\_1$ calculated by the expression (40b) corresponds to the calculated value of the inclination state quantity of the vehicle body 202.

It should be noted that the dynamics computation in this case becomes the dynamics computation based on the dynamic model of the system made up of the mass point of the mass m (mass point of the overall center of gravity) and the inertia J.

Further, the rider-steering-based roll manipulated variable calculating section 308 includes the function as the steering force estimating section in the present invention. Specifically, the processing of the above expression (37a) corresponds to the steering force estimating section.

The posture control arithmetic section 303 corresponds to the control input determining section in the present invention, and Msum_cmd calculated by the posture control arithmetic section 303 corresponds to the control input in the present invention. The gain Kdstb1 in the above expression (41) performed by the posture control arithmetic section 303 corresponds to the sensitivity of the change in control input (Msum_cmd) to the change in center-of-gravity displacement degree index value (rider's center-of-gravity lateral displacement index value $\phi b\_err1$).

According to the sixth embodiment described above, it is possible to achieve the effects similar to those in the fifth embodiment. The fifth embodiment, however, is more advantageous than the sixth embodiment in terms of improving the reliability of the posture control of the vehicle body 202.

MODIFICATIONS

Several modifications related to the above-described first through sixth embodiments will be described below.

In the first through fourth embodiments, two steering axes of the first steering axis Cf1 and the second steering axis Cf2 were provided as the steering axis of the front wheel 3f(steered wheel). The steering axis of the front wheel 3f, however, may be only one steering axis (Cf1 or Cf2, for example). An embodiment in this case can be constructed, for example, by partially modifying a respective one of the first through fourth embodiments, as follows.

The steering mechanism interposed between the vehicle body 2 and the front-wheel support mechanism 5 is configured such that the front wheel 3f can be steered only about one of the first steering axis Cf1 and the second steering axis Cf2, for example only about the first steering axis Cf1, and it is further configured such that the front wheel 3f can be steered by the driving force of the aforesaid first steering actuator 15 and by the operator's manipulation of rotating the handlebar 46.

Then, in the first embodiment, the processing of the second steering angle command determining section 86 is eliminated, and parts of the processing of the estimated inverted pendulum mass point lateral movement amount calculating section 81, the estimated inverted pendulum mass point lateral velocity calculating section 82, the rider's center-of-gravity lateral displacement index value calculating section 83, and the posture control arithmetic section 85 are modified.

Specifically, in the estimated inverted pendulum mass point lateral movement amount calculating section 81, the estimated inverted pendulum mass point lateral velocity calculating section 82, and the rider's center-of-gravity lateral displacement index value calculating section 83, the arithmetic processing explained in the first embodiment are carried out with the value of the detected second steering angle $\delta f2\_act$ and the value of the aforesaid function value Plf2y($\delta f1\_act+\delta f2\_act$) both set to zero.

Further, the posture control arithmetic section 85 calculates the desired first steering angular acceleration $\delta f1\_dot2\_cmd$ by correcting the calculated value on the right side of the above expression (17a) by a required value which is determined according to the detected handlebar torque Th_act (for example, the steering angle calculated by the same arithmetic processing as in the expressions (18a) to (18c) of the arithmetic processing in the aforesaid second steering angle command determining section 86).

Otherwise, the processing may be the same as in the first embodiment. In this manner, an embodiment as a partially modified version of the first embodiment is constructed.

Further, in the second embodiment, the processing of the second steering angle command determining section 86 is eliminated, and parts of the processing of the estimated inverted pendulum mass point lateral movement amount calculating section 81, the rider's center-of-gravity lateral displacement index value calculating section 83, and the posture control arithmetic section 102 are modified.

Specifically, in the estimated inverted pendulum mass point lateral movement amount calculating section 81 and the rider's center-of-gravity lateral displacement index value calculating section 83, the arithmetic processing explained in the second embodiment (identical to those in the first embodiment) are carried out with the value of the detected second steering angle δf2_act and the value of the aforesaid function value Plf2y(δf1_act+δf2_act) both set to zero.

Further, the posture control arithmetic section 102 calculates the desired posture manipulation moment Msum_cmd by correcting the calculated value on the right side of the above expression (21) by a required value which is determined according to the detected handlebar torque Th_act (for example, the steering angle calculated by the same arithmetic processing as in the expressions (18a) to (18c) of the arithmetic processing in the aforesaid second steering angle command determining section 86).

Otherwise, the processing may be the same as in the second embodiment. In this manner, an embodiment as a partially modified version of the second embodiment is constructed.

Further, in the third embodiment, the processing of the second steering angle command determining section 86 is eliminated, and parts of the processing of the rider's center-of-gravity lateral displacement index value calculating section 111 and the posture control arithmetic section 113 are modified.

Specifically, in the rider's center-of-gravity lateral displacement index value calculating section 111, the arithmetic processing explained in the third embodiment is carried out with the value of the detected second steering angle δf2_act set to zero.

Further, the posture control arithmetic section 113 calculates the desired first steering angular acceleration δf1_dot2_cmd by correcting the calculated value on the right side of the above expression (26a) by a required value which is determined according to the detected handlebar torque Th_act (for example, the steering angle calculated by the same arithmetic processing as in the expressions (18a) to (18c) of the arithmetic processing in the aforesaid second steering angle command determining section 86).

Otherwise, the processing may be the same as in the third embodiment. In this manner, an embodiment as a partially modified version of the third embodiment is constructed.

Further, in the fourth embodiment, the processing of the second steering angle command determining section 86 is eliminated, and parts of the processing of the rider's center-of-gravity lateral displacement index value calculating section 111 and the posture control arithmetic section 120 are modified.

Specifically, in the rider's center-of-gravity lateral displacement index value calculating section 111, the arithmetic processing explained in the fourth embodiment (identical to that in the third embodiment) is carried out with the value of the detected second steering angle δf2_act set to zero.

Further, the posture control arithmetic section 120 calculates the desired posture manipulation moment Msum_cmd by correcting the calculated value on the right side of the above expression (27) by a required value which is determined according to the detected handlebar torque Th_act (for example, the steering angle calculated by the same arithmetic processing as in the expressions (18a) to (18c) of the arithmetic processing in the aforesaid second steering angle command determining section 86).

Otherwise, the processing may be the same as in the fourth embodiment. In this manner, an embodiment as a partially modified version of the fourth embodiment is constructed.

Furthermore, the steering mechanism 6 of the two-wheeled vehicle 1 may have a configuration different from that in the first embodiment. For example, the steering mechanism 6 may have a structure as illustrated in FIG. 8 or 10 in Japanese Patent Application Laid-Open No. 2014-184934.

In the first through fourth embodiments, the front wheel 3*f* was steered by the first steering actuator 15 and the second steering actuator 37 for controlling the posture in the roll direction of the vehicle body 2. In the case where the rear wheel 3*r* serves as a steered wheel which is steerable, however, the rear wheel 3*r* may be steered by an actuator for controlling the posture in the roll direction of the vehicle body 2.

In the fifth and sixth embodiments, the three-wheeled vehicle 201 having two front wheels 203*f*R. 203*f*L was given as an example. The mobile body of the present invention, however, may be a three-wheeled vehicle having two rear wheels.

Figure 43A:
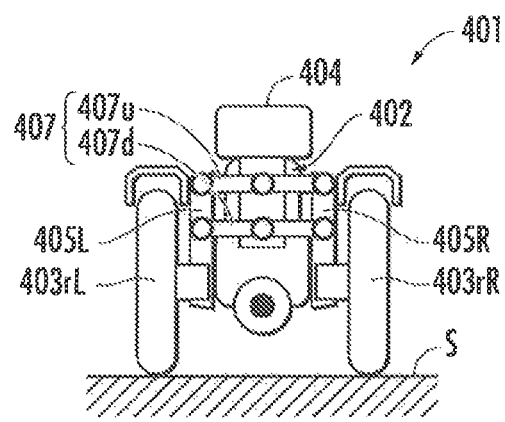
FIGS. 43A, 43B, and 43C are a back view, a side view, and a plan view, respectively, of another exemplary mobile body (four-wheeled vehicle) to which the present invention is applicable.
Figure 43B:
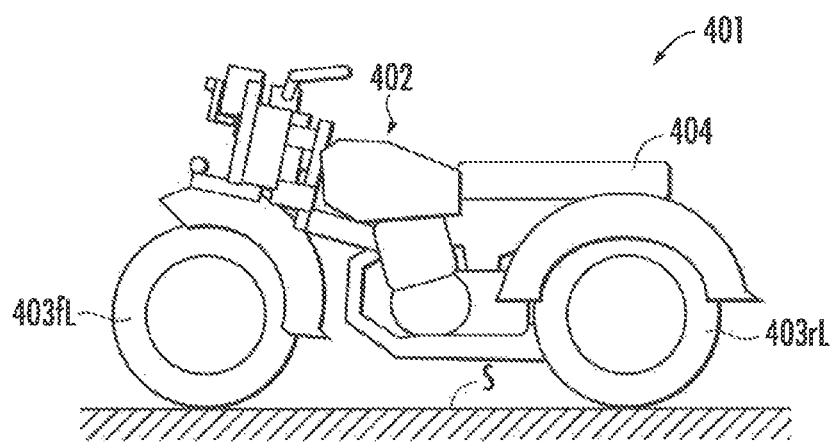
Figure 43C:
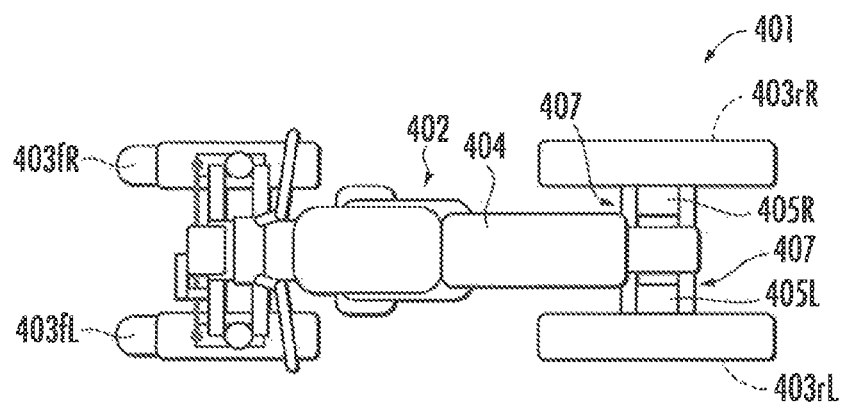

Furthermore, the mobile body of the present invention may be a four-wheeled vehicle 401 having two front wheels 403*f*R, 403*f*L and two rear wheels 403*r*R. 403*r*L, as illustrated in FIGS. 43A, 43B, and 43C, for example.

The four-wheeled vehicle 401 has a vehicle body 402 having a seat section 404 for an operator, and the front wheels 403*f*R and 403*f*L, arranged on the right and left, and the rear wheels 403*r*R and 403*r*L, arranged on the right and left, are disposed on the front side and the rear side, respectively, of the vehicle body 402.

In this four-wheeled vehicle 401, the configurations on the front side of the vehicle body 402, including the front-wheel support mechanisms, are identical to those shown in FIGS. 28A to 28C. Therefore, the description of these configurations will be omitted.

The rear wheels 403*r*L and 403*r*R are rotatably and pivotally supported, via bearings or the like, by rear-wheel support mechanisms 405L and 405R, respectively, which are disposed on the left and right sides at the rear portion of the vehicle body 402.

The left and right rear-wheel support mechanisms 405L and 405R are coupled via a parallel link 407 which is made up of an upper link 407*u* and a lower link 407*d* spaced apart in the up-and-down direction and extending in the lateral direction. Such a parallel link 407 is disposed on the front side and the rear side of the rear-wheel support mechanisms 405L, 405R.

The upper link 407*u* and the lower link 407*d* of a parallel link 407 have their center portions pivotally supported so as to be swingable about the axes in the longitudinal direction with respect to the rear end portion of the vehicle body 402.

Therefore, when the vehicle body 402 is caused to lean, the parallel link 407 on the rear side comes to swing with respect to the vehicle body 402, as with the parallel link on the front side of the vehicle body 402. In this case, the rear wheels 403rL and 403rR lean similarly to the front wheels 403fR and 403fL (in a manner similar to that shown in FIG. 29A).

In this mobile body 401, the posture in the roll direction of the vehicle body 402 can be controlled by the control processing similar to that in the fifth or sixth embodiment.

Further, in the fifth and sixth embodiments, the vehicle body 202 was allowed to lean (swing) with respect to the road surface by the mechanism utilizing the parallel link 207. As the mechanism for making the vehicle body swing with respect to the road surface, however, the mechanism illustrated in FIGS. 44 and 45, for example, may also be adopted.

Figure 44:
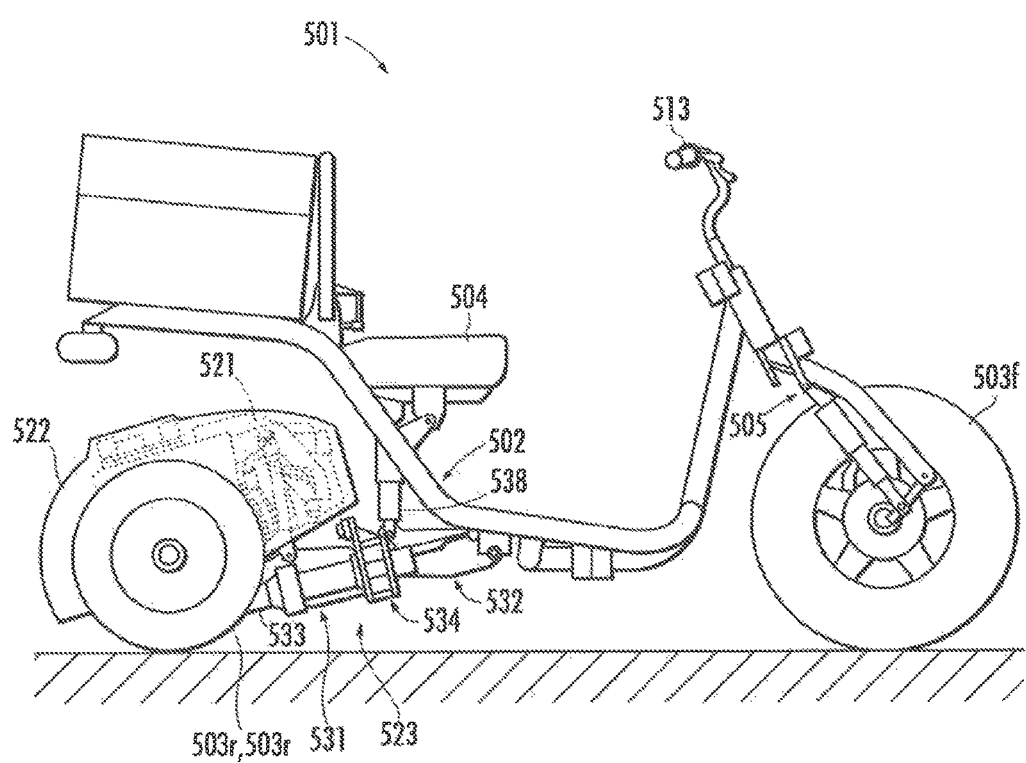
FIG. 44 is a side view of yet another exemplary mobile body (three-wheeled vehicle) to which the present invention is applicable.

The mobile body 501 illustrated in FIG. 44 is a three-wheeled vehicle which includes a vehicle body 502 having a seat section (seat) 504 for an operator, one front wheel 503f (steered wheel) disposed on the front side of the vehicle body 502, and two rear wheels 503r, 503r disposed side by side in the lateral direction (direction perpendicular to the paper plane of FIG. 44) on the rear side of the vehicle body 502.

In this mobile body 501, the front wheel 503f is supported by the vehicle body 502 via a front-wheel support mechanism 505 made up of a front fork and the like, in such a way as to be steerable through manipulation of a handlebar 513.

Further, in this mobile body 501, a power engine unit 521 serving as a power source of the mobile body 501 is disposed in a position between the rear wheels 503r, 503r. In the illustrated example, the power engine unit 521 is covered with a cover member 522 attached thereto.

The power engine unit 521 is connected to the rear wheels 503r, 503r such that a rotative driving force can be transmitted to the rear wheels 503r, 503r from a power engine, which is configured with an engine, an electric motor, or the like.

The power engine unit 521 is coupled to the vehicle body 502 via a roll driving mechanism 523. The roll driving mechanism 523 couples the power engine unit 521 to the vehicle body 502 in such a way as to allow the vehicle body 502 to swing (lean) in the roll direction with respect to the road surface by the driving force of an actuator 533 included in the roll driving mechanism 523.

The roll driving mechanism 523 is configured as shown in FIG. 45, for example. The longitudinal direction and lateral direction in FIG. 45 correspond respectively to the longitudinal direction and lateral direction (vehicle width direction) of the vehicle body 502.

Referring to FIG. 45, the roll driving mechanism 523 includes, as its primary components: a rear-wheel-side fixing unit 531 which is secured to the power engine unit 521, a rotalry unit 532 which is assembled in such a way as to be rotatable in the roll direction with respect to the rear-wheel-side fixing unit 531, the actuator 533, and a power transmission mechanism 534 which transmits the driving force (rotative driving force) of the actuator 533 to the rotary unit 532.

The rear-wheel-side fixing unit 531 includes a pair of plate members 535, 535 which are spaced apart from each other in the lateral direction and secured to the power engine unit 521 via screws and the like, and a shaft member 536 which is disposed between the plate members 535, 535 in the state where its shaft center C1 extends in the longitudinal direction. The shaft member 536 has its outer periphery secured to the plate members 535, 535.

The rotary unit 532 disposed on the front-end side of the shaft member 536 is coupled to the shaft member 536, via bearings or the like, in such a way as to be rotatable about the shaft center C1 of the shaft member 536.

The rotary unit 532 extends frontward from the shaft member 536 side. The rotary unit 532 is coupled to the vehicle body 502 via mounting holes 537, 537 formed at bifurcated portions at the front-side end of the rotary unit 532, in such a way as to be swingable in the pitch direction (about the axis in the lateral direction) with respect to the vehicle body 502.

This makes the vehicle body 502 swingable (in the roll direction) about the shaft center C1 of the shaft member 536, and also swingable (in the pitch direction) about the shaft center of the mounting holes 537, 537, with respect to the rear wheels 503r, 503r (and, hence, with respect to the road surface with which the rear wheels 503r, 503r are in contact).

Further, an upper surface portion of the rotary unit 532 is coupled to the vehicle body 502 via a damper 538 (shown in FIG. 44) which has one end pivotally supported at a mounting hole 539 formed on the upper surface portion. This damper 538 serves to damp or brake the swing in the pitch direction of the rotary unit 532.

The actuator 533 is an actuator which makes the vehicle body 502 swing in the roll direction with respect to the road surface. It is made up of an electric motor or a hydraulic motor, for example. The housing of the actuator 533 is secured to one of the plate members 535, 535 (to the plate member 535 on the right side in the figure) via the housing of a speed reducer 541 attached to the actuator 533.

The power transmission mechanism 534 is configured to transmit the rotative driving force input to the speed reducer 541 from the actuator 533, to the rotary unit 532, via a coupling 544, a driving-side crank arm 545, a connection rod 546, and a driven-side crank arm 547.

More specifically, a ring-shaped plate 543 serving as an input section of the coupling 544 is secured to a tip end portion of an output shaft 542 protruding frontward from the speed reducer 541. Further, the plate-shaped driving-side crank arm 545 serving as an output section of the coupling 544 is disposed behind the ring-shaped plate 543, spaced apart from the ring-shaped plate 543 in the shaft center direction of the output shaft 542. The driving-side crank arm 545 is supported on the outer periphery of the output shaft 542 via bearings or the like in such a way as to be rotatable relative to the output shaft 542.

The coupling 544 is interposed between the ring-shaped plate 543 and the driving-side crank arm 545. The coupling 544 has a structure in which projections and depressions formed on the respective surfaces of the driving-side crank arm 545 and the ring-shaped plate 543 facing each other are engaged via a plurality of elastic members 543a of rubber or the like. Therefore, the coupling 544 is configured to transmit the rotative driving force between the ring-shaped plate 543 and the driving-side crank arm 545 via the elastic force of the elastic members 543a.

The driven-side crank arm 547 is protrusively provided on the upper surface portion of the rotary unit 532 such that it is aligned with the driving-side crank arm 545, with a spacing therebetween in the lateral direction. The driven-side crank arm 547 is coupled to the driving-side crank arm 545 via the connection rod 546.

With the power transmission mechanism 534 configured as described above, the rotative driving force, output from the actuator 533 via the speed reducer 541 to the output shaft 542, is transmitted via the ring-shaped plate 543, the coupling 544, the driving-side crank arm 545, the connection rod 546, and the driven-side crank arm 547, to the rotary unit 532, and further transmitted via the rotary unit 532 to the vehicle body 502.

The rotative driving force transmitted from the actuator 533 to the vehicle body 502 in this manner causes a moment in the roll direction to act on the vehicle body 502, thus enabling the vehicle body 502 to swing in the roll direction.

Supplementally, as the actuator of the roll driving mechanism 523, an electric or hydraulic linear actuator may be used instead of the rotary actuator 533.

Further, as the power transmission mechanism 534 of the roll driving mechanism 523, a mechanism which includes a plurality of gears or a mechanism which transmits rotation via a belt or chain may be adopted.

In the mobile body 501 with the above-described structure as well, the actuator 533 can be controlled by the control processing similar to that in the fifth or sixth embodiment, to thereby control the posture in the roll direction of the vehicle body 502.

It should be noted that the mobile body 501 shown in FIG. 44 is a three-wheeled vehicle having one front wheel 503*f* and two rear wheels 503*r*. The mobile body having the roll driving mechanism 523 as described above, however, may be a mobile body having two front wheels and one rear wheel, or may be a four-wheeled vehicle having two front wheels and two rear wheels.

Further, the technique (including the rider-steering-based roll manipulated variable calculating section 288 or 308) of adjusting the control input (desired posture manipulation moment Msum_cmd) for controlling the vehicle-body leaning actuator 209 according to the steering force of a steered wheel (front wheel 203*f*) by the operator, as in the fifth or sixth embodiment, is applicable, not only to the three- or four-wheeled vehicles, but also to two-wheeled vehicles. For example, the technique is applicable to a two-wheeled vehicle which allows the front-wheel support mechanism to swing in the roll direction with respect to the vehicle body and the rear wheel, as seen in Japanese Patent Application Laid-Open No. 2006-182091.

What is claimed is:

1. A mobile body including a vehicle body having a seat section for an operator and freely tiltable in a roll direction with respect to a road surface, front and rear wheels disposed spaced apart from each other in a longitudinal direction of the vehicle body, an actuator capable of causing a moment in the roll direction to act on the vehicle body, and a control device configured to control the actuator, the control device comprising:

a center-of-gravity displacement degree index value determining section which determines a center-of-gravity displacement degree index value based on an observed value of a motional state of the mobile body, the center-of-gravity displacement degree index value representing an estimate of a degree of displacement of a center of gravity of the operator seated on the seat section in a lateral direction of the vehicle body from a prescribed reference position with respect to the vehicle body, said displacement of the center of gravity of the operator seated on the seat section in the lateral direction of the vehicle body from the prescribed reference position with respect to the vehicle body corresponding to one of a lean-in state of the operator on the vehicle body and a lean-out state of the operator on the vehicle body; and a control input determining section which determines a control input for controlling the actuator in accordance with the determined center-of-gravity displacement degree index value to reduce the degree of displacement of the center of gravity of the operator indicated by the determined center-of-gravity displacement degree index value, wherein the control device being configured to control the actuator in accordance with the determined control input, the observed value of the motional state used in the center-of-gravity displacement degree index value determining section includes an observed value of an inclination state quantity representing a state of inclination of the vehicle body, the center-of-gravity displacement degree index value determining section is configured to determine the center-of-gravity displacement degree index value successively, the center-of-gravity displacement degree index value determining section includes a function of calculating an estimate of the inclination state quantity through a computation using the determined center-of-gravity displacement degree index value, and the center-of-gravity displacement degree index value determining section is further configured to update the center-of-gravity displacement degree index value based on a deviation between the calculated value of the inclination state quantity and the observed value of the inclination state quantity, the computation carried out by the center-of-gravity displacement degree index value determining section is a computation based on a dynamic model which expresses dynamics of the mobile body by dynamics of a mass system which has an inverted pendulum mass point and a contact ground surface mass point, the inverted pendulum mass point moving in a horizontal direction above a contact ground surface with which the mobile body comes into contact, in accordance with a change of an inclination angle in the roll direction of the vehicle body and a change of a steering angle of a steered wheel among the front and rear wheels, the contact ground surface mass point moving horizontally on the contact ground surface with which the mobile body comes into contact, in accordance with the change of the steering angle of the steered wheel and independently of the change of the inclination angle in the roll direction of the vehicle body, and the computation carried out by the center-of-gravity displacement degree index value determining section is a computation based on a dynamic model which expresses dynamics of the mobile body by dynamics of a system formed of a mass point located at an overall center of gravity of the mobile body and inertia in a direction about an axis in the longitudinal direction of the mobile body.

2. The mobile body according to claim 1, wherein the actuator is an actuator which steers the steered wheel, so as to cause a ground contact point of the steered wheel to move laterally.

3. The mobile body according to claim 1, wherein the actuator is an actuator which moves a center of gravity of the vehicle body to a position at which the moment in the roll direction acts on the vehicle body by a gravitational force acting on the vehicle body.

4. The mobile body according to claim 1, wherein the actuator is an actuator which causes the vehicle body to swing in the roll direction with respect to the road surface.

5. The mobile body according to claim 1, wherein the prescribed reference position related to the position of the center of gravity of the operator is a position on a plane of symmetry of the vehicle body.

6. The mobile body according to claim 1, wherein the control input determining section is configured to determine the control input such that sensitivity of a change in the control input with respect to a change in the center-of-gravity displacement degree index value becomes lower as a traveling speed of the mobile body is higher.

7. The mobile body according to claim 4, wherein the control device further comprises a steering force estimating section which estimates a steering force applied to the steered wheel, among the front and rear wheels, as the operator seated on the seat section manipulates a handle for steering the steered wheel, and the control input determining section is configured to determine the control input in accordance with the center-of-gravity displacement degree index value and the estimated steering force.

\* \* \* \* \*

UNITED STATES PATENT AND TRADEMARK OFFICE
CERTIFICATE OF CORRECTION

PATENT NO. : 10,112,675 B2
APPLICATION NO. : 15/060024
DATED : October 30, 2018
INVENTOR(S) : Toru Takenaka et al.

It is certified that error appears in the above-identified patent and that said Letters Patent is hereby corrected as shown below:

On the Title Page

Item (56), FOREIGN PATENT DOCUMENTS:
Change "CN 20 110 009" to --IT CN20 110 009--.

Signed and Sealed this
Eleventh Day of December, 2018

Andrei Iancu
*Director of the United States Patent and Trademark Office*